United States Patent
Huang

(10) Patent No.: US 9,835,822 B2
(45) Date of Patent: Dec. 5, 2017

(54) PHOTOGRAPHING OPTICAL LENS ASSEMBLY, IMAGE CAPTURING UNIT AND ELECTRONIC DEVICE

(71) Applicant: LARGAN Precision Co., Ltd., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 218 days.

(21) Appl. No.: 14/919,102

(22) Filed: Oct. 21, 2015

(65) Prior Publication Data
US 2017/0045714 A1  Feb. 16, 2017

(30) Foreign Application Priority Data

Aug. 11, 2015 (TW) .............................. 104126121 A

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC ........................... G02B 13/001; G02B 13/002; G02B 13/0015; G02B 13/04; G02B 13/0045; G02B 13/18; G02B 1/04; G02B 3/04; G02B 9/64; G02B 27/0025; G03B 35/00; H04N 5/2254; H04N 5/335; H04N 5/372; H04N 5/374
See application file for complete search history.

(56) References Cited

U.S. PATENT DOCUMENTS

| 5,007,719 | A | 4/1991 | Hasegawa |
| 5,212,597 | A | 5/1993 | Yamada |
| 5,442,484 | A | 8/1995 | Shikawa |
| 5,557,472 | A | 9/1996 | Ito et al. |
| 5,978,151 | A | 11/1999 | Hagimori |
| 2014/0240851 | A1 | 8/2014 | Kawamura |

(Continued)

FOREIGN PATENT DOCUMENTS

| CN | 204229639 U | 3/2015 |
| CN | 204989593 U | 1/2016 |
| JP | H05-034593 | 2/1993 |

(Continued)

*Primary Examiner* — Thomas K Pham
*Assistant Examiner* — Ibrahima Diedhiou
(74) *Attorney, Agent, or Firm* — Maschoff Brennan

(57) ABSTRACT

A photographing optical lens assembly includes lens elements including, in order from an object to an image side, a first lens group, a second lens group and a third lens group. The first lens group includes a first lens element and a second lens element. The second lens group includes a third lens element, a fourth lens element and a fifth lens element. The third lens group includes a sixth lens element, a seventh lens element and an eighth lens element. The first lens element has positive refractive power. The seventh lens element has an object-side surface and an image-side surface being both aspheric. The eighth lens element has an image-side surface being concave in a paraxial region thereof, wherein both an object-side surface and the image-side surface thereof are aspheric, and the image-side surface of the eighth lens element has at least one reflection point.

29 Claims, 27 Drawing Sheets

(56) References Cited

U.S. PATENT DOCUMENTS

2015/0103413 A1\* 4/2015 Uchida .................. G02B 13/18
359/694

FOREIGN PATENT DOCUMENTS

| | | |
|---|---|---|
| JP | H07-063988 | 3/1995 |
| JP | 1999-052239 A | 2/1999 |
| JP | 1999-052240 A | 2/1999 |
| JP | 1999-064730 A | 3/1999 |
| JP | 1999-084240 A | 3/1999 |
| JP | 2009-251367 | 10/2009 |
| JP | 2010-044226 A | 2/2010 |
| TW | 201028729 A | 8/2010 |

\* cited by examiner

PHOTOGRAPHING OPTICAL LENS ASSEMBLY, IMAGE CAPTURING UNIT AND ELECTRONIC DEVICE

RELATED APPLICATIONS

This application claims priority to Taiwan Application 104126121, filed Aug. 11, 2015, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have reduced the pixel size of sensors, and compact optical systems have gradually evolved toward the field of higher megapixels, there is an increasing demand for compact optical systems featuring better image quality.

A conventional optical system employed in a portable electronic product mainly adopts a lens structure with fewer lens elements. Due to the popularity of mobile terminals with high-end specifications, such as smartphones, wearable devices and tablet personal computers, the requirements for high resolution and image quality increase significantly. With the popularity of the compact optical systems in the electronic devices, the demand of good image quality is also higher due to the advancement of the image sensor and software in the high-end electronic device. Thus, the conventional optical system does not meet the requirements of good image quality and compact size simultaneously.

SUMMARY

According to one aspect of the present disclosure, a photographing optical is lens assembly includes lens elements including, in order from an object side to an image side, a first lens group, a second lens group and a third lens group. The first lens group includes a first lens element and a second lens element. The second lens group includes a third lens element, a fourth lens element, and a fifth lens element. The third lens group includes a sixth lens element, a seventh lens element and an eighth lens element. The first lens element has positive refractive power. Both an object-side surface and an image-side surface of the seventh lens element are aspheric. The eighth lens element has an image-side surface being concave in a paraxial region thereof. Both an object-side surface and the image-side surface of the eighth lens element are aspheric. The image-side of the eighth lens element has at least one inflection point. There is an air gap in a paraxial region between every two lens elements of the third lens group that are adjacent to each other along an optical axis of the photographing optical lens assembly. When a focal length of the photographing optical lens assembly is f, a curvature radius of the image-side surface of the eighth lens element is R16, the following condition is satisfied:

$0 < f/R16 < 6.5$.

According to another aspect of the present disclosure, an image capturing unit includes the aforementioned photographing optical lens assembly and an image sensor, wherein the image sensor is disposed on the image side of the photographing optical lens assembly.

According to still another aspect of present disclosure, an electronic device includes the aforementioned image capturing unit.

BRIEF DESCRIPTION OF THE DRAWINGS

The disclosure can be more understood by reading the following detailed description of the embodiments, with reference made to the accompanying drawings as follows.

DETAILED DESCRIPTION

Figure 1:
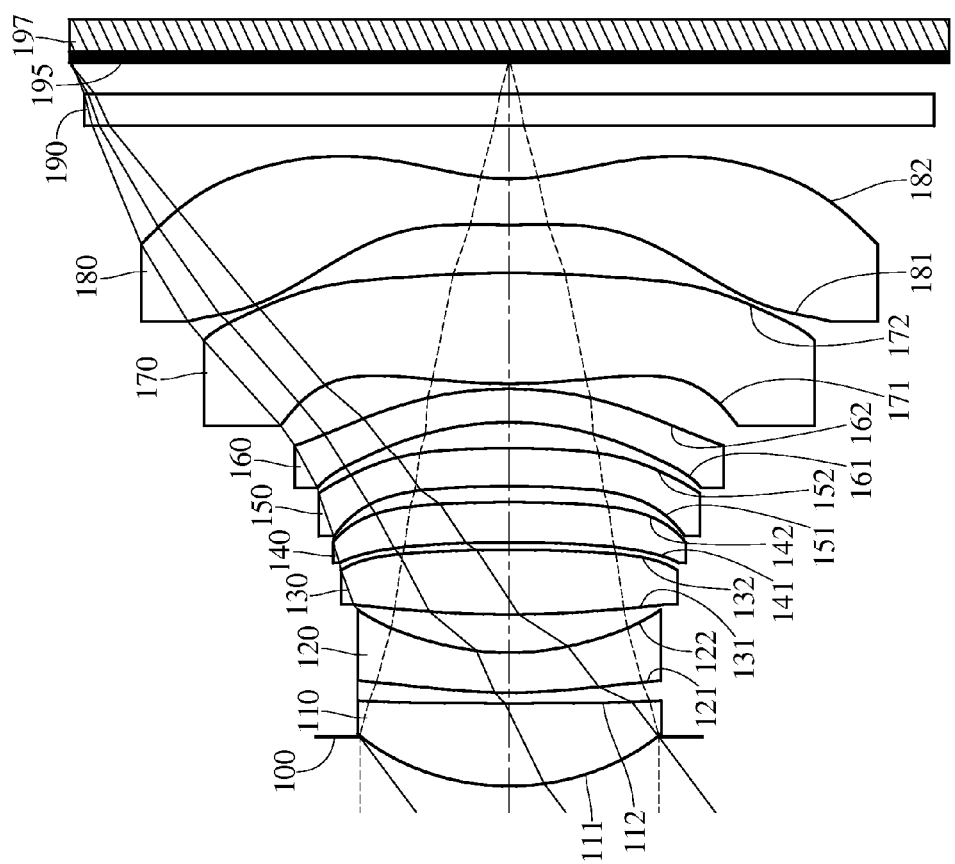
FIG. 1 is a schematic view of an image capturing unit according to the 1st embodiment of the present disclosure.

A photographing optical lens assembly includes lens elements including, in order from an object side to an image side, a first lens group, a second lens group and a third lens group. The first lens group includes a first lens element and a second lens element. The second lens group includes a third lens element, a fourth lens element and a fifth lens element. The third lens group includes a sixth lens element, a seventh lens element and an eighth lens element.

There is an air gap in a paraxial region between every two lens elements of the third lens group that are adjacent to each other; that is, each lens element of the third lens group is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there is an air gap in a paraxial region between every two lens elements of the third lens group that are adjacent to each other in the present disclosure for avoiding problems with cemented lens elements. In addition, the air gap in the paraxial region between every two lens elements of the first lens group, the second lens group and the third lens group that are adjacent to each other can be constant; that is, each lens elements of the photographing optical lens assembly in the paraxial region can be stationary relative to each other.

The first lens group can have positive refractive power, the second lens group can have positive refractive power, and the third lens group can have negative refractive power. Therefore, it is favorable for applying the photographing optical lens assembly to the electronic devices having different sizes and different requirements of image resolution.

The first lens element of the first lens group has positive refractive power. Therefore, it is favorable for providing the needed positive refractive power while reducing a total track length in the photographing optical lens assembly.

The second lens element of the first lens group can have negative refractive power. The second lens element can have an object-side surface being convex in a paraxial region thereof and an image-side surface being concave in a paraxial region thereof. Therefore, it is favorable for correcting the aberration of the first lens element so as to improve the image quality.

The third, fourth and fifth lens elements of the second lens group and the sixth lens element of the third lens group can have positive or negative refractive power. Therefore, it is favorable for distributing the refractive power of the photographing optical lens assembly while correcting aberrations.

The seventh lens element of the third lens group can have positive or negative refractive power. The seventh lens element can have an object-side surface being convex in a paraxial region thereof and an image-side surface being concave in a paraxial region thereof. Therefore, it is favorable with the principal point being positioned away from the image side of the photographing optical lens assembly for reducing a back focal length so as to maintain a compact size thereof.

The eighth lens element of the third lens group can have negative refractive power. The eighth lens element can have an object-side surface being convex in a paraxial region thereof and an image-side surface being concave in a paraxial region thereof. The image-side surface of the eighth lens element has at least one inflection point. Therefore, it is favorable for reducing the incident angle of the light on the image sensor so as to improve the image-sensing efficiency, and thereby correcting aberrations of the off-axis field.

According to the present disclosure, the photographing optical lens assembly includes the first lens group, the second lens group and the third lens group. Therefore, the refractive power distribution of the first lens group, the second lens group and the third lens group is favorable for adjusting the design parameters of the photographing optical lens assembly. Furthermore, it is favorable for correcting aberrations. For example, when both the first lens element and the second lens element have positive refractive power with the first lens group having positive refractive power, it is favorable for the first and second lens elements having proper refractive power distribution while reducing the sensitivity of the photographing optical lens assembly. Also, when the first lens element has positive refractive power and the second lens element has negative refractive power, the first lens element and the second lens element with opposite refractive power are favorable for correcting aberrations.

When a focal length of the photographing optical lens assembly is f, a curvature radius of the image-side surface of the eighth lens element is R16, the following condition is satisfied: $0<f/R16<6.5$. Therefore, it is favorable for reducing the back focal length of the photographing optical lens assembly so as to maintain a compact size thereof. Preferably, the following condition can also be satisfied: $0.3<f/R16<5.0$. More preferably, the following condition can also be satisfied: $1.0<f/R16<4.5$.

According to the present disclosure, the photographing optical lens assembly further includes a stop. When an axial distance between the stop and an image-side surface of the lens element closest to an image surface is SD, an axial distance between an object-side surface of the lens element closest to an imaged object and the image-side surface of the lens element closest to the image surface is TD, the following condition can be satisfied: $0.70<SD/TD<1.10$. Therefore, it is favorable for properly placing the stop to provide sufficient field of view and obtain a balance between the total track length and the incident angle of the light on the image sensor.

The photographing optical lens assembly may include one or more additional lens elements in any of the three lens groups to further enhance the image quality. That is, the photographing optical lens assembly may have more than eight lens elements.

When a maximum refractive index among the lens elements of the photographing optical lens assembly is Nmax, the following condition can be satisfied: 1.55<Nmax<1.70. Therefore, it is favorable for designing the lens elements with more flexibility so as to correct the optical characteristics of the lens elements and improve the image quality.

When an Abbe number of the first lens element is V1, an Abbe number of the second lens element is V2, an Abbe number of the sixth lens element is V6, the following condition can be satisfied: (V2+V6)/V1<1.0. Therefore, the photographing optical lens assembly has balanced the capability for correcting chromatic aberration at both the object side and the image side.

Figure 25:
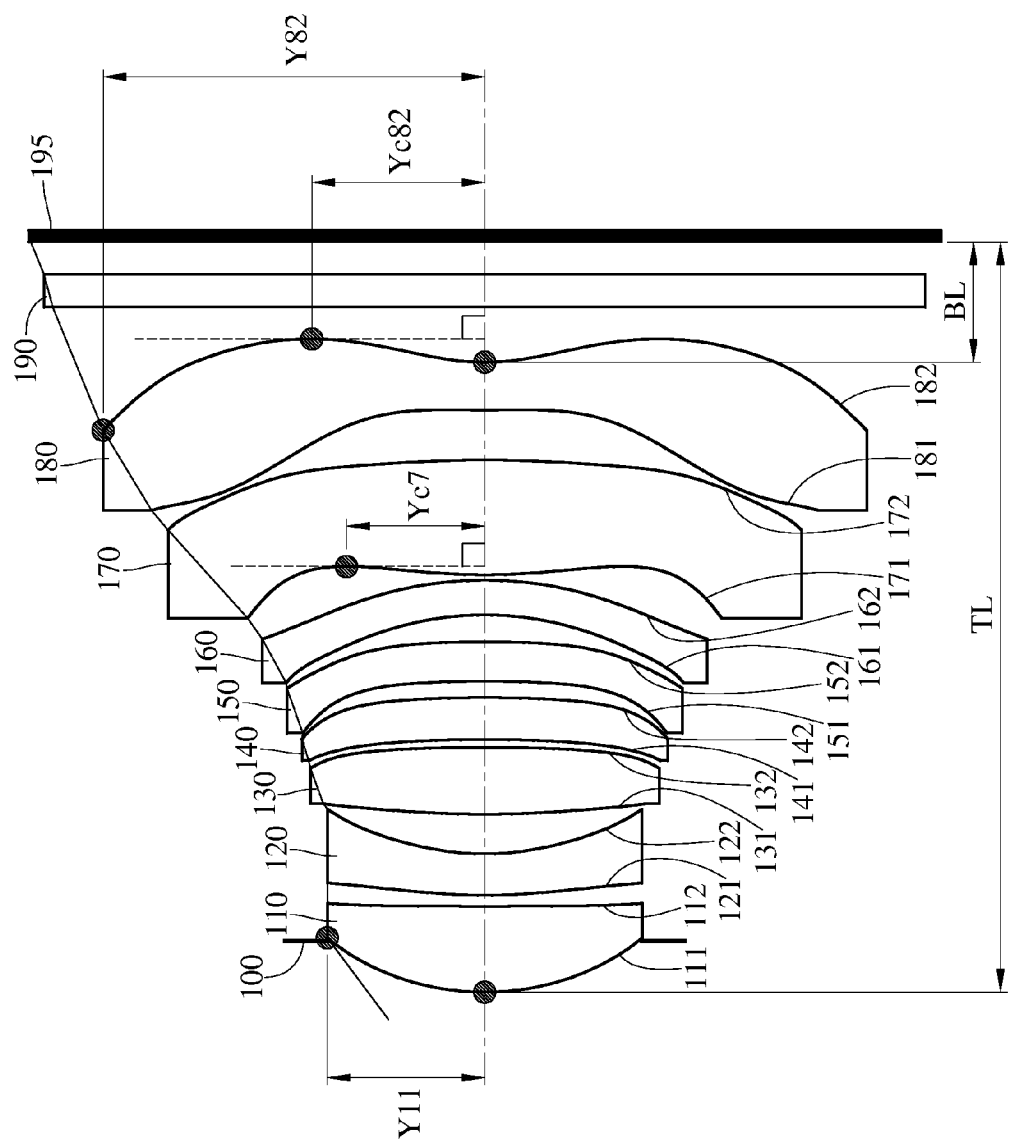
FIG. 25 is a schematic view of BL, TL, Y11, Y82, Yc7 and Yc82 in FIG. 1.

When an axial distance between the object-side surface of the lens element closest to the imaged object and the image surface is TL, a maximum image height of the photographing optical lens assembly (half of a diagonal length of an effective photosensitive area of the image sensor) is ImgH, the following condition can be satisfied: TL/ImgH<2.1. Therefore, it is favorable for simultaneously satisfying the requirement of compact size and a large image surface so as to apply the photographing optical lens assembly to electronic devices with high image resolution specifications. As seen in FIG. 25, FIG. 25 shows a schematic view of TL in FIG. 1. In FIG. 1, the first lens element is the lens element closest to the imaged object in this embodiment.

When the axial distance between the object-side surface of the lens element closest to the imaged object and the image surface is TL, an entrance pupil diameter of the photographing optical lens assembly is EPD, the following condition can be satisfied: 1.5<TL/EPD<4.0. Therefore, it is favorable for reducing the total track length of the photographing optical lens assembly and obtaining the characteristics of compactness and a large aperture.

When half of a maximal field of view of the photographing optical lens assembly is HFOV, the following condition can be satisfied: 30.0 degrees<HFOV<50.0 degrees. Therefore, it is favorable for providing the photographing optical lens assembly with proper field of view.

When the focal length of the photographing optical lens assembly is f, a focal length of the first lens element is f1, the following condition can be satisfied: 0<f/f1<2.5. Therefore, the refractive power at the object side of the photographing optical lens assembly is sufficient for focusing the light rays, and thereby reducing the total track length. Preferably, the following condition can also be satisfied: 0<f/f1<1.5.

When the axial distance between the object-side surface of the lens element closest to the imaged object and the image surface is TL, the following condition can be satisfied: TL<12.0 mm. Therefore, it is favorable for reducing the total track length so as to obtain compactness.

When a curvature radius of the object-side surface of the eighth lens element is R15, the curvature radius of the image-side surface of the eighth lens element is R16, the following condition can be satisfied: −0.9<(R15−R16)/(R15+R16)<10. Therefore, it is favorable for preventing the refractive power at the image side of the photographing optical lens assembly from overly strong and effectively correcting the astigmatism. Preferably, the following condition can also be satisfied: −0.5<(R15−R16)/(R15+R16)<2.5.

When a maximum effective radius of the object-side surface of the first lens element is Y11, a maximum effective radius of the image-side surface of the eighth lens element is Y82, the following condition can be satisfied: 0.20<Y11/Y82<0.70. Therefore, it is favorable for keep the photographing optical lens assembly compact and enlarging the field of view, and thereby satisfying the requirements of convenience and multifunction. As seen in FIG. 25, FIG. 25 shows a schematic view of Y11 and Y82 in FIG. 1.

When a maximum axial distance among all axial distances between every two lens elements of the photographing optical lens assembly that are adjacent to each other is ATmax, the maximum image height of the photographing optical lens assembly is ImgH, the following condition can be satisfied: ATmax/ImgH<0.30. Therefore, it is favorable for arranging the size of each lens element so as to keep is the photographing optical lens assembly compact.

When the focal length of the photographing optical lens assembly is f, the entrance pupil diameter of the photographing optical lens assembly is EPD, the following condition can be satisfied: f/EPD<2.60. Therefore, it is favorable for providing sufficient amount of incident light so as to improve the image quality.

When the focal length of the first lens element is f1, a focal length of the second lens element is f2, the following condition can be satisfied: −1.0<f1/f2<0.7. Therefore, the refractive power at the object side of the photographing optical lens assembly is sufficient for maintaining a compact size thereof.

When an axial distance between the image-side surface of the lens element closest to the image surface and the image surface is BL, and the entrance pupil diameter of the photographing optical lens assembly is EPD, the following condition can be satisfied: 0.10<BL/EPD<0.70. Therefore, it is favorable for controlling the back focal length and the entrance pupil to reduce the back focal length and to obtain the brightness simultaneously. As seen in FIG. 25, FIG. 25 shows a schematic view of BL in FIG. 1. In FIG. 1, the eighth lens element is the lens element closest to the image surface of the photographing optical lens assembly in this embodiment.

When a sum of every axial distance between every two lens elements of the photographing optical lens assembly that are adjacent to each other is ΣAT, the axial distance between the image-side surface of the lens element closest to the image surface and the image surface is BL, a sum of central thicknesses of the lens elements of the photographing optical lens assembly is ΣCT, the following condition can be satisfied: (ΣAT+BL)/ΣCT<0.80. Therefore, it is favorable for tightly arranging the lens elements for compactness.

When a curvature radius of an object-side surface of the sixth lens element is R11, a curvature radius of an image-side surface of the sixth lens element is R12, the following condition can be satisfied: −2.5<(R11−R12)/(R11+R12)<0.80. Therefore, it is favorable for correcting the astigmatism and Petzval's Sum.

When a vertical distance between a non-axial critical point on the object-side surface or the image-side surface of the seventh lens element and an optical axis is Yc7, the focal length of the photographing optical lens assembly is f, the following condition can be satisfied: 0.10<Yc7/f<0.60. Therefore, it is favorable for correcting the aberration of the off-axis field so as to improve the image quality at the off-axis region. Please refer to FIG. 25, FIG. 25 shows a schematic view of Yc7 in FIG. 1. A non-axial critical point is not located on the optical axis and its tangent is perpendicular to the optical axis. In FIG. 25, the non-axial critical point of the seventh lens element is located on the object-side surface, and there is no critical point on the image-side surface of the seventh lens element, but the present disclosure is not limited thereto. For example, both of the two surfaces of the seventh lens element can have critical point, and vertical distances between the critical points and the optical axis are both Yc7.

When a vertical distance between a non-axial critical point on the image-side surface of the eighth lens element and the optical axis is Yc82, the focal length of the photographing optical lens assembly is f, the following condition can be satisfied: $0.10<Yc82/f<0.80$. Therefore, it is favorable for arranging the shape of the lens element at the image side so as to correct aberrations and increase relative illumination, and thereby improving the resolution at the off-axis region of the image. Please refer to FIG. 25, which is schematic view of Yc82 in FIG. 1.

According to the present disclosure, the first lens element can have the strongest refractive power among the lens elements of the photographing optical lens assembly, that is, the absolute value of the refractive power of the first lens element is the greatest among the lens elements of the photographing optical lens assembly. Therefore, it is favorable for effectively reducing the back focal length of the photographing optical lens assembly.

When the focal length of the photographing optical lens assembly is f, a focal length of the first lens group is fG1, a focal length of the second lens group is fG2, and a focal length of the third lens group is fG3, the following conditions can be satisfied: $0.1<f/fG1<2.0$; $-0.4<f/fG2<0.8$; and $-1.0<f/fG3<1.0$. Therefore, the photographing optical lens assembly is favorably to be applied to different kinds of electronic devices by the refractive power distributions of the first lens group, the second lens group and the third lens group.

When the focal length of the photographing optical lens assembly is f, a focal length of the seventh lens element is f7, the following condition can be satisfied: $-1.0<f/f7<2.8$. Therefore, it is favorable for providing sufficient refractive power at the image side of the photographing optical lens assembly so as to balance the arrangement of the lens elements of the photographing optical lens assembly, and thereby improving the image quality.

When the focal length of the photographing optical lens assembly is f, a focal length of the eighth lens element is f8, the following condition can be satisfied: $-2.8<f/f8<1.0$. Therefore, it is favorable for correcting the distortion at the off-axis region of the image, and thereby improving the image quality.

When a central thickness of the third lens element is CT3, a central thickness of the fourth lens element is CT4, the following condition can be satisfied: $0.1<CT3/CT4<4.0$. Therefore, it provides favorable moldability and homogeneity during the injection molding process.

When a central thickness of the seventh lens element is CT7, a central thickness of the eighth lens element is CT8, the following condition can be satisfied: $0.3<CT7/CT8<4.0$. Therefore, it provides favorable moldability and homogeneity at the image side during the injection molding process.

When an axial distance between the second lens element and the third lens element is T23, an axial distance between the fifth lens element and the sixth lens element is T56, the following condition can be satisfied: $0.03<T23/T56<6.00$. Therefore, it is favorable for assembling the lens elements with a higher manufacturing yield rate.

When the axial distance between the second lens element and the third lens element is T23, an axial distance between the seventh lens element and the eighth lens element is T78, the following condition can be satisfied: $0.03<T23/T78<3.0$. Therefore, it is favorable for providing sufficient space between the adjacent lens elements so that the curvatures of the lens elements are more flexible to design, and thereby improving the capability for correcting aberrations at the off-axis field.

According to the present disclosure, an aperture stop can be configured as a front stop or a middle stop. A front stop disposed between an imaged object and the first lens element can produce a telecentric effect by providing a longer distance between an exit pupil and the image surface and thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing optical lens assembly can be made of glass or plastic material. When the lens elements are made of glass material, the refractive power distribution of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens assembly, based on the corresponding image sensor, can be flat or curved, especially a curved surface being concave facing towards the object side of the photographing optical lens assembly.

According to the present disclosure, the photographing optical lens assembly can include at least one stop, such as an aperture stop, a glare stop or a field stop. Said glare stop or said field stop is allocated for eliminating the stray light and thereby improving the image quality thereof.

According to the present disclosure, an image capturing unit is provided. The image capturing unit includes the photographing optical lens assembly according to the aforementioned photographing optical lens assembly of the present disclosure, and an image sensor, wherein the image sensor is disposed on the image side of the aforementioned photographing optical lens assembly, that is, the image sensor can be disposed on or near an image surface of the aforementioned photographing optical lens assembly. In some embodiments, the image capturing unit can further include a barrel member, a holding member or a is combination thereof.

Figure 27:
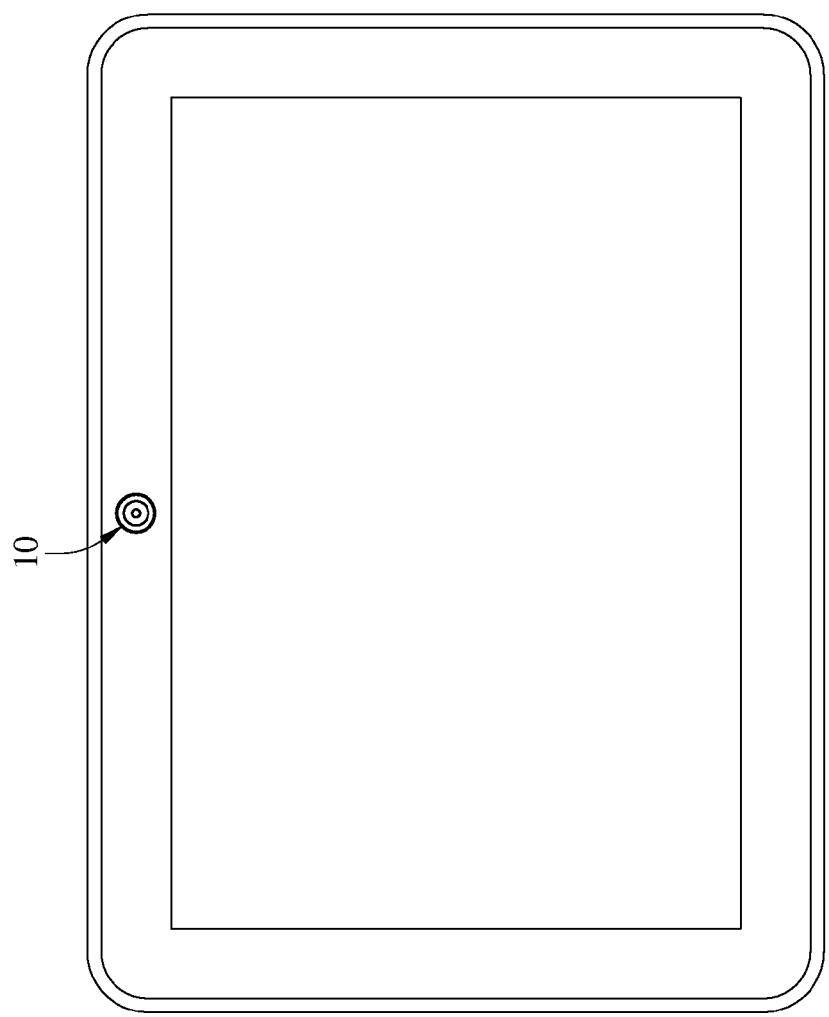
FIG. 27 shows an electronic device according to another embodiment.
Figure 26:
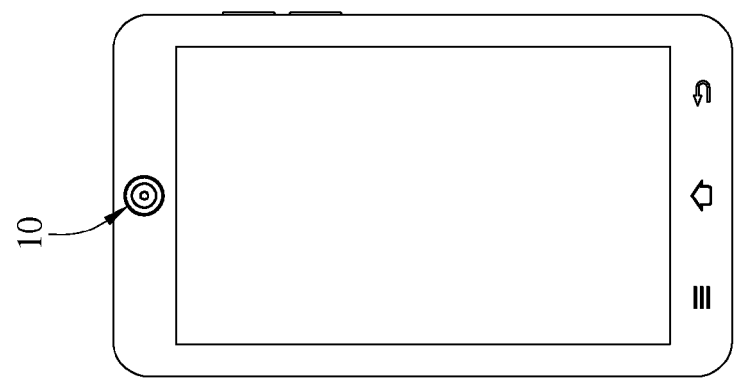
FIG. 26 shows an electronic device according to one embodiment.
Figure 28:
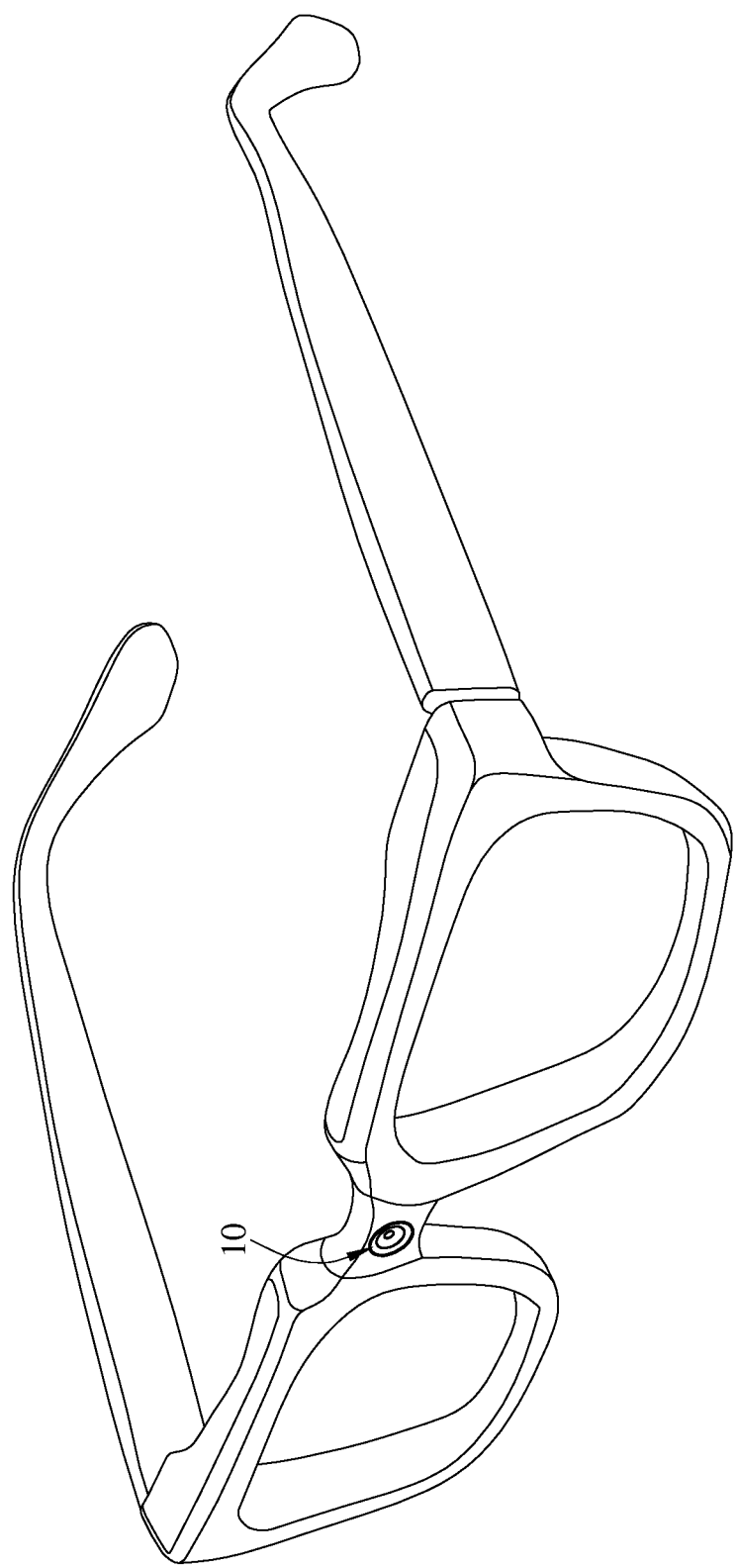
FIG. 28 shows an electronic device according to still another embodiment.

In FIG. 26, FIG. 27, and FIG. 28, an image capturing unit 10 may be installed in, but not limited to, an electronic device, including a smart phone (FIG. 26), a tablet personal computer (FIG. 27) or a wearable device (FIG. 28). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing optical lens assembly can be optionally applied to optical systems with a movable focus. Furthermore, the photographing optical lens assembly is featured with good capability in the aberration correction and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
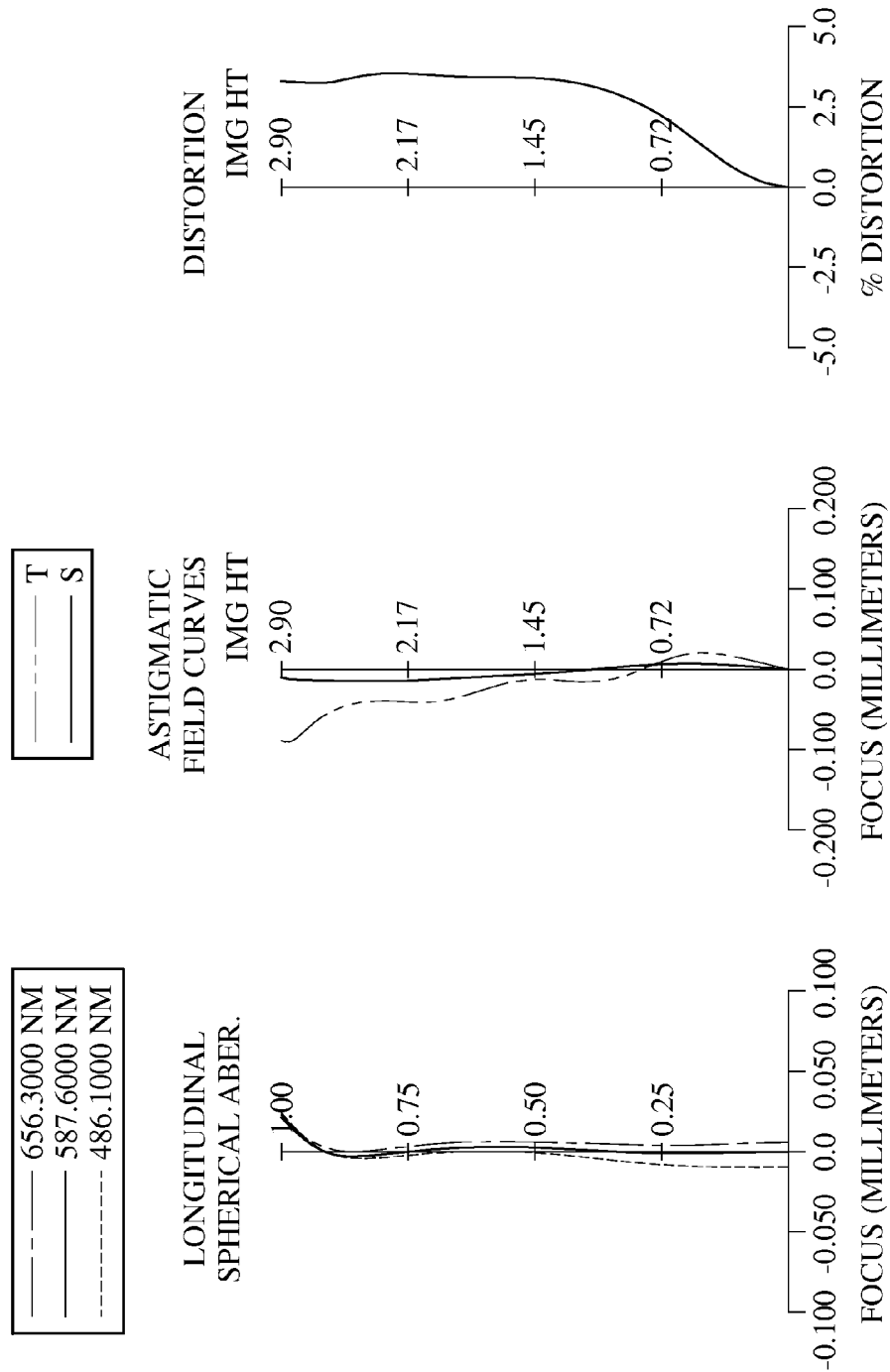
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 197. The photographing optical lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, an eighth lens element 180, an IR-cut filter 190 and an image surface 195. A first lens group (reference numeral is omitted) of the photographing optical lens assembly includes the first lens element 110 and the second lens element 120. A second lens group (reference numeral is omitted) of the photographing optical lens assembly includes the third lens element 130, fourth lens element 140 and the fifth lens element 150. A third lens group (reference numeral is omitted) of the photographing optical lens assembly includes the sixth lens element 160, the seventh lens element 170 and the eighth lens element 180. The image sensor 197 is disposed on or near the image surface 195 of the photographing optical lens assembly, and the photographing optical lens assembly has a total of eight lens elements (110-180). There is an air gap in a paraxial region between every two lens elements of the third lens group that are adjacent to each other. In this embodiment, the first lens group has positive refractive power, the second lens group has positive refractive power, and the third lens group has negative refractive power.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with positive refractive power has an object-side surface 171 being convex in a paraxial region thereof and an image-side surface 172 being convex in a paraxial region thereof. The seventh lens element 170 is made of plastic material and has the object-side surface 171 and the image-side surface 172 being both aspheric.

The eighth lens element 180 with negative refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The image-side surface 182 has at least one inflection point.

The IR-cut filter 190 is made of glass and located between the eighth lens element 180 and the image surface 195, and will not affect the focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.75 millimeters (mm); Fno=1.90; and HFOV=36.8 degrees (deg.).

When a maximum refractive index among the lens elements of the photographing optical lens assembly is Nmax, the following condition is satisfied: Nmax=1.639. In this embodiment, Nmax is a maximum refractive index among the first lens element 110, the second lens element 120, the third lens element 130, the fourth lens element 140, the fifth lens element 150, the sixth lens element 160, the seventh lens element 170 and the eighth lens element 180.

When an Abbe number of the first lens element 110 is V1, an Abbe number of the second lens element 120 is V2, an Abbe number of the sixth lens element is V6, the following condition is satisfied: (V2+V6)/V1=0.84.

When a curvature radius of the object-side surface 161 of the sixth lens element 160 is R11, a curvature radius of the image-side surface 162 of the sixth lens element 160 is R12, the following condition is satisfied: (R11−R12)/(R11+R12)=−0.13.

When a curvature radius of the object-side surface 181 of the eighth lens element 180 is R15, a curvature radius of the image-side surface 182 of the eighth lens element 180 is R16, the following condition is satisfied: (R15−R16)/(R15+R16)=0.77.

When the focal length of the photographing optical lens assembly is f, the curvature radius of the image-side surface 182 of the eighth lens element 180 is R16, the following condition is satisfied: f/R16=2.61.

When the focal length of the photographing optical lens assembly is f, a focal length of the first lens element 110 is f1, the following condition is satisfied: f/f1=1.11.

When the focal length of the first lens element 110 is f1, a focal length of the second lens element 120 is f2, the following condition is satisfied: f1/f2=−0.56.

When a maximum effective radius of the object-side surface 111 of the first lens element 110 is Y11, a maximum effective radius of the image-side surface 182 of the eighth lens element 180 is Y82, the following condition is satisfied: Y11/Y82=0.43.

When an axial distance between the stop 100 and an image-side surface of the lens element closest to the image surface 195 is SD, an axial distance between an object-side surface of the lens element closest to an imaged object and the image-side surface of the lens element closest to the image surface 195 is TD, the following condition is satisfied: SD/TD=0.92. In this embodiment, SD is an axial distance between the stop 100 and the image side-surface 182 of the eighth lens element 180, and TD is an axial distance between the object-side surface 111 of the first lens element 110 and the image side-surface 182 of the eighth lens element 180.

When a maximum axial distance among all axial distances between every two lens elements of the photographing optical lens assembly that are adjacent to each other is ATmax, a maximum image height of the photographing optical lens assembly is ImgH, the following condition is satisfied: ATmax/ImgH=0.11. In this embodiment, ATmax is a maximum axial distance among axial distances between every two first lens element 110, the second lens element 120, the third lens element 130, the fourth lens element 140, the fifth lens element 150, the sixth lens element 160, the seventh lens element 170 and the eighth lens element 180 that are adjacent to each other.

When the focal length of the photographing optical lens assembly is f, an entrance pupil diameter of the photographing optical lens assembly is EPD, the following condition is satisfied: f/EPD=1.90.

When an axial distance between the image-side surface of the lens element closest to the image surface 195 and the image surface 195 is BL, the entrance is pupil diameter of the photographing optical lens assembly is EPD, the following condition is satisfied: BL/EPD=0.39. In this embodiment, BL is an axial distance between the image-side surface 182 of the eighth lens element 180 and the image surface 195.

When an axial distance between the object-side surface of the lens element closest to the imaged object and the image surface 195 is TL, the entrance pupil diameter of the photographing optical lens assembly is EPD, the following condition is satisfied: TL/EPD=2.42. In this embodiment, TL is an axial distance between the object-side surface 111 of the first lens element 110 and the image surface 195.

When a sum of every axial distance between every two lens elements of the photographing optical lens assembly that are adjacent to each other is ΣAT, the axial distance between the image-side surface of the lens element closest to the image surface 195 and the image surface 195 is BL, a sum of central thicknesses of lens elements of the photographing optical lens assembly is ΣCT, the following condition is satisfied: (ΣAT+BL)/ΣCT=0.59. In this embodiment, ΣAT is a sum of every axial distance between every two of the first lens element 110, the second lens element 120, the third lens element 130, the fourth lens element 140, the fifth lens element 150, the sixth lens element 160, the seventh lens element 170 and the eighth lens element 180 that are adjacent to each other, and ΣCT is a sum of central thicknesses of the first lens element 110 through the eighth lens element 180.

When the axial distance between the object-side surface of the lens element closest to the imaged object and the image surface 195 is TL, the maximum image height of the photographing optical lens assembly is ImgH, the following condition is satisfied: TL/ImgH=1.65.

When the axial distance between the object-side surface of the lens element closest to the imaged object and the image surface 195 is TL, the following condition is satisfied: TL=4.78 mm.

When a vertical distance between a non-axial critical point on the object-side surface 171 or the image-side surface 172 of the seventh lens element 170 and an optical axis is Yc7, the focal length of the photographing optical lens assembly is f, the following condition is satisfied: Yc7/f=0.23. In this embodiment, the non-axial critical point is located on the object-side surface 171 of the seventh lens element 170, and there is no non-axial critical point on the image-side surface 172 of the seventh lens element 170.

When a vertical distance between a non-axial critical point on the image-side surface 182 of the eighth lens element 180 and the optical axis is Yc82, the focal length of the photographing optical lens assembly is f, the following condition is satisfied: Yc82/f=0.29.

When the focal length of the photographing optical lens assembly is f, a focal length of the first lens group is fG1, the following condition is satisfied: f/fG1=0.65.

When the focal length of the photographing optical lens assembly is f, a focal length of the second lens group is fG2, the following condition is satisfied: f/fG2=0.45.

When the focal length of the photographing optical lens assembly is f, a focal length of the third lens group is fG3, the following condition is satisfied: f/fG3=−0.41.

When the focal length of the photographing optical lens assembly is f, a focal length of the seventh lens element 170 is f7, the following condition is satisfied: f/f7=0.86.

When the focal length of the photographing optical lens assembly is f, a focal length of the eighth lens element 180 is f8, the following condition is satisfied: f/f8=−1.20.

When a central thickness of the third lens element 130 is CT3, a central thickness of the fourth lens element 140 is CT, the following condition is satisfied: CT3/CT4=1.60.

When a central thickness of the seventh lens element 170 is CT7, a central thickness of the eighth lens element 180 is CT8, the following condition is satisfied: CT7/CT8=2.39.

When an axial distance between the second lens element 120 and the third lens element 130 is T23, an axial distance between the fifth lens element 150 and the sixth lens element 160 is T56, the following condition is satisfied: T23/T56=1.46.

When the axial distance between the second lens element 120 and the third is lens element 130 is T23, an axial distance between the seventh lens element 170 and the eighth lens element 180 is T78, the following condition is satisfied: T23/T78=0.80.

The detailed optical data of the 1st embodiment are shown in Table 1 and the aspheric surface data are shown in Table 2 below.

TABLE 1

1st Embodiment
f = 3.75 mm, Fno = 1.90, HFOV = 36.8 deg.

| Surface # |  | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.325 | | | | |
| 2 | Lens 1 | 1.685 | (ASP) | 0.546 | Plastic | 1.544 | 55.9 | 3.37 |
| 3 | | 18.567 | (ASP) | 0.070 | | | | |
| 4 | Lens 2 | 2.923 | (ASP) | 0.253 | Plastic | 1.639 | 23.5 | −6.03 |
| 5 | | 1.604 | (ASP) | 0.426 | | | | |
| 6 | Lens 3 | 6.358 | (ASP) | 0.050 | Plastic | 1.544 | 55.9 | 7.75 |
| 7 | | −12.215 | (ASP) | 0.266 | | | | |
| 8 | Lens 4 | −10.576 | (ASP) | 0.104 | Plastic | 1.544 | 55.9 | −430.85 |
| 9 | | −11.174 | (ASP) | 0.251 | | | | |
| 10 | Lens 5 | −10.367 | (ASP) | 0.173 | Plastic | 1.544 | 55.9 | −274.67 |
| 11 | | −11.235 | (ASP) | 0.220 | | | | |
| 12 | Lens 6 | −2.060 | (ASP) | 0.035 | Plastic | 1.639 | 23.5 | −16.13 |
| 13 | | −2.681 | (ASP) | 0.732 | | | | |
| 14 | Lens 7 | 3.461 | (ASP) | 0.317 | Plastic | 1.544 | 55.9 | 4.37 |
| 15 | | −7.055 | (ASP) | 0.306 | | | | |
| 16 | Lens 8 | 11.111 | (ASP) | 0.350 | Plastic | 1.535 | 55.7 | −3.12 |
| 17 | | 1.438 | (ASP) | 0.546 | | | | |
| 18 | IR-cut filter | Plano | | 0.210 | Glass | 1.517 | 64.2 | — |
| 19 | | Plano | | 0.206 | | | | |
| 20 | Image | Plano | | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | 1.7681E−01 | −1.2776E+01 | −2.9857E+01 | −1.2709E+01 | −2.7741E+01 | 9.0000E+01 |
| A4 = | 6.5549E−03 | −1.3129E−01 | −1.6384E−01 | 1.3995E−01 | −9.3270E−03 | 5.8849E−04 |
| A6 = | −2.1368E−02 | 3.6675E−01 | 4.0304E−01 | −2.2455E−01 | −4.4137E−03 | −1.7985E−02 |
| A8 = | 5.4198E−02 | −4.9085E−01 | −5.1213E−01 | 4.7697E−01 | 2.5916E−02 | −4.2249E−03 |
| A10 = | −6.4445E−02 | 3.7784E−01 | 3.7035E−01 | −5.4385E−01 | −4.1583E−02 | −8.5112E−03 |
| A12 = | 4.4523E−02 | −1.5437E−01 | −1.5562E−01 | 3.2179E−01 | 2.6550E−02 | — |
| A14 = | −1.1704E−02 | 2.4066E−02 | 2.6062E−02 | −6.9334E−02 | −2.2918E−03 | — |

| Surface # | 8 | 9 | 10 | 11 | 12 | 13 |
|---|---|---|---|---|---|---|
| k = | 6.9735E+01 | 8.3732E+01 | 6.2105E+01 | 7.4238E+01 | 1.0353E+00 | −1.0145E+01 |
| A4 = | −2.0966E−02 | −3.0502E−02 | −5.0212E−02 | −1.4195E−01 | −4.4139E−02 | −1.6893E−01 |
| A6 = | 1.6769E−03 | −2.9339E−02 | −4.1045E−02 | 1.1718E−01 | 2.4240E−01 | 2.6139E−01 |
| A8 = | −7.7153E−03 | −3.2530E−02 | −2.1920E−02 | −1.0703E−01 | −4.2265E−01 | −3.0327E−01 |
| A10 = | −1.0660E−02 | −6.6123E−03 | 4.7669E−03 | −1.1645E−01 | 4.0198E−01 | 2.1787E−01 |
| A12 = | — | 1.4550E−04 | 1.0091E−06 | 3.1028E−01 | −1.7230E−01 | −8.0449E−02 |
| A14 = | — | — | — | −2.0573E−01 | 2.4455E−02 | 1.1717E−02 |
| A16 = | — | — | — | 4.5154E−02 | — | — |

| Surface # | 14 | 15 | 16 | 17 |
|---|---|---|---|---|
| k = | −4.8924E+01 | −7.9584E+01 | 1.4669E+01 | −3.1378E+00 |
| A4 = | −3.0918E−02 | 4.9387E−03 | −3.4608E−01 | −2.4817E−01 |

TABLE 2-continued

| Aspheric Coefficients | | | |
|---|---|---|---|
| A6 = | 3.7542E−02 | 1.2692E−02 | 1.8930E−01 | 1.6312E−01 |
| A8 = | −8.5743E−02 | −2.6623E−02 | −5.8697E−02 | −7.5256E−02 |
| A10 = | 5.2991E−02 | 1.1128E−02 | 1.3504E−02 | 2.2753E−02 |
| A12 = | −1.7634E−02 | −1.7350E−03 | −2.2740E−03 | −4.1789E−03 |
| A14 = | 2.5249E−03 | 8.2882E−05 | 2.3106E−04 | 4.1494E−04 |
| A16 = | — | — | −1.0250E−05 | −1.6950E−05 |

In Table 1, the curvature radius, the thickness and the focal length are shown in millimeters (mm). Surface numbers 0-20 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
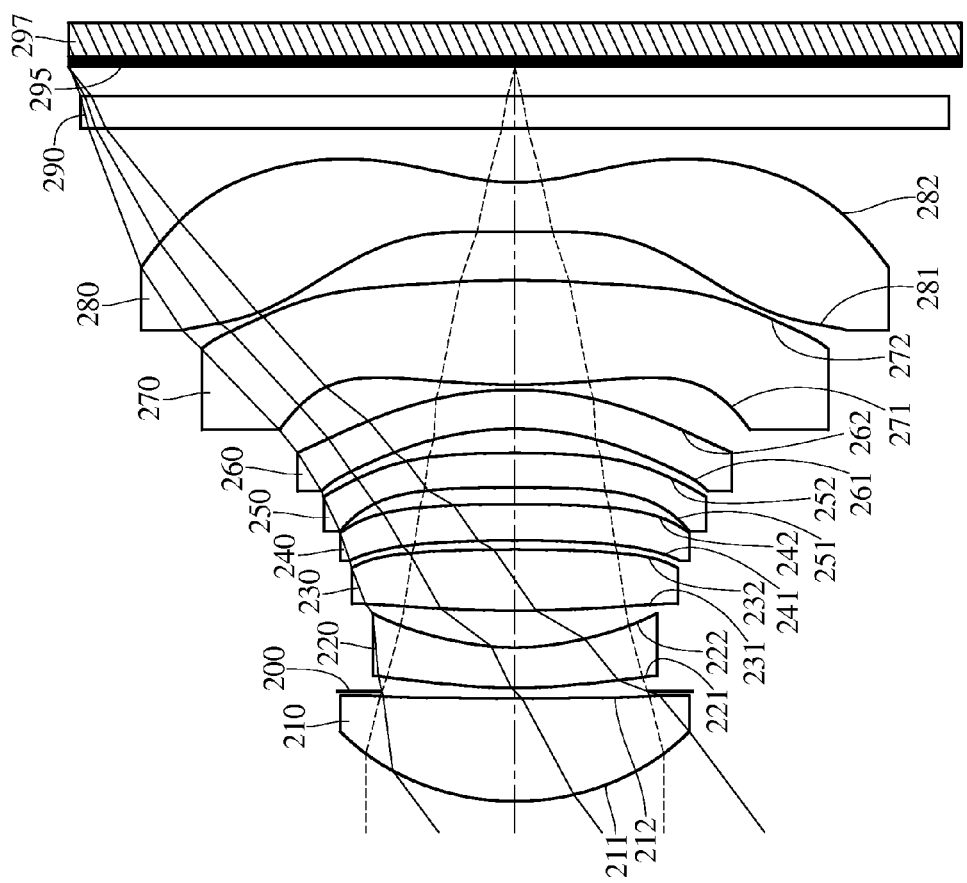
FIG. 3 is a schematic view of an image capturing unit according to the 2nd embodiment of the present disclosure.
Figure 4:
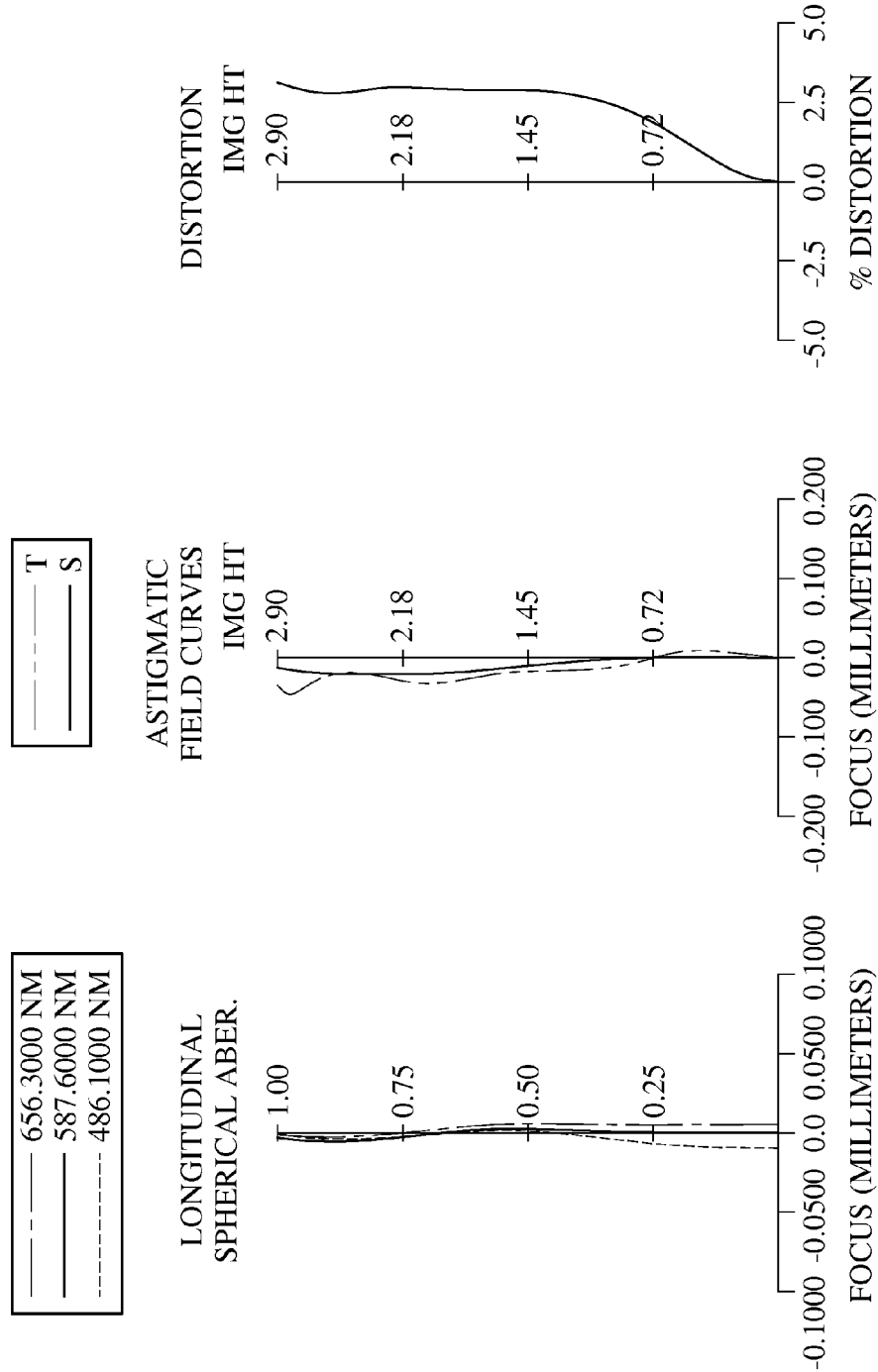
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 297. The photographing optical lens assembly includes, in order from an object side to an image side, a first lens element 210, an aperture stop 200, a second lens element 220, a third lens element 230, a fourth lens element 240, a fifth lens element 250, a sixth lens element 260, a seventh lens element 270, an eighth lens element 280, an IR-cut filter 290 and an image surface 295. A first lens group (reference numeral is omitted) of the photographing optical lens assembly includes the first lens element 210 and the second lens element 220. A second lens group (reference numeral is omitted) of the photographing optical lens assembly includes the third lens element 230, fourth lens element 240 and the fifth lens element 250. A third lens group (reference numeral is omitted) of the photographing optical lens assembly includes the sixth lens element 260, the seventh lens element 270 and the eighth lens element 280. The image sensor 297 is disposed on or near the image surface 295 of the photographing optical lens assembly, and the photographing optical lens assembly has a total of eight lens elements (210-280). There is an air gap in a paraxial region between every two lens elements of the third lens group that are adjacent to each other. In this embodiment, the first lens group has positive refractive power, the second lens group has positive refractive power, and the third lens group has negative refractive power.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric.

The seventh lens element 270 with positive refractive power has an object-side surface 271 being convex in a paraxial region thereof and an image-side surface 272 being convex in a paraxial region thereof. The fourth lens element 270 is made of plastic material and has the object-side surface 271 and the image-side surface 272 being both aspheric.

The eighth lens element 280 with negative refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The image-side surface 282 of the eighth lens element 280 has at least one inflection point The IR-cut filter 290 is made of glass and located between the eighth lens element 280 and the image surface 295, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 3.77 mm, Fno = 1.95, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.696 | (ASP) | 0.670 | Plastic | 1.544 | 56.0 | 3.41 |
| 2 | | 16.917 | (ASP) | 0.046 | | | | |
| 3 | Ape. Stop | Plano | | 0.021 | | | | |
| 4 | Lens 2 | 2.870 | (ASP) | 0.264 | Plastic | 1.660 | 20.4 | −6.65 |
| 5 | | 1.671 | (ASP) | 0.239 | | | | |
| 6 | Lens 3 | 7.476 | (ASP) | 0.398 | Plastic | 1.544 | 56.0 | 8.39 |
| 7 | | −11.489 | (ASP) | 0.059 | | | | |
| 8 | Lens 4 | −10.025 | (ASP) | 0.234 | Plastic | 1.544 | 56.0 | −56.87 |
| 9 | | −14.952 | (ASP) | 0.110 | | | | |
| 10 | Lens 5 | −13.260 | (ASP) | 0.223 | Plastic | 1.544 | 56.0 | 120.26 |
| 11 | | −11.091 | (ASP) | 0.158 | | | | |
| 12 | Lens 6 | −2.092 | (ASP) | 0.253 | Plastic | 1.660 | 20.4 | −45.32 |
| 13 | | −2.358 | (ASP) | 0.035 | | | | |
| 14 | Lens 7 | 4.446 | (ASP) | 0.678 | Plastic | 1.535 | 55.7 | 5.11 |
| 15 | | −6.733 | (ASP) | 0.316 | | | | |
| 16 | Lend 8 | 11.265 | (ASP) | 0.322 | Plastic | 1.535 | 55.7 | −3.00 |
| 17 | | 1.391 | (ASP) | 0.350 | | | | |
| 18 | IR-cut filter | Plano | | 0.210 | Glass | 1.517 | 64.2 | — |
| 19 | | Plano | | 0.190 | | | | |
| 20 | Image | Plano | | — | | | | |

Note:
Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | 1.4673E−01 | −1.5015E+01 | −2.6270E+01 | −1.3602E+01 | −4.0052E+01 | 9.0000E+01 |
| A4 = | 5.0324E−03 | −1.3146E−01 | −1.5925E−01 | 1.3340E−01 | −1.2275E−02 | 4.4223E−03 |
| A6 = | −2.1430E−02 | 3.6545E−01 | 4.0232E−01 | −2.2625E−01 | −7.4975E−03 | −2.1088E−02 |
| A8 = | 5.2679E−02 | −4.9019E−01 | −5.1523E−01 | 4.7697E−01 | 2.4265E−02 | −4.9957E−03 |
| A10 = | −6.5303E−02 | 3.7771E−01 | 3.7522E−01 | −5.4666E−01 | −3.8760E−02 | −1.3338E−02 |
| A12 = | 4.4160E−02 | −1.5424E−01 | −1.5538E−01 | 3.2165E−01 | 2.6371E−02 | — |
| A14 = | −1.1692E−02 | 2.4061E−02 | 2.6069E−02 | −6.9342E−02 | −2.3186E−03 | — |

| Surface # | 8 | 9 | 10 | 11 | 12 | 13 |
|---|---|---|---|---|---|---|
| k = | 7.1376E+01 | 8.2162E+01 | 6.1940E+01 | 7.3976E+01 | 9.4068E−01 | −1.2659E+01 |
| A4 = | −2.5943E−02 | −3.5396E−02 | −5.7194E−02 | −1.4323E−01 | −4.4477E−02 | −1.7166E−01 |
| A6 = | 1.3875E−03 | −3.0765E−02 | −3.9764E−02 | 1.1687E−01 | 2.4144E−01 | 2.5838E−01 |
| A8 = | −1.0133E−02 | 1.3015E−03 | −2.2952E−02 | −1.0712E−01 | −4.2349E−01 | −3.0376E−01 |
| A10 = | −6.8767E−04 | −4.4100E−03 | 4.2506E−02 | −1.1602E−01 | 4.0156E−01 | 2.1792E−01 |
| A12 = | — | 1.8038E−04 | −5.3802E−05 | 3.1081E−01 | −1.7210E−01 | −8.0391E−02 |
| A14 = | — | — | — | −2.0572E−01 | 2.4497E−02 | 1.1738E−02 |
| A16 = | — | — | — | 4.5165E−02 | — | — |

| Surface # | 14 | 15 | 16 | 17 |
|---|---|---|---|---|
| k = | −4.5933E+01 | −8.3161E+01 | 1.3558E+01 | −3.2789E+00 |
| A4 = | −2.9810E−02 | 4.6801E−03 | −3.4564E−01 | −2.4764E−01 |
| A6 = | 3.9769E−02 | 1.2493E−02 | 1.8932E−01 | 1.6278E−01 |
| A8 = | −8.6250E−02 | −2.6607E−02 | −5.8752E−02 | −7.5303E−02 |
| A10 = | 5.3110E−02 | 1.1105E−02 | 1.3508E−02 | 2.2754E−02 |
| A12 = | −1.7548E−02 | −1.7322E−03 | −2.2726E−03 | −4.1792E−03 |
| A14 = | 2.4697E−03 | 8.5269E−05 | 2.3129E−04 | 4.1491E−04 |
| A16 = | — | — | −1.0258E−05 | −1.6943E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.77 | (ΣAT + BL)/ΣCT | 0.57 |
| Fno | 1.95 | TL/ImgH | 1.65 |
| HFOV [deg.] | 36.7 | TL [mm] | 4.78 |
| Nmax | 1.660 | Yc7/f(object-side surface 271) | 0.23 |
| (V2 + V6)/V1 | 0.73 | | |
| (R11 − R12)/(R11 + R12) | −0.06 | Yc7/f(image-side surface 272) | — |
| (R15 − R16)/(R15 + R16) | 0.78 | | |
| f/R16 | 2.71 | Yc82/f | 0.29 |
| f/f1 | 1.10 | f/fG1 | 0.70 |
| f1/f2 | −0.51 | f/fG2 | 0.41 |
| Y11/Y82 | 0.47 | f/fG3 | −0.44 |
| SD/TD | 0.82 | f/f7 | 0.74 |
| ATmax/ImgH | 0.11 | f/f8 | −1.26 |
| f/EPD | 1.95 | CT3/CT4 | 1.70 |
| BL/EPD | 0.39 | CT7/CT8 | 2.11 |
| TL/EPD | 2.47 | T23/T56 | 1.51 |
| | | T23/T78 | 0.76 |

3rd Embodiment

Figure 5:
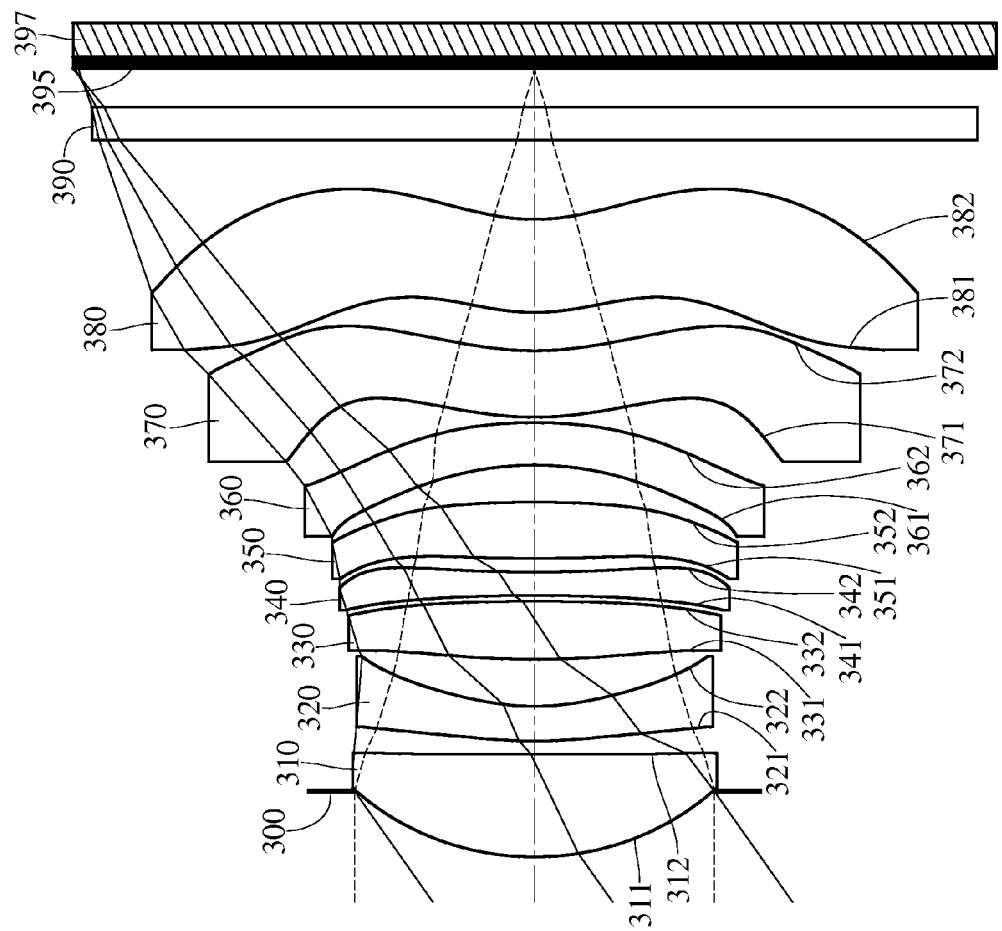
FIG. 5 is a schematic view of an image capturing unit according to the 3rd embodiment of the present disclosure.
Figure 6:
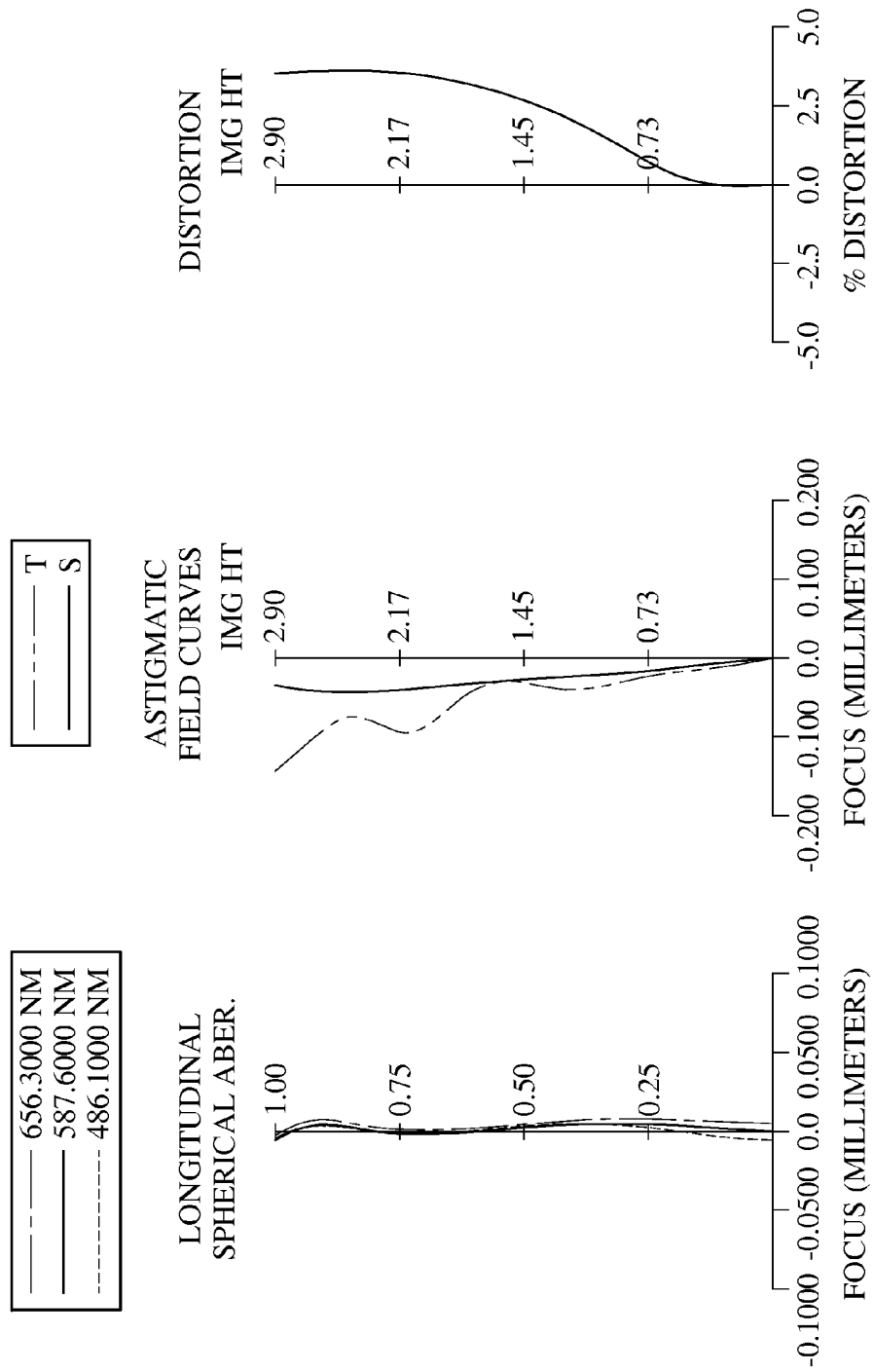
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 397. The photographing optical lens assembly includes, in order from an object side to an image side, an aperture stop 300, a first lens element 310, a second lens element 320, a third lens element 330, a fourth lens element 340, a fifth lens element 350, a sixth lens element 360, a seventh lens element 370, an eighth lens element 380, an IR-cut filter 390 and an image surface 395. A first lens group (reference numeral is omitted) of the photographing optical lens assembly includes the first lens element 310 and the second lens element 320. A second lens group (reference numeral is omitted) of the photographing optical lens assembly includes the third lens element 330, fourth lens element 340 and the fifth lens element 350. A third lens group (reference numeral is omitted) of the photographing optical lens assembly includes the sixth lens element 360, the seventh lens element 370 and the eighth lens element 380. The image sensor 397 is disposed on or near the image surface 395 of the photographing optical lens assembly, and the is photographing optical lens assembly has a total of eight lens elements (310-380). There is an air gap in a paraxial region between every two lens elements of the third lens group that are adjacent to each other. In this embodiment, the first lens group has positive refractive power, the second lens group has positive refractive power, and the third lens group has negative refractive power.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric.

The eighth lens element 380 with positive refractive power has an object-side surface 381 being convex in a paraxial region thereof and an image-side surface 382 being concave in a paraxial region thereof. The eighth lens element 380 is made of plastic material and has the object-side surface 381 and is the image-side surface 382 being both aspheric. The image-side surface 382 of the eighth lens element 380 has at least one inflection point.

The IR-cut filter 390 is made of glass and located between the eighth lens element 380 and the image surface 395, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 3.97 mm, Fno = 1.75, HFOV = 35.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.415 | | | | |
| 2 | Lens 1 | 1.766 | (ASP) | 0.650 | Plastic | 1.544 | 55.9 | 3.45 |
| 3 | | 25.751 | (ASP) | 0.082 | | | | |
| 4 | Lens 2 | 2.600 | (ASP) | 0.220 | Plastic | 1.639 | 23.5 | −5.97 |
| 5 | | 1.495 | (ASP) | 0.297 | | | | |
| 6 | Lens 3 | 5.377 | (ASP) | 0.366 | Plastic | 1.544 | 55.9 | 7.25 |
| 7 | | −14.478 | (ASP) | 0.037 | | | | |
| 8 | Lens 4 | −11.768 | (ASP) | 0.147 | Plastic | 1.544 | 55.9 | −8.92 |
| 9 | | 8.291 | (ASP) | 0.087 | | | | |
| 10 | Lens 5 | 9.624 | (ASP) | 0.354 | Plastic | 1.544 | 55.9 | 9.50 |
| 11 | | −11.034 | (ASP) | 0.236 | | | | |
| 12 | Lens 6 | −2.044 | (ASP) | 0.268 | Plastic | 1.639 | 23.5 | −9.71 |
| 13 | | −3.204 | (ASP) | 0.035 | | | | |
| 14 | Lens 7 | 2.047 | (ASP) | 0.419 | Plastic | 1.544 | 55.9 | −122.49 |
| 15 | | 1.843 | (ASP) | 0.243 | | | | |
| 16 | Lens 8 | 1.346 | (ASP) | 0.587 | Plastic | 1.544 | 55.9 | 26.64 |
| 17 | | 1.256 | (ASP) | 0.500 | | | | |
| 18 | IR-cut filter | Plano | | 0.210 | Glass | 1.517 | 64.2 | — |
| 19 | | Plano | | 0.243 | | | | |
| 20 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | 1.7606E−01 | −5.0000E+01 | −3.5839E+01 | −1.3306E+01 | −2.4164E+01 | 9.0000E+01 |
| A4 = | 3.3883E−03 | −1.3351E−01 | −1.7221E−01 | 1.1742E−01 | −1.5095E−02 | −1.6332E−02 |
| A6 = | −2.1413E−02 | 3.6480E−01 | 4.0332E−01 | −2.3781E−01 | −1.2905E−02 | −3.5827E−04 |
| A8 = | 5.2368E−02 | −4.9306E−01 | −5.1231E−01 | 4.8887E−01 | 2.8967E−02 | — |
| A10 = | −6.5934E−02 | 3.7906E−01 | 3.8118E−01 | −5.5380E−01 | −5.0574E−02 | — |
| A12 = | 4.3209E−02 | −1.5437E−01 | −1.5562E−01 | 3.2179E−01 | 2.6550E−02 | — |
| A14 = | −1.1704E−02 | 2.4065E−02 | 2.6062E−02 | −6.9334E−02 | −2.2918E−03 | — |

| Surface # | 8 | 9 | 10 | 11 | 12 | 13 |
|---|---|---|---|---|---|---|
| k = | 2.7907E+01 | 3.1895E+01 | −9.0000E+01 | 6.9188E+01 | 1.2718E+00 | −9.9934E+00 |
| A4 = | −2.6896E−03 | −1.1708E−02 | −3.1201E−02 | −1.1150E−01 | −3.6883E−02 | −1.8828E−01 |
| A6 = | −7.7490E−03 | −2.6165E−02 | −2.5688E−02 | 1.1406E−01 | 2.4728E−01 | 2.6313E−01 |
| A8 = | — | −6.2458E−03 | −1.9250E−02 | −1.0573E−01 | −4.2313E−01 | −3.0195E−01 |
| A10 = | — | −8.8311E−03 | 8.8072E−03 | −1.1698E−01 | 4.0336E−01 | 2.1802E−01 |
| A12 = | — | 1.4562E−04 | 9.6476E−07 | 3.0921E−01 | −1.7202E−01 | −8.0454E−02 |
| A14 = | — | — | — | −2.0573E−01 | 2.4455E−02 | 1.1693E−02 |
| A16 = | — | — | — | 4.5154E−02 | — | — |

| Surface # | 14 | 15 | 16 | 17 |
|---|---|---|---|---|
| k = | −1.0051E+01 | −1.4423E+01 | −2.7322E+00 | −1.7788E+00 |
| A4 = | −4.1773E−02 | −1.8604E−02 | −3.8002E−01 | −2.8376E−01 |
| A6 = | 3.1988E−02 | 1.2534E−02 | 1.9090E−01 | 1.6714E−01 |
| A8 = | −8.2642E−02 | −2.6769E−02 | −5.8388E−02 | −7.5232E−02 |
| A10 = | 5.1053E−02 | 1.1185E−02 | 1.3534E−02 | 2.2738E−02 |
| A12 = | −1.8106E−02 | −1.7156E−03 | −2.2724E−03 | −4.1790E−03 |
| A14 = | 2.9196E−03 | 8.4354E−05 | 2.3092E−04 | 4.1504E−04 |
| A16 = | — | — | −1.0325E−05 | −1.6969E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.97 | (ΣAT + BL)/ΣCT | 0.65 |
| Fno | 1.75 | TL/ImgH | 1.72 |
| HFOV [deg.] | 35.2 | TL [mm] | 4.98 |
| Nmax | 1.639 | Yc7/f(object-side surface 371) | 0.24 |
| (V2 + V6)/V1 | 0.84 | | |
| (R11 − R12)/(R11 + R12) | −0.22 | Yc7/f(image-side surface 372) | 0.29 |
| (R15 − R16)/(R15 + R16) | 0.03 | | |
| f/R16 | 3.16 | Yc82/f | 0.29 |
| f/f1 | 1.15 | f/fG1 | 0.65 |
| f1/f2 | −0.58 | f/fG2 | 0.52 |
| Y11/Y82 | 0.48 | f/fG3 | −0.40 |
| SD/TD | 0.90 | f/f7 | −0.03 |
| ATmax/ImgH | 0.10 | f/f8 | 0.15 |
| f/EPD | 1.75 | CT3/CT4 | 2.49 |
| BL/EPD | 0.42 | CT7/CT8 | 0.71 |
| TL/EPD | 2.20 | T23/T56 | 1.26 |
| | | T23/T78 | 1.22 |

4th Embodiment

Figure 7:
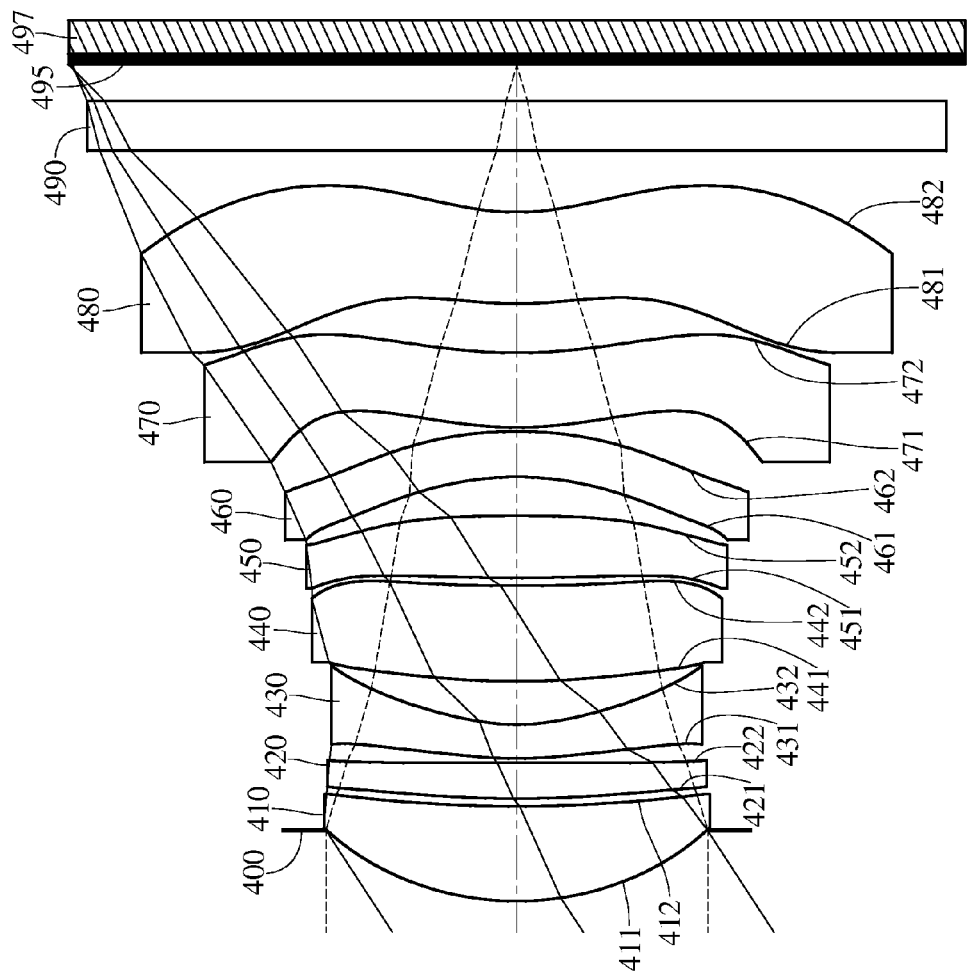
FIG. 7 is a schematic view of an image capturing unit according to the 4th embodiment of the present disclosure.
Figure 8:
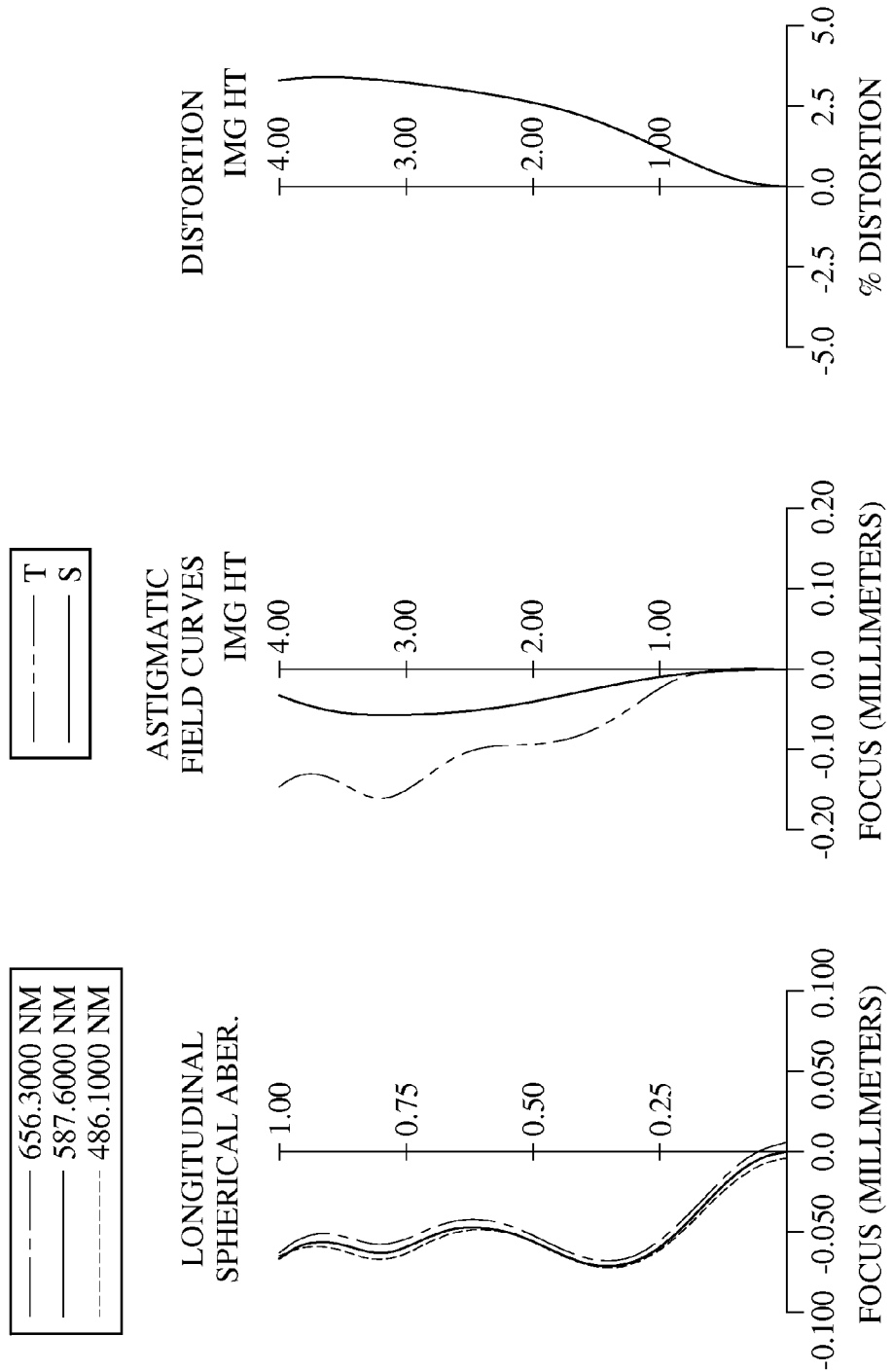
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 497. The photographing optical lens assembly includes, in order from an object side to an image side, an aperture stop 400, a first lens element 410, a second lens element 420, a third lens element 430, a fourth lens element 440, a fifth lens element 450, a sixth lens element 460, a seventh lens element 470, an eighth lens element 480, an IR-cut filter 490 and an image surface 495. A first lens group (reference numeral is omitted) of the photographing optical lens assembly includes the first lens element 410 and the second lens element 420. A second lens group (reference numeral is omitted) of the photographing optical lens assembly includes the third lens element 430, fourth lens element 440 and the fifth lens element 450. A third lens group (reference numeral is omitted) of the photographing optical lens assembly includes the sixth lens element 460, the seventh lens element 470 and the eighth lens element 480. The image sensor 497 is disposed on or near the image surface 495 of the photographing optical lens assembly, and the photographing optical lens assembly has a total of eight lens elements (410-480). There is an air gap in a paraxial region between every two lens elements of the third lens group that are adjacent to each other. In this embodiment, the first lens group has positive refractive power, the second lens group has negative refractive power, and the third lens group has negative refractive power.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric.

The eighth lens element 480 with negative refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric. The image-side surface 482 of the eighth lens element 480 has at least one inflection point.

The IR-cut filter 490 is made of glass and located between the eighth lens element 480 and the image surface 495, and will not affect the focal length of the photographing optical lens assembly.

The detailed optical data of the 4th embodiment are shown in Table 7 and the aspheric surface data are shown in Table 8 below.

TABLE 7

4th Embodiment
f = 5.98 mm, Fno = 1.75, HFOV = 33.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.631 | | | | |
| 2 | Lens 1 | 2.663 | (ASP) | 0.847 | Plastic | 1.544 | 55.9 | 7.05 |
| 3 | | 7.722 | (ASP) | 0.070 | | | | |
| 4 | Lens 2 | 8.190 | (ASP) | 0.320 | Plastic | 1.544 | 55.9 | 14.48 |
| 5 | | −203.717 | (ASP) | 0.040 | | | | |
| 6 | Lens 3 | 3.272 | (ASP) | 0.305 | Plastic | 1.639 | 23.5 | −7.19 |
| 7 | | 1.841 | (ASP) | 0.386 | | | | |
| 8 | Lens 4 | 6.833 | (ASP) | 0.856 | Plastic | 1.544 | 55.9 | 22.31 |
| 9 | | 14.941 | (ASP) | 0.071 | | | | |
| 10 | Lens 5 | 18.422 | (ASP) | 0.557 | Plastic | 1.544 | 55.9 | 16.48 |
| 11 | | −17.286 | (ASP) | 0.347 | | | | |
| 12 | Lens 6 | −2.939 | (ASP) | 0.408 | Plastic | 1.639 | 23.5 | −20.77 |
| 13 | | −3.980 | (ASP) | 0.038 | | | | |
| 14 | Lens 7 | 3.405 | (ASP) | 0.666 | Plastic | 1.544 | 55.9 | 23.22 |
| 15 | | 4.339 | (ASP) | 0.441 | | | | |
| 16 | Lens 8 | 3.413 | (ASP) | 0.820 | Plastic | 1.544 | 55.9 | −13.61 |
| 17 | | 2.139 | (ASP) | 0.550 | | | | |
| 18 | IR-cut filter | Plano | | 0.444 | Glass | 1.517 | 64.2 | — |
| 19 | | Plano | | 0.328 | | | | |
| 20 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | 1.6741E−01 | −4.8781E+01 | −8.5057E+01 | 9.0000E+01 | −3.2961E+01 | −1.2325E+01 |
| A4 = | −1.9329E−03 | −4.0980E−02 | −1.0379E−03 | 3.4487E−03 | −5.3092E−02 | 3.6654E−02 |
| A6 = | −1.3476E−03 | 5.0523E−02 | 1.4686E−04 | 4.8289E−05 | 5.8196E−02 | −3.2300E−02 |
| A8 = | 3.2383E−03 | −3.1314E−02 | — | — | −3.3237E−02 | 3.1945E−02 |
| A10 = | −2.0079E−03 | 1.1208E−02 | — | — | 1.1053E−02 | −1.6716E−02 |
| A12 = | 6.0645E−04 | −2.1005E−03 | — | — | −2.1180E−03 | 4.3287E−03 |
| A14 = | −7.1566E−05 | 1.4723E−04 | — | — | 1.5942E−04 | −4.2417E−04 |

| Surface # | 8 | 9 | 10 | 11 | 12 | 13 |
|---|---|---|---|---|---|---|
| k = | −3.4895E+01 | 5.7255E+01 | 9.0000E+01 | −2.0818E+01 | 6.8347E−01 | −4.7778E+00 |
| A4 = | −1.3773E−03 | −2.0577E−04 | −4.7486E−03 | −3.5896E−02 | −1.2917E−02 | −5.1986E−02 |
| A6 = | −9.3182E−05 | −2.6911E−03 | −3.0559E−03 | 1.7370E−02 | 3.5930E−02 | 3.7822E−02 |
| A8 = | 1.9786E−03 | −6.9743E−04 | −7.5567E−04 | −6.8386E−03 | −2.7037E−02 | −1.9337E−02 |
| A10 = | −1.4877E−03 | −2.1388E−04 | 3.8795E−05 | −3.3883E−03 | 1.1765E−02 | 6.3981E−03 |
| A12 = | 3.8512E−04 | 5.0674E−06 | 1.3071E−05 | 4.1256E−03 | −2.3058E−03 | −1.0824E−03 |
| A14 = | −1.4021E−05 | — | — | −1.2572E−03 | 1.4753E−04 | 7.0003E−05 |
| A16 = | — | — | — | 1.2611E−04 | — | — |

| Surface # | 14 | 15 | 16 | 17 |
|---|---|---|---|---|
| k = | −1.3541E+01 | −2.0305E+01 | −1.0756E+00 | −1.4857E+00 |
| A4 = | −1.2789E−02 | −3.2998E−03 | −1.1664E−01 | −8.6893E−02 |
| A6 = | 5.0232E−03 | 1.4032E−03 | 2.6825E−02 | 2.3481E−02 |
| A8 = | −5.3472E−03 | −1.6951E−03 | −3.7535E−03 | −4.8359E−03 |
| A10 = | 1.4749E−03 | 3.3299E−04 | 3.9729E−04 | 6.6760E−04 |
| A12 = | −2.4552E−04 | −2.3050E−05 | −3.0447E−05 | −5.5999E−05 |
| A14 = | 1.8979E−05 | 4.7206E−07 | 1.4118E−06 | 2.5393E−06 |
| A16 = | — | — | −2.9095E−08 | −4.7365E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.98 | (ΣAT + BL)/ΣCT | 0.57 |
| Fno | 1.75 | TL/ImgH | 1.88 |
| HFOV [deg.] | 33.2 | TL [mm] | 7.49 |
| Nmax | 1.639 | Yc7/f(object-side surface 471) | 0.24 |
| (V2 + V6)/V1 | 1.42 | | |
| (R11 − R12)/(R11 + R12) | −0.15 | Yc7/f(image-side surface 472) | 0.28 |
| (R15 − R16)/(R15 + R16) | 0.23 | | |
| f/R16 | 2.79 | Yc82/f | 0.28 |
| f/f1 | 0.85 | f/fG1 | 1.21 |
| f1/f2 | 0.49 | f/fG2 | −0.19 |
| Y11/Y82 | 0.51 | f/fG3 | −0.48 |
| SD/TD | 0.90 | f/f7 | 0.26 |
| ATmax/ImgH | 0.11 | f/f8 | −0.44 |
| f/EPD | 1.75 | CT3/CT4 | 0.36 |
| BL/EPD | 0.39 | CT7/CT8 | 0.81 |
| TL/EPD | 2.19 | T23/T56 | 0.12 |
| | | T23/T78 | 0.09 |

5th Embodiment

Figure 9:
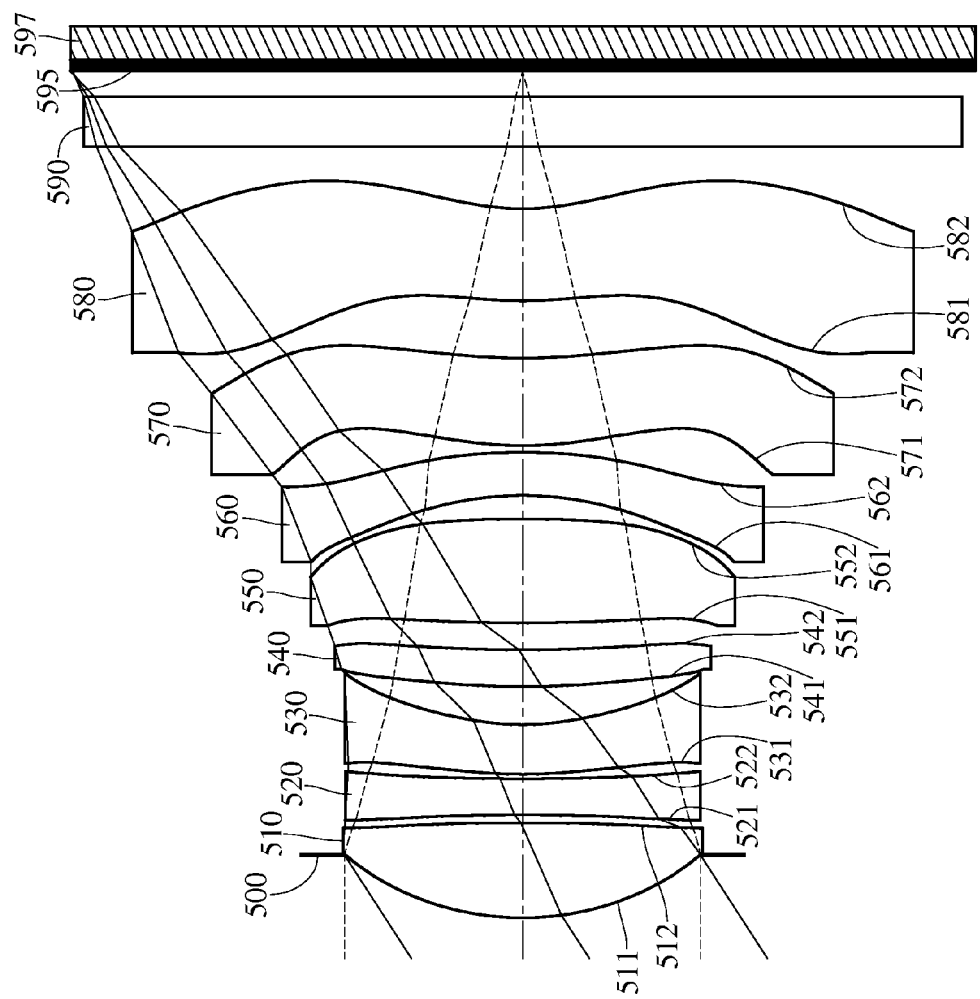
FIG. 9 is a schematic view of an image capturing unit according to the 5th embodiment of the present disclosure.
Figure 10:
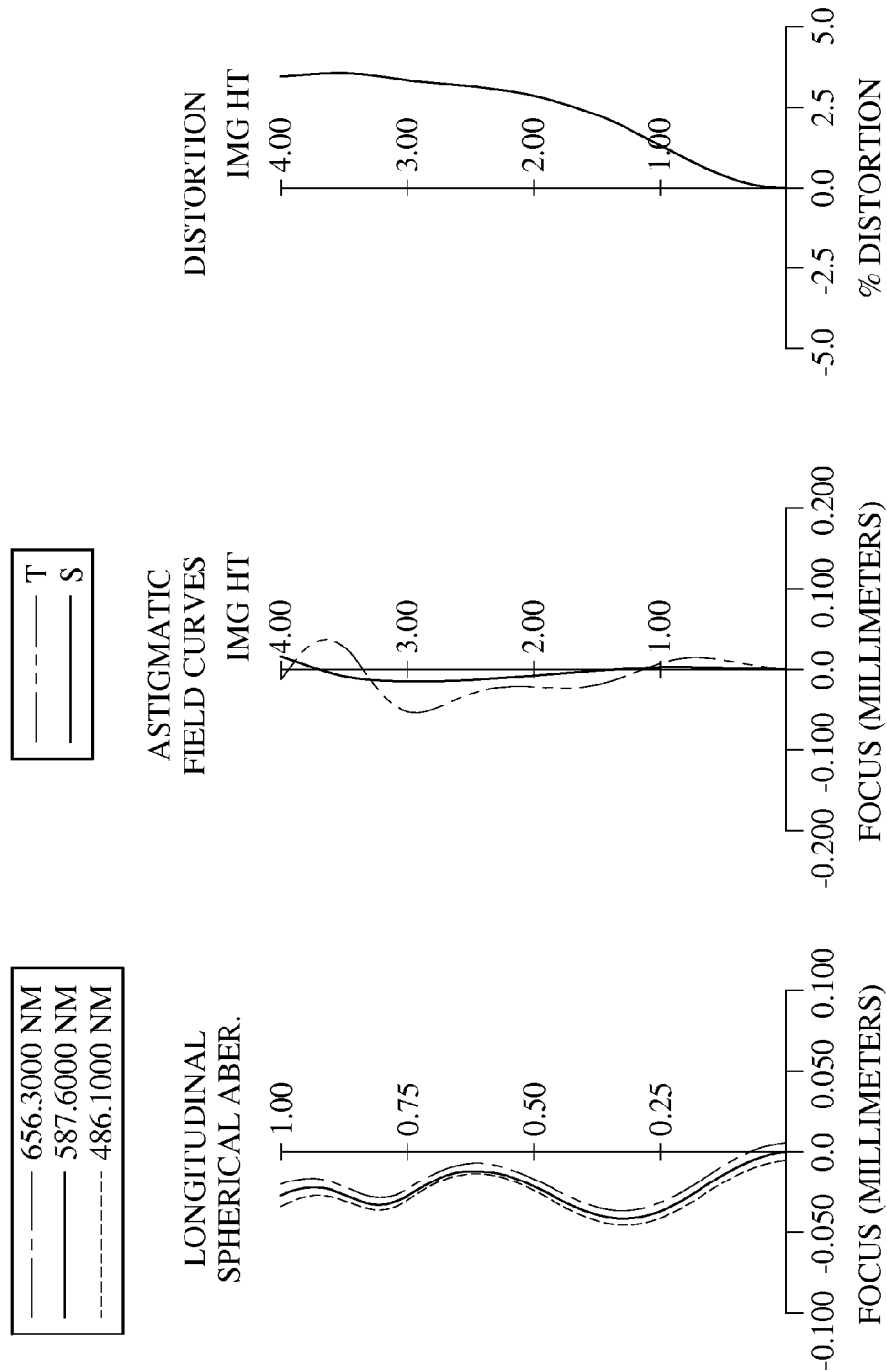
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 597. The photographing optical lens assembly includes, in order from an object side to an image side, an aperture stop 500, a first lens element 510, a second lens element 520, a third lens element 530, a fourth lens element 540, a fifth lens element 550, a sixth lens element 560, a seventh lens element 570, an eighth lens element 580, an IR-cut filter 590 and an image surface 595. A first lens group (reference numeral is omitted) of the photographing optical lens assembly includes the first lens element 510 and the second lens element 520. A second lens group (reference numeral is omitted) of the photographing optical lens assembly includes the third lens element 530, fourth lens element 540 and the fifth lens element 550. A third lens group (reference numeral is omitted) of the photographing optical lens assembly includes the sixth lens element 560, the seventh lens element 570 and the eighth lens element 580. The image sensor 597 is disposed on or near the image surface 595 of the photographing optical lens assembly, and the photographing optical lens assembly has a total of eight lens elements (510-580). There is an air gap in a paraxial region between every two lens elements of the third lens group that are adjacent to each other. In this embodiment, the first lens group has positive refractive power, the second lens group has positive refractive power, and the third lens group has negative refractive power.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second is lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric.

The eighth lens element 580 with negative refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The image-side surface 582 of the eighth lens element 580 has at least one inflection point.

The IR-cut filter 590 is made of glass and located between the eighth lens element 580 and the image surface 595, and will not affect the focal length of the photographing optical lens assembly.

The detailed optical data of the 5th embodiment are shown in Table 9 and the aspheric surface data are shown in Table 10 below.

TABLE 9

5th Embodiment
f = 5.99 mm, Fno = 1.90, HFOV = 32.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.555 | | | | |
| 2 | Lens 1 | 2.545 | (ASP) | 0.842 | Plastic | 1.544 | 56.0 | 4.49 |
| 3 | | −54.860 | (ASP) | 0.070 | | | | |
| 4 | Lens 2 | −18.590 | (ASP) | 0.320 | Plastic | 1.660 | 20.4 | −15.55 |
| 5 | | 23.058 | (ASP) | 0.040 | | | | |
| 6 | Lens 3 | 3.822 | (ASP) | 0.440 | Plastic | 1..544 | 56.0 | −10.89 |
| 7 | | 2.229 | (ASP) | 0.337 | | | | |
| 8 | Lens 4 | 6.590 | (ASP) | 0.327 | Plastic | 1.544 | 56.0 | 21.36 |
| 9 | | 14.959 | (ASP) | 0.238 | | | | |
| 10 | Lens 5 | 16.790 | (ASP) | 0.921 | Plastic | 1.544 | 56.0 | 15.72 |
| 11 | | −17.105 | (ASP) | 0.209 | | | | |
| 12 | Lens 6 | −3.066 | (ASP) | 0.382 | Plastic | 1.639 | 23.5 | −10.42 |
| 13 | | −5.964 | (ASP) | 0.060 | | | | |
| 14 | Lens 7 | 3.078 | (ASP) | 0.777 | Plastic | 1.544 | 56.0 | 12.28 |
| 15 | | 5.198 | (ASP) | 0.508 | | | | |
| 16 | Lend 8 | 3.638 | (ASP) | 0.816 | Plastic | 1.544 | 56.0 | −12.14 |
| 17 | | 2.160 | (ASP) | 0.550 | | | | |
| 18 | IR-cut filter | Plano | | 0.444 | Glass | 1.517 | 64.2 | — |
| 19 | | Plano | | 0.227 | | | | |
| 20 | Image | Plano | | — | | | | |

Note:
Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | 1.3417E−01 | −5.0000E+01 | 6.4988E+01 | 9.0000E+01 | −2.8049E+01 | −1.4840E+01 |
| A4 = | −2.3913E−03 | −4.2464E−02 | 1.0247E−03 | 1.9540E−03 | −5.2969E−02 | 3.5248E−02 |
| A6 = | −5.9949E−04 | 4.9219E−02 | 1.4687E−03 | −5.1517E−04 | 5.7058E−02 | −3.0358E−02 |
| A8 = | 2.9770E−03 | −3.0580E−02 | — | — | −3.3520E−02 | 3.2003E−02 |
| A10 = | −1.9813E−03 | 1.1256E−02 | — | — | 1.0955E−02 | −1.6646E−02 |
| A12 = | 6.3177E−04 | −2.1419E−03 | — | — | −2.1251E−03 | 4.3259E−03 |
| A14 = | −7.6558E−05 | 1.4780E−04 | — | — | 1.5469E−04 | −4.2416E−04 |

| Surface # | 8 | 9 | 10 | 11 | 12 | 13 |
|---|---|---|---|---|---|---|
| k = | −5.5050E+01 | 5.4815E+01 | 8.7639E+01 | 7.2017E+01 | 8.6604E−01 | −7.4985E+00 |
| A4 = | −2.0686E−03 | 2.2466E−03 | 2.7031E−06 | −4.0840E−02 | −1.3755E−02 | −4.8404E−02 |
| A6 = | −4.1153E−04 | −2.4465E−03 | −2.4518E−03 | 1.7784E−02 | 3.4786E−02 | 3.8267E−02 |
| A8 = | 2.1133E−03 | −7.1953E−04 | −8.3588E−04 | −7.0686E−03 | −2.7068E−02 | −1.9361E−02 |
| A10 = | −1.3173E−03 | −2.0128E−04 | −1.7997E−05 | −3.5305E−03 | 1.1810E−02 | 6.3873E−03 |
| A12 = | 3.9302E−04 | 5.8034E−05 | −4.1862E−05 | 4.0983E−03 | −2.3031E−03 | −1.0822E−03 |
| A14 = | −1.7043E−05 | — | — | −1.2569E−03 | 1.4272E−04 | 7.0849E−05 |
| A16 = | — | — | — | 1.2661E−04 | — | — |

| Surface # | 14 | 15 | 16 | 17 |
|---|---|---|---|---|
| k = | −1.4423E+01 | −4.1659E+01 | −9.6976E−01 | −1.1592E+00 |
| A4 = | −1.3553E−02 | −3.4495E−03 | −1.1615E−01 | −8.8977E−02 |
| A6 = | 4.9109E−03 | 1.3387E−03 | 2.6785E−02 | 2.3550E−02 |
| A8 = | −5.3404E−03 | −1.7104E−03 | −3.7550E−03 | −4.8319E−03 |
| A10 = | 1.4639E−03 | 3.3214E−04 | 3.9737E−04 | 6.6770E−04 |
| A12 = | −2.3980E−04 | −2.3059E−05 | −3.0443E−05 | −5.5974E−05 |
| A14 = | 1.9746E−05 | 4.7762E−07 | 1.4139E−06 | 2.5390E−06 |
| A16 = | — | — | −2.8805E−08 | −4.7469E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.99 | (ΣAT + BL)/ΣCT | 0.56 |
| Fno | 1.90 | TL/ImgH | 1.88 |
| HFOV [deg.] | 32.9 | TL [mm] | 7.51 |
| Nmax | 1.660 | Yc7/f(object-side surface 571) | 0.23 |
| (V2 + V6)/V1 | 0.78 | | |
| (R11 − R12)/(R11 + R12) | −0.32 | Yc7/f(image-side surface 572) | 0.26 |
| (R15 − R16)/(R15 + R16) | 0.25 | | |
| f/R16 | 2.77 | Yc82/f | 0.26 |
| f/f1 | 1.33 | f/fG1 | 1.01 |
| f1/f2 | −0.29 | f/fG2 | 0.11 |
| Y11/Y82 | 0.46 | f/fG3 | −0.61 |
| SD/TD | 0.91 | f/f7 | 0.49 |
| ATmax/ImgH | 0.13 | f/f8 | −0.49 |
| f/EPD | 1.90 | CT3/CT4 | 1.35 |
| BL/EPD | 0.39 | CT7/CT8 | 0.95 |
| TL/EPD | 2.38 | T23/T56 | 0.19 |
| | | T23/T78 | 0.08 |

6th Embodiment

Figure 11:
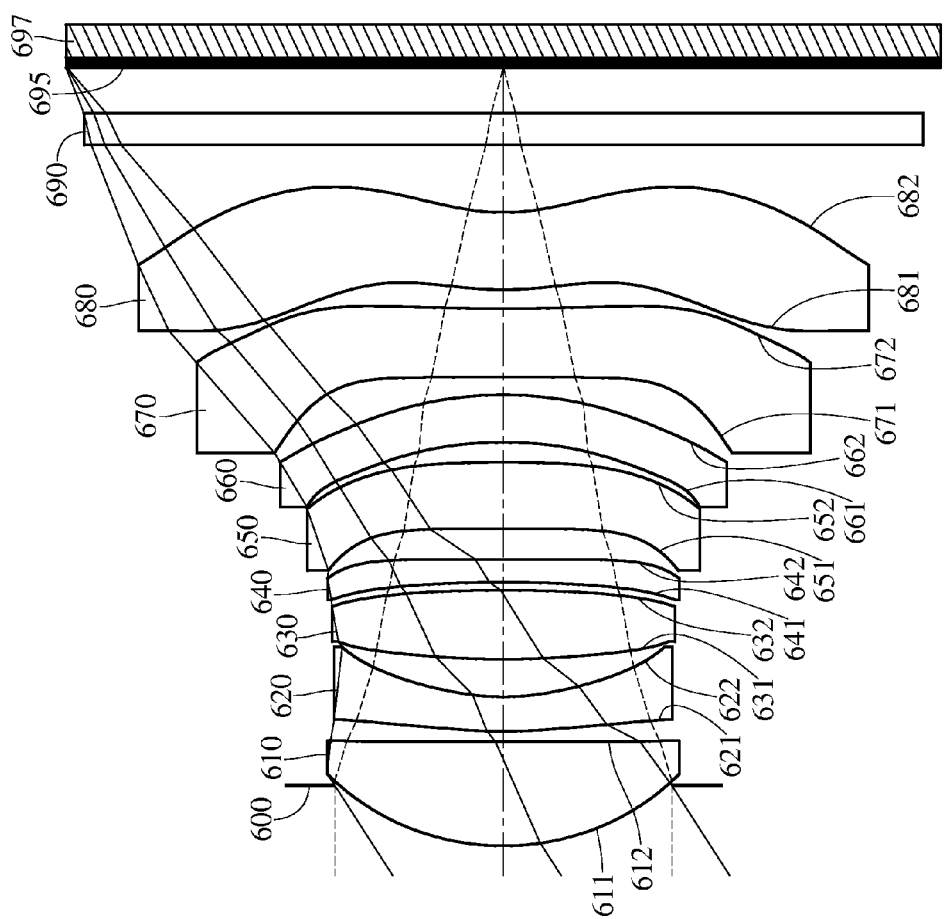
FIG. 11 is a schematic view of an image capturing unit according to the 6th embodiment of the present disclosure.
Figure 12:
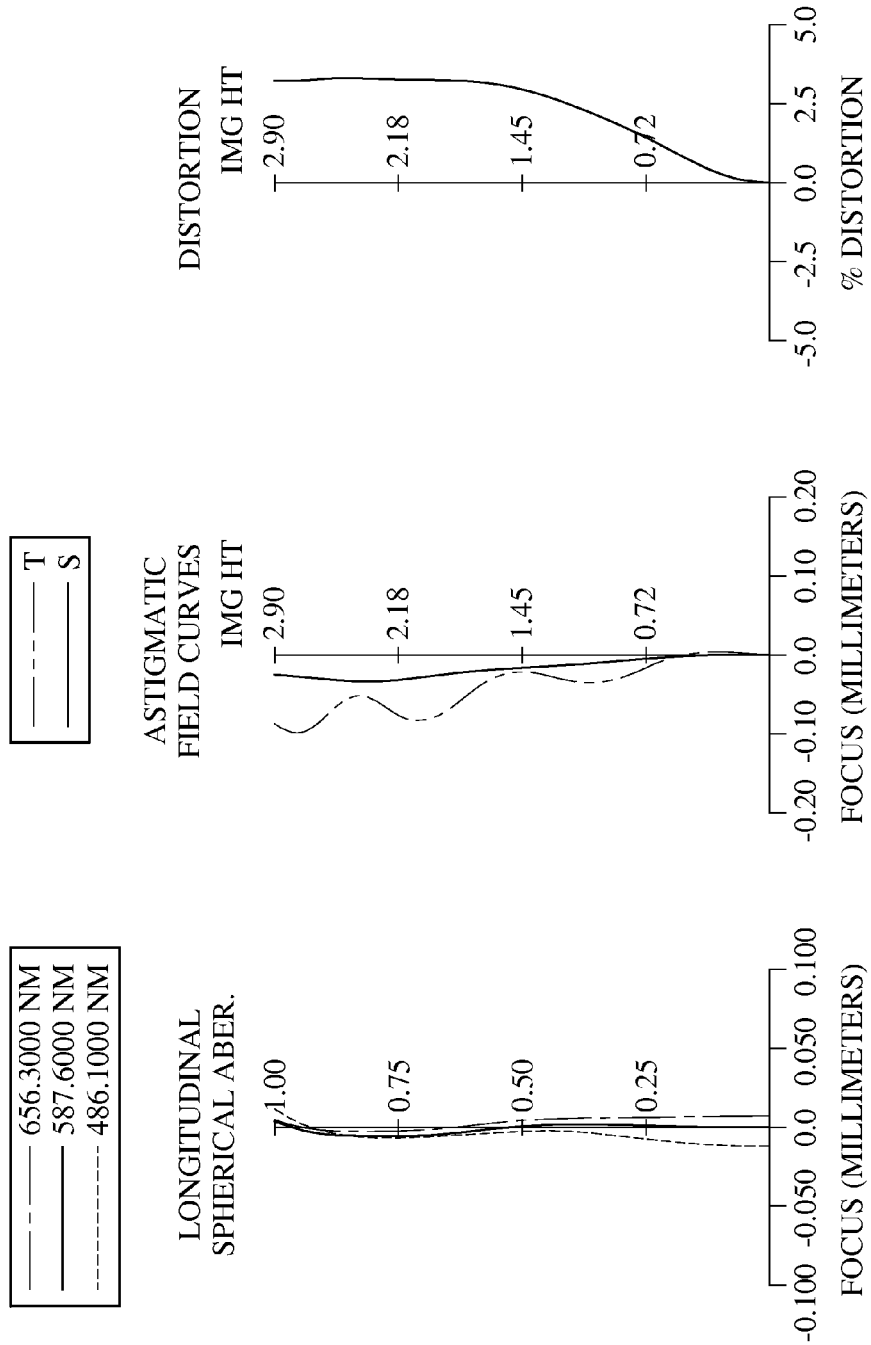
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, an aperture stop 600, a first lens element 610, a second lens element 620, a third lens element 630, a fourth lens element 640, a fifth lens element 650, a sixth lens element 660, a seventh lens element 670, an eighth lens element 680, an IR-cut filter 690 and an image surface 695. A first lens group (reference numeral is omitted) of the photographing optical lens assembly includes the first lens element 610 and the second lens element 620. A second lens group (reference numeral is omitted) of the photographing optical lens assembly includes the third lens element 630, fourth lens element 640 and the fifth lens element 650. A third lens group (reference numeral is omitted) of the photographing optical lens assembly includes the sixth lens element 660, the seventh lens element 670 and the eighth lens element 680. The image sensor 697 is disposed on or near the image surface 695 of the photographing optical lens assembly, and the photographing optical lens assembly has a total of eight lens elements (610-680). There is an air gap in a paraxial region between every two lens elements of the third lens group that are adjacent to each other. In this embodiment, the first lens group has positive refractive power, the second lens group has positive refractive power, and the third lens group has negative refractive power.

The first lens element 610 with positive refractive power has an object-side surface 611 being convex in a paraxial region thereof and an image-side surface 612 being concave in a paraxial region thereof. The sixth lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric.

The seventh lens element 670 with negative refractive power has an object-side surface 671 being concave in a paraxial region thereof and an image-side surface 672 being concave in a paraxial region thereof. The seventh lens element 670 is made of plastic material and has the object-side surface 671 and the image-side surface 672 being both aspheric.

The eighth lens element 680 with negative refractive power has an object-side surface 681 being convex in a paraxial region thereof and an image-side surface 682 being concave in a paraxial region thereof. The eighth lens element 680 is made of plastic material and has the object-side surface 681 and is the image-side surface 682 being both aspheric. The image-side surface 682 of the eighth lens element 680 has at least one inflection point.

The IR-cut filter 690 is made of glass and located between the eighth lens element 680 and the image surface 695, and will not affect the focal length of the photographing optical lens assembly.

The detailed optical data of the 6th embodiment are shown in Table 11 and the aspheric surface data are shown in Table 12 below.

TABLE 11

6th Embodiment
f = 4.37 mm, Fno = 1.95, HFOV = 32.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.401 | | | | |
| 2 | Lens 1 | 1.705 | (ASP) | 0.692 | Plastic | 1.544 | 55.9 | 3.30 |
| 3 | | 28.524 | (ASP) | 0.070 | | | | |
| 4 | Lens 2 | 2.874 | (ASP) | 0.230 | Plastic | 1.639 | 23.5 | −5.68 |
| 5 | | 1.554 | (ASP) | 0.250 | | | | |
| 6 | Lens 3 | 5.721 | (ASP) | 0.459 | Plastic | 1.544 | 55.9 | 3.30 |
| 7 | | −11.214 | (ASP) | 0.053 | | | | |
| 8 | Lens 4 | −9.262 | (ASP) | 0.151 | Plastic | 1.544 | 55.9 | −13.95 |
| 9 | | 42.304 | (ASP) | 0.205 | | | | |
| 10 | Lens 5 | 62.900 | (ASP) | 0.443 | Plastic | 1.544 | 55.9 | 17.07 |
| 11 | | −10.872 | (ASP) | 0.134 | | | | |
| 12 | Lens 6 | −2.665 | (ASP) | 0.314 | Plastic | 1.639 | 23.5 | 142.31 |
| 13 | | −2.708 | (ASP) | 0.121 | | | | |
| 14 | Lens 7 | −30.102 | (ASP) | 0.454 | Plastic | 1.544 | 55.9 | −17.47 |
| 15 | | 13.962 | (ASP) | 0.126 | | | | |
| 16 | Lend 8 | 2.066 | (ASP) | 0.514 | Plastic | 1.544 | 55.9 | −9.88 |
| 17 | | 1.361 | (ASP) | 0.450 | | | | |
| 18 | IR-cut filter | Plano | | 0.210 | Glass | 1.517 | 64.2 | — |
| 19 | | Plano | | 0.301 | | | | |
| 20 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | 2.1674E−01 | −4.9516E+01 | −3.7522E+01 | −1.3303E+01 | −1.9999E+01 | 8.5093E+01 |
| A4 = | 1.3946E−03 | −1.3323E−01 | −1.7545E−01 | 1.2855E−01 | −6.3965E−03 | −9.5283E−03 |
| A6 = | −2.0598E−02 | 3.6306E−01 | 4.0584E−01 | −2.3141E−01 | −1.9316E−03 | −6.5486E−03 |
| A8 = | 5.0644E−02 | −4.9238E−01 | −5.1185E−01 | 4.8795E−01 | 3.4843E−02 | 3.3721E−03 |
| A10 = | −6.7715E−02 | 3.8057E−01 | 3.7933E−01 | −5.4822E−01 | −4.2147E−02 | — |
| A12 = | 4.5003E−02 | −1.5437E−01 | −1.5563E−01 | 3.2179E−01 | 2.6549E−02 | — |
| A14 = | −1.1705E−02 | 2.4066E−02 | 2.6062E−02 | −6.9334E−02 | −2.2918E−03 | — |

| Surface # | 8 | 9 | 10 | 11 | 12 | 13 |
|---|---|---|---|---|---|---|
| k = | 2.7144E+01 | 8.9677E+01 | −8.7044E+01 | 6.5604E+01 | 1.6291E+00 | −1.2743E+01 |
| A4 = | −3.1962E−03 | −1.8814E−02 | −7.0542E−02 | −9.3010E−02 | −8.9983E−02 | −1.6441E−01 |
| A6 = | −3.3006E−03 | −2.4056E−02 | −3.4329E−02 | 9.2570E−02 | 2.6421E−01 | 2.5430E−01 |
| A8 = | −7.9705E−03 | −1.9487E−02 | −2.8803E−02 | −1.0356E−01 | −4.2611E−01 | −3.0319E−01 |
| A10 = | — | −8.1491E−03 | 4.8180E−03 | −1.1588E−01 | 3.9726E−01 | 2.1822E−01 |
| A12 = | — | 1.4562E−04 | 8.8153E−07 | 3.0818E−01 | −1.7202E−01 | −8.0505E−02 |
| A14 = | — | — | — | −2.0573E−01 | 2.4455E−02 | 1.1567E−02 |
| A16 = | — | — | — | 4.5154E−02 | — | — |

| Surface # | 14 | 15 | 16 | 17 |
|---|---|---|---|---|
| k = | −9.0000E+01 | −8.9993E+01 | −9.0284E−01 | −2.0562E+00 |
| A4 = | 2.7669E−02 | −1.4887E−02 | −3.7958E−01 | −2.7011E−01 |
| A6 = | −2.0492E−02 | 1.4428E−02 | 1.8820E−01 | 1.6545E−01 |
| A8 = | −7.0510E−02 | −2.6799E−02 | −5.8286E−02 | −7.5297E−02 |
| A10 = | 5.2817E−02 | 1.1156E−02 | 1.3553E−02 | 2.2762E−02 |
| A12 = | −1.8630E−02 | −1.7202E−03 | −2.2705E−03 | −4.1759E−03 |
| A14 = | 2.8558E−03 | 8.3097E−05 | 2.3095E−04 | 4.1513E−04 |
| A16 = | — | — | −1.0359E−05 | −1.7022E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.37 | (ΣAT + BL)/ΣCT | 0.59 |
| Fno | 1.95 | TL/ImgH | 1.79 |
| HFOV [deg.] | 32.7 | TL [mm] | 5.18 |
| Nmax | 1.639 | Yc7/f(object-side surface 671) | — |
| (V2 + V6)/V1 | 0.84 | | |
| (R11 − R12)/(R11 + R12) | −0.01 | Yc7/f(image-side surface 672) | 0.20 |
| (R15 − R16)/(R15 + R16) | 0.21 | | |

-continued

6th Embodiment

| | | | |
|---|---|---|---|
| f/R16 | 3.21 | Yc82/f | 0.26 |
| f/f1 | 1.32 | f/fG1 | 0.76 |
| f1/f2 | −0.58 | f/fG2 | 0.56 |
| Y11/Y82 | 0.48 | f/fG3 | −0.73 |
| SD/TD | 0.90 | f/f7 | −0.25 |
| ATmax/ImgH | 0.09 | f/f8 | −0.44 |
| f/EPD | 1.95 | CT3/CT4 | 3.04 |
| BL/EPD | 0.43 | CT7/CT8 | 0.88 |
| TL/EPD | 2.31 | T23/T56 | 1.87 |
| | | T23/T78 | 1.98 |

7th Embodiment

Figure 13:
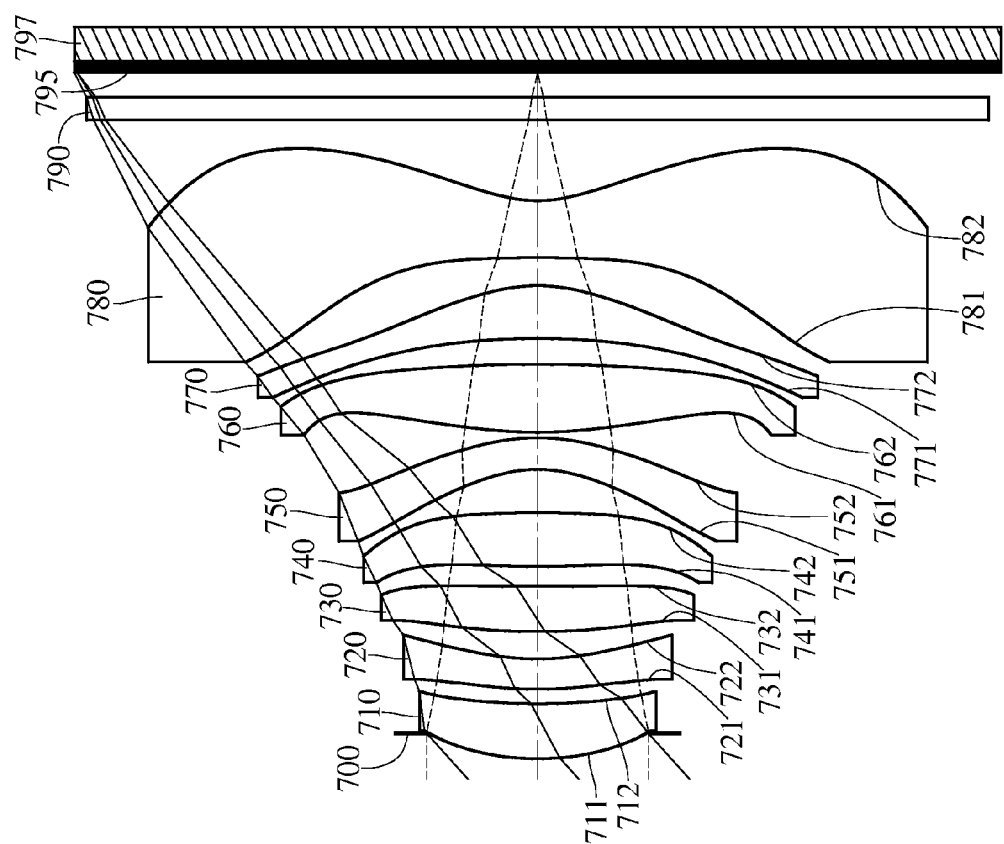
FIG. 13 is a schematic view of an image capturing unit according to the 7th embodiment of the present disclosure.
Figure 14:
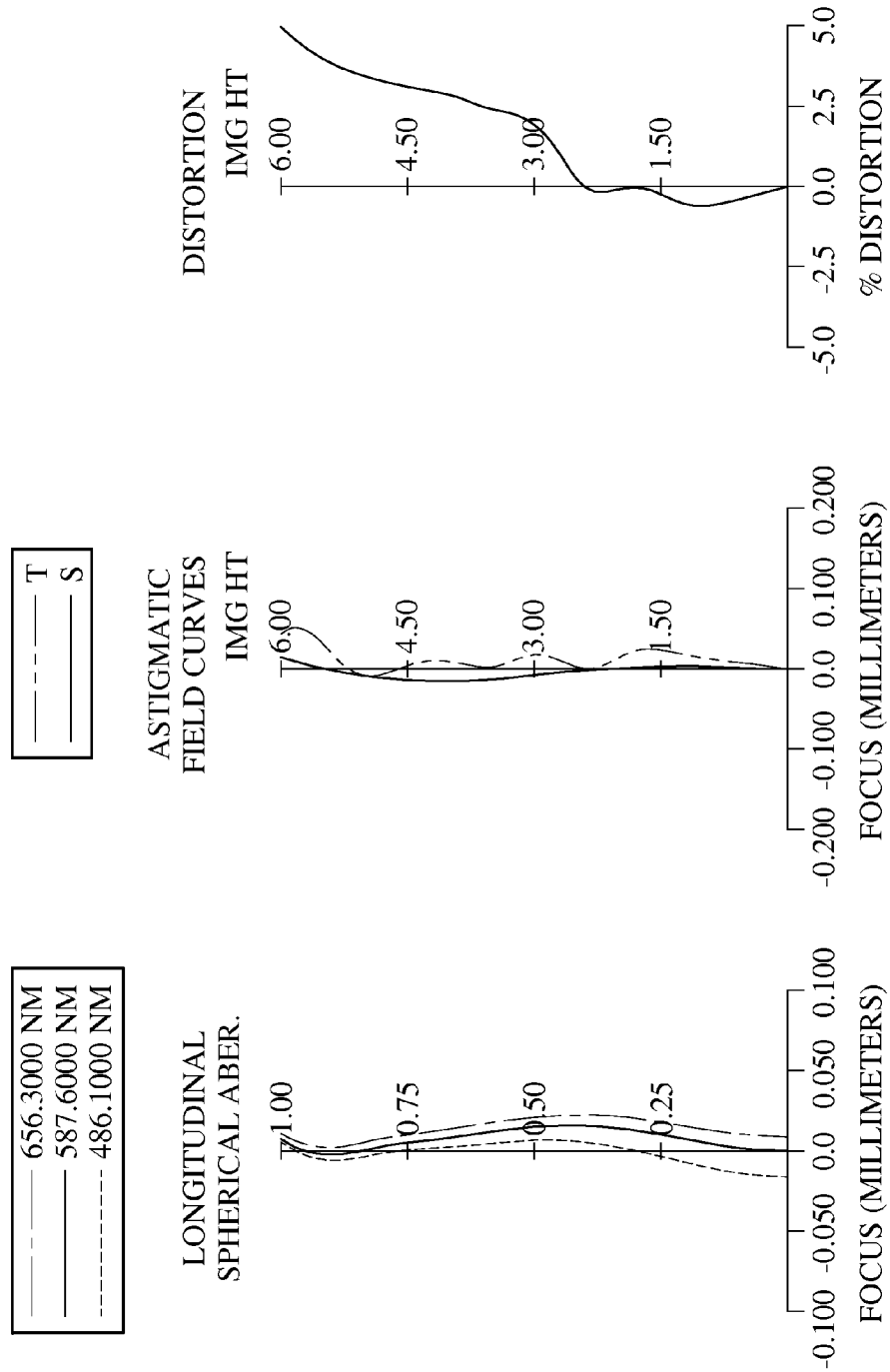
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 797. The photographing optical lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, an eighth lens element 780, an IR-cut filter 790 and an image surface 795. A first lens group (reference numeral is omitted) of the photographing optical lens assembly includes the first lens element 710 and the second lens element 720. A second lens group (reference numeral is omitted) of the photographing optical lens assembly includes the third lens element 730, fourth lens element 740 and the fifth lens element 750. A third lens group (reference numeral is omitted) of the photographing optical lens assembly includes the sixth lens element 760, the seventh lens element 770 and the eighth lens element 780. The image sensor 797 is disposed on or near the image surface 795 of the photographing optical lens assembly, and the photographing optical lens assembly has a total of eight lens elements (710-780). There is an air gap in a paraxial region between every two lens elements of the third lens group that are adjacent to each other. In this embodiment, the first lens group has positive refractive power, the second lens group has positive refractive power, and the third lens group has positive refractive power.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric.

The seventh lens element 770 with positive refractive power has an object-side surface 771 being concave in a paraxial region thereof and an image-side surface 772 being convex in a paraxial region thereof. The seventh lens element 770 is made of plastic material and has the object-side surface 771 and the image-side surface 772 being both aspheric.

The eighth lens element 780 with negative refractive power has an object-side surface 781 being concave in a paraxial region thereof and an image-side surface 782 being concave in a paraxial region thereof. The eighth lens element 780 is made of plastic material and has the object-side surface 781 and the image-side surface 782 being both aspheric. The image-side surface 782 of the eighth lens element 780 has at least one inflection point.

The IR-cut filter 790 is made of glass and located between the eighth lens element 780 and the image surface 795, and will not affect the focal length of the photographing optical lens assembly.

The detailed optical data of the 7th embodiment are shown in Table 13 and the aspheric surface data are shown in Table 14 below.

TABLE 13

7th Embodiment
f = 6.35 mm, Fno = 2.20, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.331 | | | | |
| 2 | Lens 1 | 3.431 | (ASP) | 0.718 | Plastic | 1.544 | 55.9 | 10.41 |
| 3 | | 8.057 | (ASP) | 0.188 | | | | |
| 4 | Lens 2 | 4.716 | (ASP) | 0.396 | Plastic | 1.640 | 23.3 | −21.74 |

TABLE 13-continued

7th Embodiment
f = 6.35 mm, Fno = 2.20, HFOV = 42.0 deg.

| Surface # |  | Curvature Radius |  | Thickness | Material | Index | Abbe # | Focal Length |
|---|---|---|---|---|---|---|---|---|
| 5 |  | 3.406 | (ASP) | 0.355 |  |  |  |  |
| 6 | Lens 3 | 8.194 | (ASP) | 0.588 | Plastic | 1.544 | 55.9 | 20.96 |
| 7 |  | 28.361 | (ASP) | 0.263 |  |  |  |  |
| 8 | Lens 4 | 12.385 | (ASP) | 0.699 | Plastic | 1.544 | 55.9 | 14.42 |
| 9 |  | −21.007 | (ASP) | 0.568 |  |  |  |  |
| 10 | Lens 5 | −1.734 | (ASP) | 0.411 | Plastic | 1.640 | 23.3 | −9.30 |
| 11 |  | −2.674 | (ASP) | 0.072 |  |  |  |  |
| 12 | Lens 6 | 5.765 | (ASP) | 0.887 | Plastic | 1.544 | 55.9 | 8.22 |
| 13 |  | −18.931 | (ASP) | 0.336 |  |  |  |  |
| 14 | Lens 7 | −10.088 | (ASP) | 0.690 | Plastic | 1.544 | 55.9 | 4.56 |
| 15 |  | −2.039 | (ASP) | 0.362 |  |  |  |  |
| 16 | Lend 8 | −38.051 | (ASP) | 0.745 | Plastic | 1.530 | 55.8 | −2.88 |
| 17 |  | 1.601 | (ASP) | 1.050 |  |  |  |  |
| 18 | IR-cut filter | Plano |  | 0.300 | Glass | 1.517 | 64.2 | — |
| 19 |  | Plano |  | 0.320 |  |  |  |  |
| 20 | Image | Plano |  | — |  |  |  |  |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | 8.9915E−01 | 1.0446E+01 | −9.7945E+00 | −5.7630E+00 | −3.4397E+00 | −7.5106E+00 |
| A4 = | 2.1862E−04 | −1.3002E−02 | −2.8750E−02 | −1.4489E−02 | −1.5964E−03 | −8.1781E−03 |
| A6 = | 9.3154E−04 | 8.4048E−03 | 1.2076E−02 | 6.3792E−03 | −1.6598E−04 | 6.2768E−04 |
| A8 = | 3.7742E−04 | −1.7322E−03 | −2.9274E−03 | −1.2331E−03 | −1.4227E−06 | −6.3861E−05 |
| A10 = | −4.6373E−04 | 3.2602E−06 | 7.4904E−05 | 1.3194E−04 | −6.5983E−05 | −5.5516E−05 |
| A12 = | 2.4135E−04 | 8.1796E−05 | 1.0317E−04 | −6.1925E−05 | — | — |
| A14 = | −3.4857E−05 | −4.1887E−06 | −2.7815E−05 | 1.1831E−05 | — | — |

| Surface # | 8 | 9 | 10 | 11 | 12 | 13 |
|---|---|---|---|---|---|---|
| k = | −4.9161E+01 | 3.0000E+00 | −2.1379E+00 | −3.9420E+00 | 1.0633E+00 | 2.9486E+00 |
| A4 = | −1.4353E−02 | −9.4664E−03 | 3.4117E−02 | 1.1014E−02 | −1.5491E−02 | 1.3464E−03 |
| A6 = | −1.1328E−03 | −2.5409E−03 | −1.5949E−02 | −5.0593E−03 | 2.7379E−03 | −2.5908E−04 |
| A8 = | 3.5833E−04 | 1.9952E−04 | 4.0038E−03 | 1.1742E−03 | −3.7208E−04 | −2.5237E−06 |
| A10 = | −5.6257E−05 | −2.1845E−06 | −6.7402E−04 | −1.7557E−04 | 1.5345E−05 | −6.8350E−08 |
| A12 = | −1.5438E−05 | −9.3498E−07 | 8.7207E−05 | 1.9021E−05 | 5.3033E−07 | — |
| A14 = | 3.0947E−06 | 4.4233E−07 | −5.6319E−06 | −9.1764E−07 | −8.4643E−08 | — |

| Surface # | 14 | 15 | 16 | 17 |
|---|---|---|---|---|
| k = | 2.6774E+00 | −6.7965E+00 | 8.5000E+01 | −6.5954E+00 |
| A4 = | −1.9919E−03 | −4.8403E−03 | −1.5278E−02 | −6.6138E−03 |
| A6 = | 1.0979E−04 | −1.1705E−04 | 7.1418E−04 | 4.5320E−04 |
| A8 = | 1.8379E−06 | 3.8093E−04 | −2.7403E−06 | −2.5975E−05 |
| A10 = | −1.6074E−07 | −6.1316E−05 | 3.3653E−07 | 8.4289E−07 |
| A12 = | — | 3.7673E−06 | 8.0297E−09 | −1.7531E−08 |
| A14 = | — | −8.2877E−08 | −1.6049E−09 | 1.8760E−10 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.35 | (ΣAT + BL)/ΣCT | 0.74 |
| Fno | 2.20 | TL/ImgH | 1.49 |
| HFOV [deg.] | 42.0 | TL [mm] | 8.95 |
| Nmax | 1.640 | Yc7/f(object-side surface 771) | — |
| (V2 + V6)/V1 | 1.42 | | |
| (R11 − R12)/(R11 + R12) | −1.88 | Yc7/f(image-side surface 772) | — |
| (R15 − R16)/(R15 + R16) | 1.09 | | |
| f/R16 | 3.97 | Yc82/f | 0.49 |
| f/f1 | 0.61 | f/fG1 | 0.37 |
| f1/f2 | −0.48 | f/fG2 | 0.09 |
| Y11/Y82 | 0.27 | f/fG3 | 0.57 |
| SD/TD | 0.95 | f/f7 | 1.39 |
| ATmax/ImgH | 0.09 | f/f8 | −2.20 |
| f/EPD | 2.20 | CT3/CT4 | 0.84 |

-continued

7th Embodiment

| | | | |
|---|---|---|---|
| BL/EPD | 0.58 | CT7/CT8 | 0.93 |
| TL/EPD | 3.10 | T23/T56 | 4.93 |
| | | T23/T78 | 0.98 |

8th Embodiment

Figure 15:
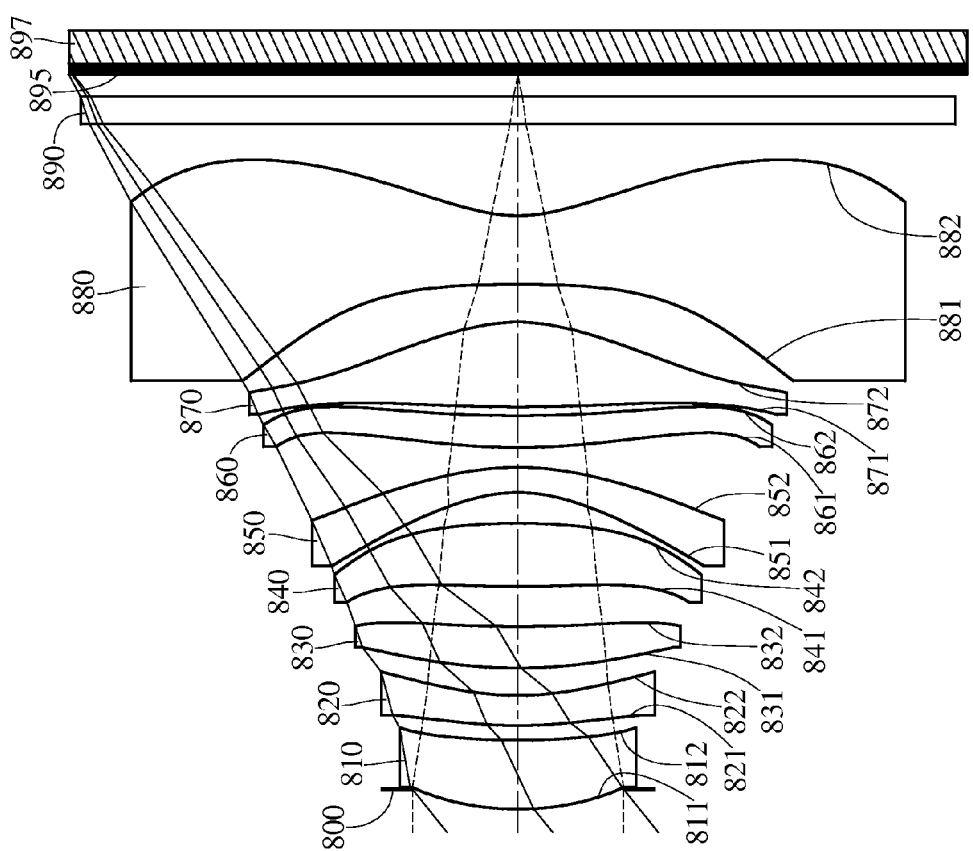
FIG. 15 is a schematic view of an image capturing unit according to the 8th embodiment of the present disclosure.
Figure 16:
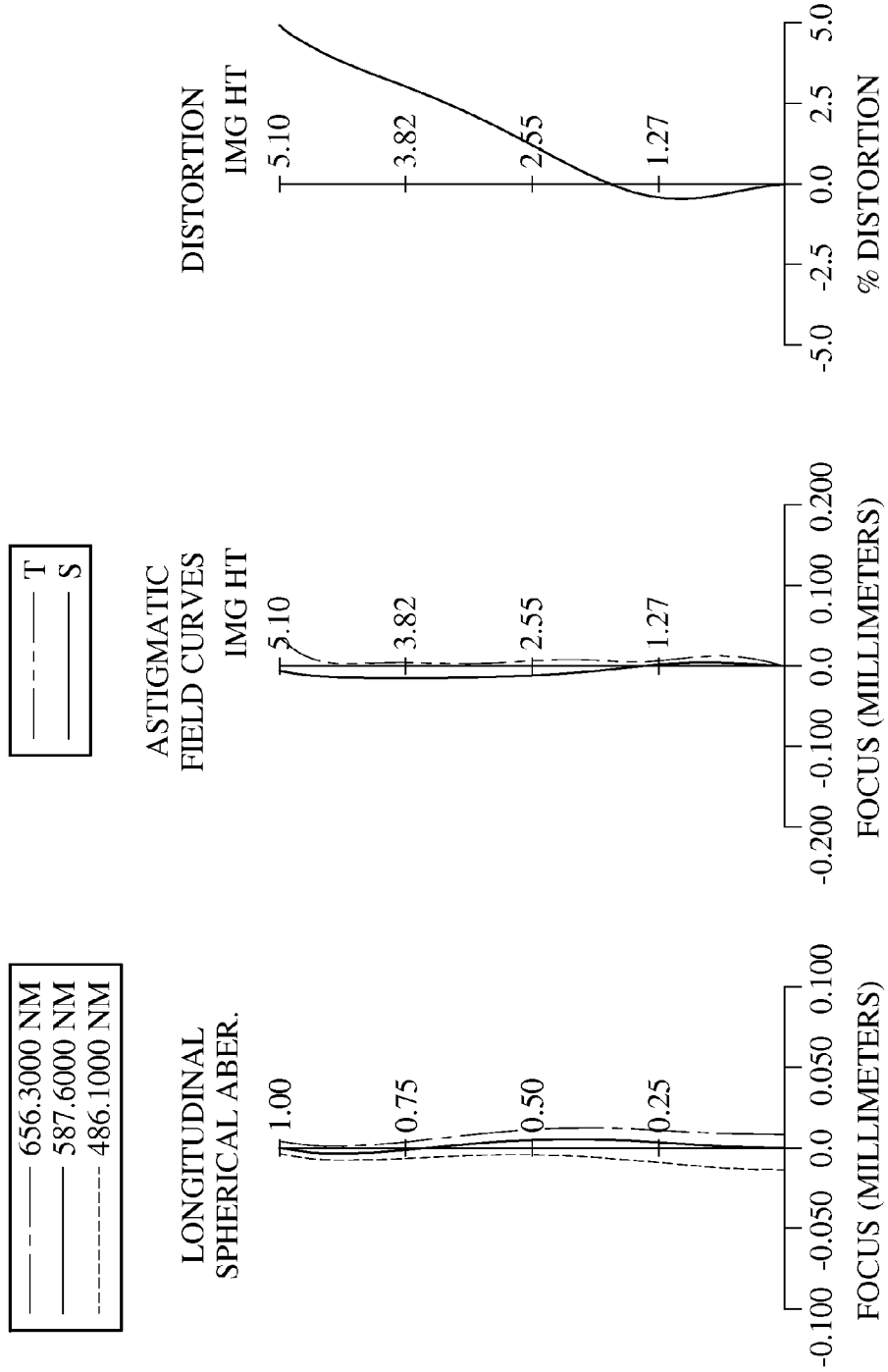
FIG. 16 shows spherical aberration curves, astigmatic field curves and a distortion curve of the image capturing unit according to the 8th embodiment.

FIG. 15 is a schematic view of an image capturing unit according to the 3rd embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 897. The photographing optical lens assembly includes, in order from an object side to an image side, an aperture stop 800, a first lens element 810, a second lens element 820, a third lens element 830, a fourth lens element 840, a fifth lens element 850, a sixth lens element 860, a seventh lens element 870, an eighth lens element 880, an IR-cut filter 890 and an image surface 895. A first lens group (reference numeral is omitted) of the photographing optical lens assembly includes the first lens element 810 and the second lens element 820. A second lens group (reference numeral is omitted) of the photographing optical lens assembly includes the third lens element 830, fourth lens element 840 and the fifth lens element 850. A third lens group (reference numeral is omitted) of the photographing optical lens assembly includes the sixth lens element 860, the seventh lens element 870 and the eighth lens element 880. The image sensor 897 is disposed on or near the image surface 895 of the photographing optical lens assembly, and the photographing optical lens assembly has a total of eight lens elements (810-880). There is an air gap in a paraxial region between every two lens elements of the third lens group that are adjacent to each other. In this embodiment, the first lens group has positive refractive power, the second lens group has positive refractive power, and the third lens group has positive refractive power.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 320 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric.

The seventh lens element 870 with positive refractive power has an object-side surface 871 being convex in a paraxial region thereof and an image-side surface 872 being convex in a paraxial region thereof. The seventh lens element 870 is made of plastic material and has the object-side surface 871 and the image-side surface 872 being both aspheric.

The eighth lens element 880 with negative refractive power has an object-side surface 881 being concave in a paraxial region thereof and an image-side surface 882 being concave in a paraxial region thereof. The eighth lens element 880 is made of plastic material and has the object-side surface 881 and the image-side surface 882 being both aspheric. The image-side surface 882 of the eighth lens element 880 has at least one inflection point.

The IR-cut filter 890 is made of glass and located between the eighth lens element 880 and the image surface 895, and will not affect the focal length of the photographing optical lens assembly.

The detailed optical data of the 8th embodiment are shown in Table 15 and the aspheric surface data are shown in Table 16 below.

TABLE 15

8th Embodiment
f = 6.05 mm, Fno = 2.50, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.230 | | | | |
| 2 | Lens 1 | 3.225 | (ASP) | 0.789 | Plastic | 1.544 | 55.9 | 9.63 |
| 3 | | 7.663 | (ASP) | 0.168 | | | | |
| 4 | Lens 2 | 4.692 | (ASP) | 0.346 | Plastic | 1.640 | 23.3 | −18.10 |
| 5 | | 3.243 | (ASP) | 0.314 | | | | |
| 6 | Lens 3 | 5.692 | (ASP) | 0.476 | Plastic | 1.544 | 55.9 | 19.25 |
| 7 | | 12.098 | (ASP) | 0.460 | | | | |
| 8 | Lens 4 | 14.559 | (ASP) | 0.724 | Plastic | 1.544 | 55.9 | 9.46 |

TABLE 15-continued

8th Embodiment
f = 6.05 mm, Fno = 2.50, HFOV = 38.8 deg.

| Surface # | | Curvature Radius | | Thickness | Material | Index | Abbe # | Focal Length |
|---|---|---|---|---|---|---|---|---|
| 9 | | −7.823 | (ASP) | 0.353 | | | | |
| 10 | Lens 5 | −1.743 | (ASP) | 0.289 | Plastic | 1.640 | 23.3 | −6.66 |
| 11 | | −3.140 | (ASP) | 0.226 | | | | |
| 12 | Lens 6 | 6.722 | (ASP) | 0.364 | Plastic | 1.640 | 23.3 | 20.62 |
| 13 | | 13.416 | (ASP) | 0.102 | | | | |
| 14 | Lens 7 | 17.648 | (ASP) | 0.972 | Plastic | 1.544 | 55.9 | 3.40 |
| 15 | | −2.025 | (ASP) | 0.432 | | | | |
| 16 | Lens 8 | −17.447 | (ASP) | 0.788 | Plastic | 1.530 | 55.8 | −2.80 |
| 17 | | 1.646 | (ASP) | 1.050 | | | | |
| 18 | IR-cut filter | Plano | | 0.316 | Glass | 1.517 | 64.2 | — |
| 19 | | Plano | | 0.251 | | | | |
| 20 | Image | Plano | | — | | | | |

Note:
Reference wavelength is 587.6 nm (d-line).

TABLE 16

Aspheric Coefficients

| Surface # | 2 | 3 | 4 | 5 | 6 | 7 |
|---|---|---|---|---|---|---|
| k = | 9.7327E−01 | 1.3914E+01 | −1.0179E+01 | −5.7767E+00 | −5.2840E+00 | −1.2252E+01 |
| A4 = | 2.7811E−04 | −1.0851E−02 | −2.8930E−02 | −1.4065E−02 | −1.9697E−03 | −8.8286E−03 |
| A6 = | 1.0603E−03 | 8.5807E−03 | 1.2086E−02 | 6.4812E−03 | 2.4629E−04 | 6.5023E−04 |
| A8 = | 3.3103E−04 | −1.7220E−03 | −3.0661E−03 | −1.2735E−03 | 1.5592E−04 | −1.3966E−04 |
| A10 = | −4.2729E−04 | 1.2047E−04 | 3.4757E−05 | 8.4359E−05 | −6.5196E−05 | −6.0865E−05 |
| A12 = | 3.2854E−04 | 1.4342E−04 | 9.7425E−05 | −8.2394E−05 | — | — |
| A14 = | −6.0799E−05 | 2.8783E−05 | 2.3134E−06 | 1.6483E−05 | — | — |

| Surface # | 8 | 9 | 10 | 11 | 12 | 13 |
|---|---|---|---|---|---|---|
| k = | −2.6542E+01 | −1.6034E+00 | −2.1244E+00 | −4.7602E+00 | 2.1182E+00 | −2.0000E+01 |
| A4 = | −1.4866E−02 | −1.0663E−02 | 3.4762E−02 | 1.0584E−02 | −1.4918E−02 | −3.5137E−02 |
| A6 = | −1.5743E−03 | −2.4323E−03 | −1.5850E−02 | −5.1466E−03 | 2.5301E−03 | −3.6027E−04 |
| A8 = | 3.4251E−04 | 2.1082E−04 | 4.0076E−03 | 1.1666E−03 | −3.8897E−04 | −1.1243E−05 |
| A10 = | −5.0557E−05 | −1.1461E−06 | −6.7647E−04 | −1.7611E−04 | 1.7863E−05 | −1.5867E−06 |
| A12 = | −1.5725E−05 | −2.9170E−08 | 8.5997E−05 | 1.9016E−05 | 6.7620E−07 | — |
| A14 = | 2.1634E−06 | 8.8760E−07 | −6.0050E−06 | −9.2073E−07 | −1.2743E−07 | — |

| Surface # | 14 | 15 | 16 | 17 |
|---|---|---|---|---|
| k = | −2.0000E+01 | −6.6776E+00 | 2.8072E+00 | −6.8316E+00 |
| A4 = | −4.3273E−03 | −2.2862E−03 | −1.5713E−02 | −6.8908E−03 |
| A6 = | 4.4821E−05 | −1.6718E−04 | 7.4870E−04 | 4.7037E−04 |
| A8 = | 5.3925E−07 | 3.7849E−04 | −1.3310E−06 | −2.6480E−05 |
| A10 = | −1.2113E−07 | −6.1384E−05 | 3.5705E−07 | 8.0096E−07 |
| A12 = | — | 3.7687E−06 | 4.1296E−09 | −1.7720E−08 |
| A14 = | — | −8.2605E−08 | −1.9486E−09 | 2.6140E−10 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.05 | (ΣAT + BL)/ΣCT | 0.77 |
| Fno | 2.50 | TL/ImgH | 1.65 |
| HFOV [deg.] | 38.8 | TL [mm] | 8.42 |
| Nmax | 1.640 | Yc7/f(object-side surface 871) | 0.29 |
| (V2 + V6)/V1 | 0.83 | | |
| (R11 − R12)/(R11 + R12) | −0.33 | Yc7/f(image-side surface 872) | — |
| (R15 − R16)/(R15 + R16) | 1.21 | | |
| f/R16 | 3.67 | Yc82/f | 0.50 |
| f/f1 | 0.63 | f/fG1 | 0.35 |
| f1/f2 | −0.53 | f/fG2 | 0.10 |
| Y11/Y82 | 0.28 | f/fG3 | 0.61 |
| SD/TD | 0.97 | f/f7 | 1.78 |
| ATmax/ImgH | 0.09 | f/f8 | −2.16 |
| f/EPD | 2.50 | CT3/CT4 | 0.66 |
| BL/EPD | 0.67 | CT7/CT8 | 1.23 |
| TL/EPD | 3.48 | T23/T56 | 1.39 |
| | | T23/T78 | 0.73 |

9th Embodiment

Figure 17:
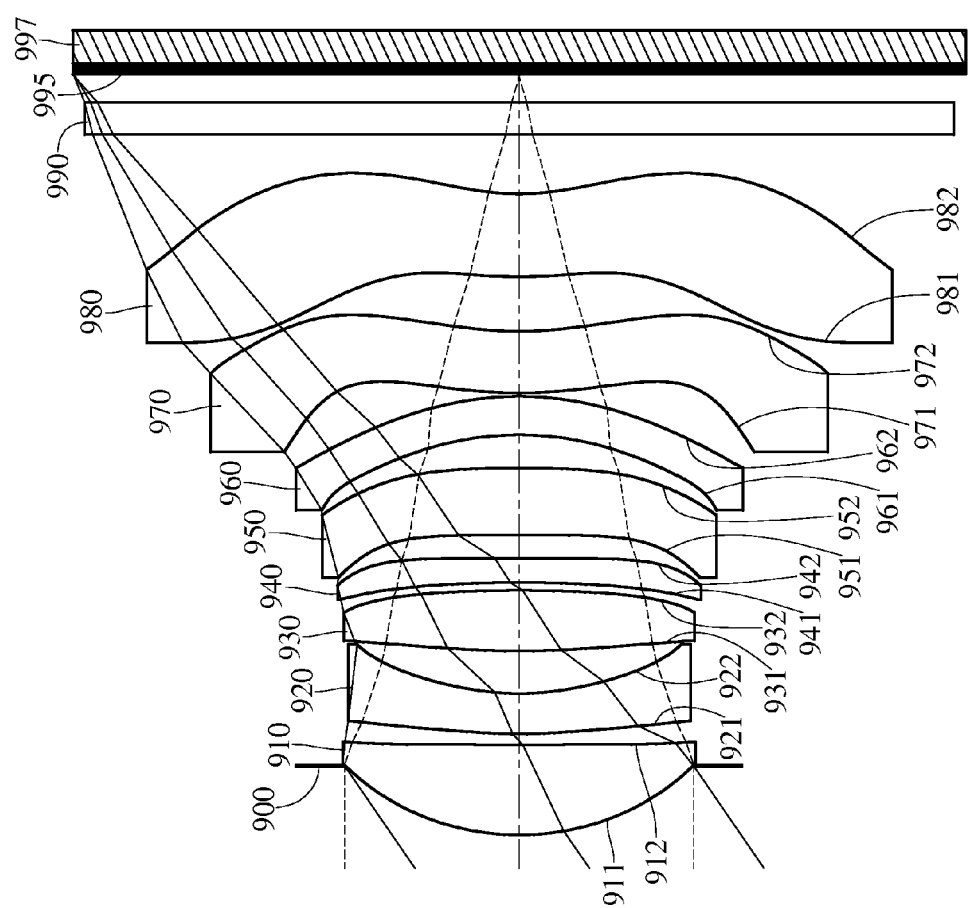
FIG. 17 is a schematic view of an image capturing unit according to the 9th embodiment of the present disclosure.
Figure 18:
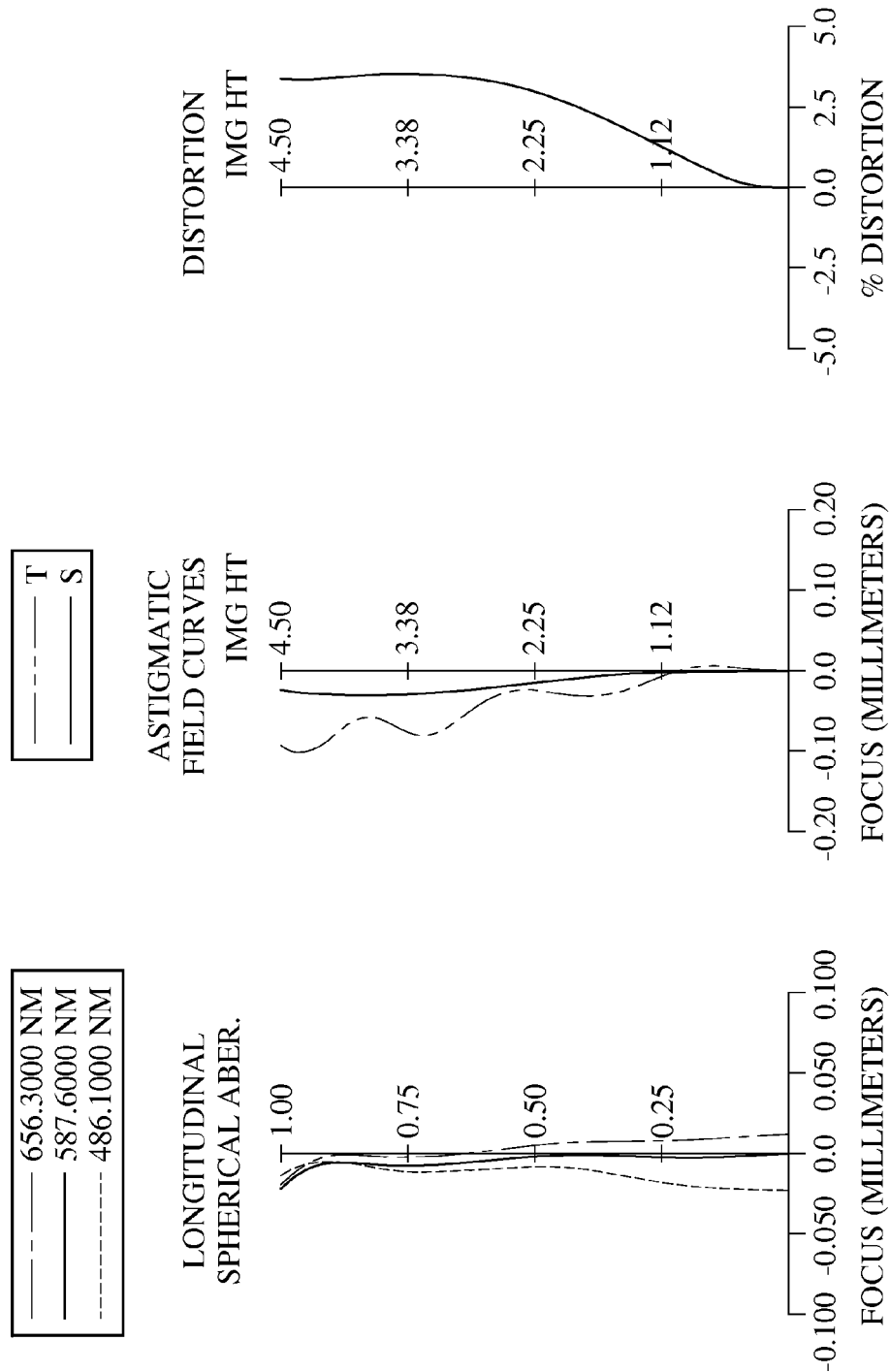
FIG. 18 shows spherical aberration curves, astigmatic field curves and a distortion curve of the image capturing unit according to the 9th embodiment.

FIG. 17 is a schematic view of an image capturing unit according to the 3rd embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens assembly (its reference numeral is omitted) of the present disclosure and an image sensor 997. The photographing optical lens assembly includes, in order from an object side to an image side, an aperture stop 900, a first lens element 910, a second lens element 920, a third lens element 930, a fourth lens element 940, a fifth lens element 950, a sixth lens element 960, a seventh lens element 970, an eighth lens element 980, an IR-cut filter 990 and an image surface 995. A first lens group (reference numeral is omitted) of the photographing optical lens assembly includes the first lens element 910 and the second lens element 920. A second lens group (reference numeral is omitted) of the photographing optical lens assembly includes the third lens element 930, fourth lens element 940 and the fifth lens element 950. A third lens group (reference numeral is omitted) of the photographing optical lens assembly includes the sixth lens element 960, the seventh lens element 970 and the eighth lens element 980. The image sensor 997 is disposed on or near the image surface 995 of the photographing optical lens assembly, and the photographing optical lens assembly has a total of eight lens elements (910-980). There is an air gap in a paraxial region between every two lens elements of the is third lens group that are adjacent to each other. In this embodiment, the first lens group has positive refractive power, the second lens group has positive refractive power, and the third lens group has negative refractive power.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and is the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with positive refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric.

The seventh lens element 970 with negative refractive power has an object-side surface 971 being convex in a paraxial region thereof and an image-side surface 972 being concave in a paraxial region thereof. The fifth lens element 970 is made of plastic material and has the object-side surface 971 and the image-side surface 972 being both aspheric.

The eighth lens element 980 with negative refractive power has an object-side surface 981 being convex in a paraxial region thereof and an image-side surface 982 being concave in a paraxial region thereof. The eighth lens element 980 is made of plastic material and has the object-side surface 981 and the image-side surface 982 being both aspheric. The image-side surface 982 of the eighth lens element 980 has at least one inflection point.

The IR-cut filter 990 is made of glass and located between the eighth lens element 980 and the image surface 995, and will not affect the focal length of the photographing optical lens assembly.

The detailed optical data of the 9th embodiment are shown in Table 17 and the aspheric surface data are shown in Table 18 below.

TABLE 17

9th Embodiment
f = 6.35 mm, Fno = 1.80, HFOV = 34.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.698 | | | | |
| 2 | Lens 1 | 2.628 | (ASP) | 0.912 | Plastic | 1.544 | 55.9 | 5.23 |
| 3 | | 30.092 | (ASP) | 0.110 | | | | |
| 4 | Lens 2 | 4.868 | (ASP) | 0.408 | Plastic | 1.639 | 23.5 | −9.27 |
| 5 | | 2.584 | (ASP) | 0.432 | | | | |
| 6 | Lens 3 | 9.165 | (ASP) | 0.611 | Plastic | 1..544 | 55.9 | 11.09 |
| 7 | | −17.258 | (ASP) | 0.080 | | | | |
| 8 | Lens 4 | −14.763 | (ASP) | 0.243 | Plastic | 1.544 | 55.9 | −24.38 |
| 9 | | 131.813 | (ASP) | 0.237 | | | | |
| 10 | Lens 5 | −408.163 | (ASP) | 0.679 | Plastic | 1.544 | 55.9 | 31.63 |
| 11 | | −16.526 | (ASP) | 0.336 | | | | |
| 12 | Lens 6 | −3.215 | (ASP) | 0.390 | Plastic | 1.639 | 23.5 | 75.00 |
| 13 | | −3.155 | (ASP) | 0.035 | | | | |
| 14 | Lens 7 | 4.465 | (ASP) | 0.623 | Plastic | 1.544 | 55.9 | −34.61 |

TABLE 17-continued

9th Embodiment
f = 6.35 mm, Fno = 1.80, HFOV = 34.4 deg.

| Surface # | | Curvature Radius | | Thickness | Material | Index | Abbe # | Focal Length |
|---|---|---|---|---|---|---|---|---|
| 15 | | 3.432 | (ASP) | 0.553 | | | | |
| 16 | Lens 8 | 4.324 | (ASP) | 0.838 | Plastic | 1.544 | 55.9 | −12.29 |
| 17 | | 2.446 | (ASP) | 0.600 | | | | |
| 18 | IR-cut filter | Plano | | 0.326 | Glass | 1.517 | 64.2 | — |
| 19 | | Plano | | 0.282 | | | | |
| 20 | Image | Plano | | — | | | | |

Note:
Reference wavelength is 587.6 nm (d-line).

TABLE 18

Aspheric Coefficients

| Surface # | 2 | 3 | 4 | 5 | 6 | 7 |
|---|---|---|---|---|---|---|
| k = | 1.8867E−01 | −5.0000E+01 | −3.7126E+01 | −1.4019E+01 | −2.2856E+01 | 8.9705E+01 |
| A4 = | 1.0690E−03 | −3.7048E−02 | −4.5877E−02 | 3.5651E−02 | −3.9792E−03 | −4.6341E−03 |
| A6 = | −2.3224E−03 | 4.0543E−02 | 4.4753E−02 | −2.5798E−02 | −1.3863E−03 | −8.5797E−04 |
| A8 = | 2.3501E−03 | −2.2626E−02 | −2.3596E−02 | 2.2418E−02 | 1.5124E−03 | — |
| A10 = | −1.2612E−03 | 7.2857E−03 | 7.3388E−03 | −1.0521E−02 | −8.6274E−04 | — |
| A12 = | 3.4896E−04 | −1.2297E−03 | −1.2243E−03 | 2.6180E−03 | 1.8949E−04 | — |
| A14 = | −3.7428E−05 | 8.0213E−05 | 7.9397E−05 | −2.3333E−04 | −4.3104E−06 | — |

| Surface # | 8 | 9 | 10 | 11 | 12 | 13 |
|---|---|---|---|---|---|---|
| k = | 3.9077E+01 | −9.0000E+01 | −9.0000E+01 | 6.5040E+01 | 1.3817E+00 | −1.6373E+01 |
| A4 = | −2.2212E−03 | −5.5460E−03 | −1.7005E−02 | −3.3633E−02 | −9.2720E−03 | −4.8459E−02 |
| A6 = | −3.6569E−04 | −4.4737E−03 | −4.7753E−03 | 1.2586E−02 | 2.7049E−02 | 2.8738E−02 |
| A8 = | — | −1.5494E−04 | −1.5784E−03 | −4.8008E−03 | −1.9676E−02 | −1.3990E−02 |
| A10 = | — | −7.4992E−05 | 1.0910E−04 | −2.2590E−03 | 7.7222E−03 | 4.1663E−03 |
| A12 = | — | 2.0351E−06 | 6.8999E−05 | 2.4441E−03 | −1.3588E−03 | −6.3966E−04 |
| A14 = | — | — | — | −6.7819E−04 | 7.9979E−05 | 3.8742E−05 |
| A16 = | — | — | — | 6.2555E−05 | — | — |

| Surface # | 14 | 15 | 16 | 17 |
|---|---|---|---|---|
| k = | −1.0191E+01 | −2.5236E+01 | −7.5301E−01 | −1.1325E+00 |
| A4 = | −1.7204E−02 | −6.0295E−03 | −1.0068E−01 | −7.7178E−02 |
| A6 = | 4.4444E−03 | 1.4208E−03 | 2.1108E−02 | 1.8417E−02 |
| A8 = | −3.9107E−03 | −1.2160E−03 | −2.6955E−03 | −3.4654E−03 |
| A10 = | 9.5751E−04 | 2.1390E−04 | 2.5898E−04 | 4.3552E−04 |
| A12 = | −1.4308E−04 | −1.3750E−05 | −1.8057E−05 | −3.3201E−05 |
| A14 = | 1.0003E−05 | 2.7122E−07 | 7.6245E−07 | 1.3695E−06 |
| A16 = | 0.0000E+00 | — | −1.4060E−08 | −2.3245E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 6.35 | (ΣAT + BL)/ΣCT | 0.64 |
| Fno | 1.80 | TL/ImgH | 1.71 |
| HFOV [deg.] | 34.4 | TL [mm] | 7.69 |
| Nmax | 1.639 | Yc7/f(object-side surface 971) | 0.22 |
| (V2 + V6)/V1 | 0.84 | | |
| (R11 − R12)/(R11 + R12) | 0.01 | Yc7/f(image-side surface 972) | 0.26 |
| (R15 − R16)/(R15 + R16) | 0.28 | | |

-continued

| 9th Embodiment | | | |
|---|---|---|---|
| f/R16 | 2.59 | Yc82/f | 0.26 |
| f/f1 | 1.21 | f/fG1 | 0.70 |
| f1/f2 | −0.56 | f/fG2 | 0.51 |
| Y11/Y82 | 0.47 | f/fG3 | −0.63 |
| SD/TD | 0.89 | f/f7 | −0.18 |
| ATmax/ImgH | 0.12 | f/f8 | −0.52 |
| f/EPD | 1.80 | CT3/CT4 | 2.51 |
| BL/EPD | 0.34 | CT7/CT8 | 0.74 |
| TL/EPD | 2.18 | T23/T56 | 1.29 |
| | | T23/T78 | 0.78 |

10th Embodiment

Figure 19:
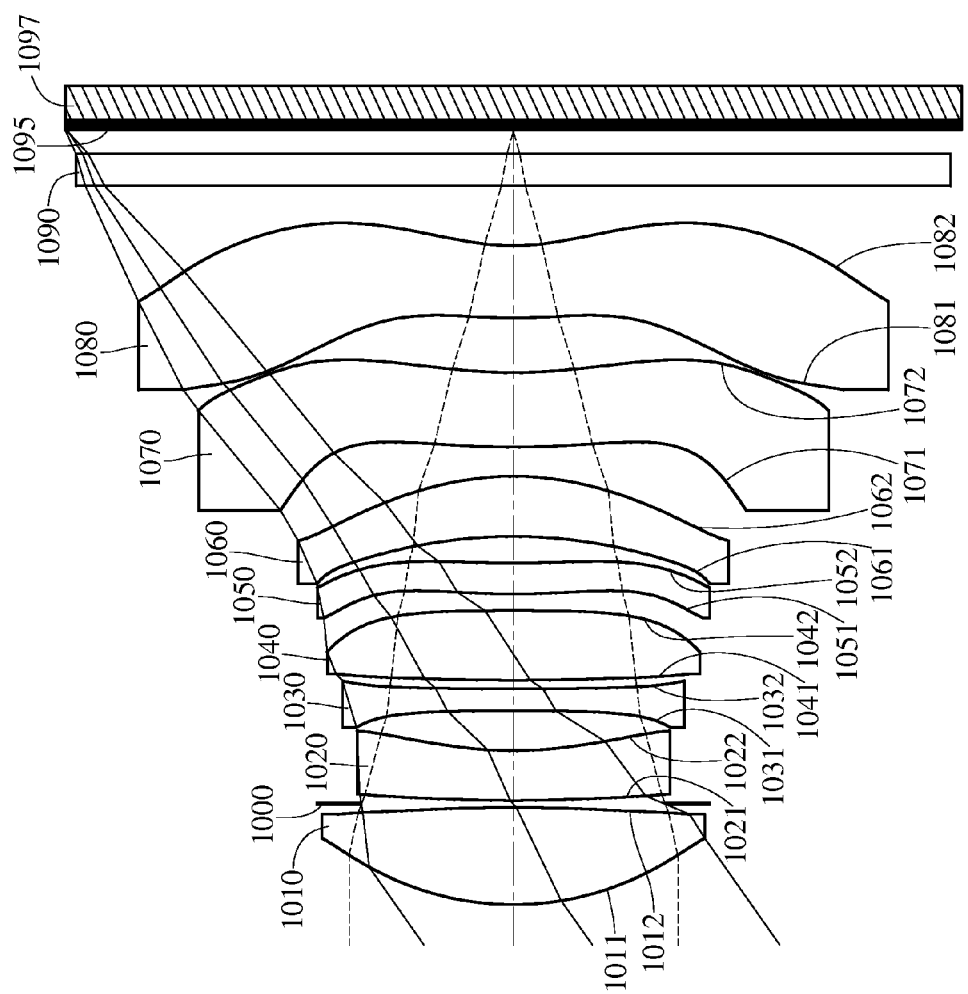
FIG. 19 is a schematic view of an image capturing unit according to the 10th embodiment of the present disclosure.
Figure 20:
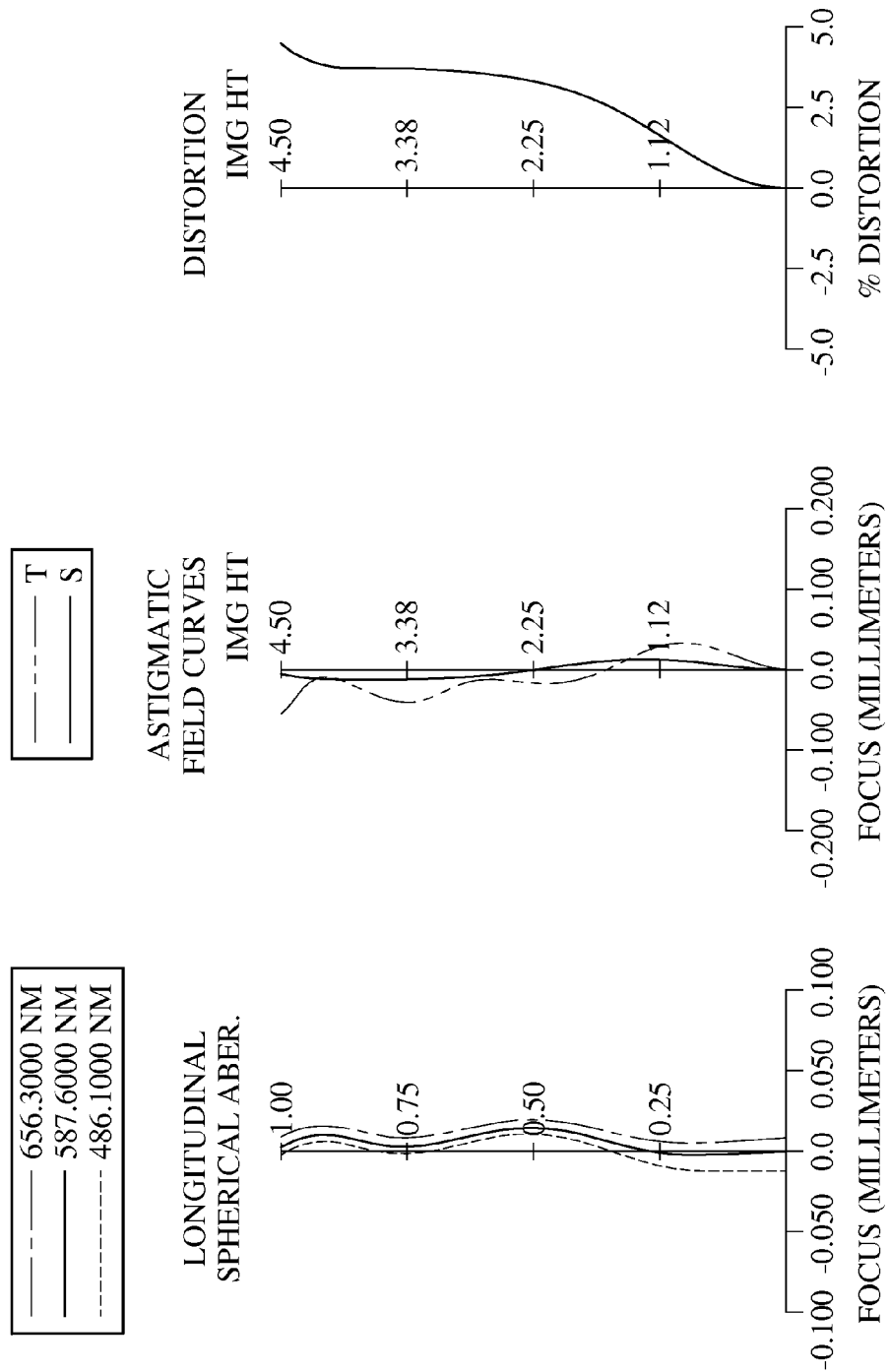
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens assembly (its reference numeral is omitted) of the present disclosure and an image sensor 1090. The photographing optical lens assembly includes, in order from an object side to an image side, a first lens element 1010, an aperture stop 1000, a second lens element 1020, a third lens element 1030, a fourth lens element 1040, a fifth lens element 1050, a sixth lens element 1060, a seventh lens element 1070, an eighth lens element 1080, an IR-cut filter 1090 and an image surface 1095. A first lens group (reference numeral is omitted) of the photographing optical lens assembly is includes the first lens element 1010 and the second lens element 1020. A second lens group (reference numeral is omitted) of the photographing optical lens assembly includes the third lens element 1030, fourth lens element 1040 and the fifth lens element 1050. A third lens group (reference numeral is omitted) of the photographing optical lens assembly includes the sixth lens element 1060, the seventh lens element 1070 and the eighth lens element 1080. The image sensor 1097 is disposed on or near the image surface 1095 of the photographing optical lens assembly, and the photographing optical lens assembly has a total of eight lens elements (1010-1080). There is an air gap in a paraxial region between every two lens elements of the third lens group that are adjacent to each other. In this embodiment, the first lens group has positive refractive power, the second lens group has positive refractive power, and the third lens group has negative refractive power.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric.

The sixth lens element 1060 with positive refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric.

The seventh lens element 1070 with negative refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric.

The eighth lens element 1080 with negative refractive power has an object-side surface 1081 being convex in a paraxial region thereof and an image-side surface 1082 being concave in a paraxial region thereof. The seventh lens element 1080 is made of plastic material and has the object-side surface 1081 and the image-side surface 1082 being both aspheric. The image-side surface 1082 of the eighth lens element 1080 has at least one inflection point.

The IR-cut filter 1090 is made of glass and located between the eighth lens element 1080 and the image surface 1095, and will not affect the focal length of the photographing optical lens assembly.

The detailed optical data of the 10th embodiment are shown in Table 19 and the aspheric surface data are shown in Table 20 below.

TABLE 19

10th Embodiment
f = 6.14 mm, Fno = 1.85, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.979 | (ASP) | 0.980 | Plastic | 1.544 | 55.9 | 4.97 |
| 2 | | −26.178 | (ASP) | 0.035 | | | | |
| 3 | Ape. Stop | Plano | | 0.035 | | | | |
| 4 | Lens 2 | 9.046 | (ASP) | 0.505 | Plastic | 1.639 | 23.5 | −10.00 |
| 5 | | 3.663 | (ASP) | 0.404 | | | | |
| 6 | Lens 3 | −40.783 | (ASP) | 0.220 | Plastic | 1.639 | 23.5 | −36.78 |
| 7 | | 55.598 | (ASP) | 0.087 | | | | |
| 8 | Lens 4 | 18.951 | (ASP) | 0.704 | Plastic | 1.544 | 55.9 | 24..01 |
| 9 | | −41.522 | (ASP) | 0.170 | | | | |
| 10 | Lens 5 | 8.111 | (ASP) | 0.312 | Plastic | 1.544 | 55.9 | 43.60 |
| 11 | | 12.158 | (ASP) | 0.268 | | | | |
| 12 | Lens 6 | −5.241 | (ASP) | 0.608 | Plastic | 1.544 | 55.9 | 12.02 |
| 13 | | −3.028 | (ASP) | 0.295 | | | | |
| 14 | Lens 7 | 8.050 | (ASP) | 0.753 | Plastic | 1.544 | 55.9 | −21.02 |
| 15 | | 4.569 | (ASP) | 0.553 | | | | |
| 16 | Lens 8 | 5.287 | (ASP) | 0.731 | Plastic | 1.544 | 55.9 | −8.84 |

TABLE 19-continued

10th Embodiment
f = 6.14 mm, Fno = 1.85, HFOV = 35.0 deg.

| Surface # | | Curvature Radius | | Thickness | Material | Index | Abbe # | Focal Length |
|---|---|---|---|---|---|---|---|---|
| 17 | | 2.395 | (ASP) | 0.600 | | | | |
| 18 | IR-cut filter | Plano | | 0.328 | Glass | 1.517 | 64.2 | — |
| 19 | | Plano | | 0.236 | | | | |
| 20 | Image | Plano | | — | | | | |

Note:
Reference wavelength is 587.6 nm (d-line).

TABLE 20

| Aspheric Coefficients | | | | | | |
|---|---|---|---|---|---|---|
| Surface # | 1 | 2 | 4 | 5 | 6 | 7 |
| k = | 1.1148E−01 | −6.2724E+00 | −9.0000E+01 | −2.7858E+01 | 9.0000E+01 | 5.7785E+01 |
| A4 = | 8.8488E−04 | −2.8771E−02 | −4.1644E−02 | 2.3974E−02 | −8.9616E−03 | −1.1613E−03 |
| A6 = | −2.6258E−03 | 3.7152E−02 | 4.3451E−02 | −2.7845E−02 | −3.2500E−03 | 2.5336E−03 |
| A8 = | 2.3856E−03 | −2.1633E−02 | −2.3216E−02 | 2.1016E−02 | 1.5573E−03 | — |
| A10 = | −1.2197E−03 | 6.9571E−03 | 7.0528E−03 | −1.0072E−02 | −1.0724E−03 | — |
| A12 = | 3.0873E−04 | −1.1920E−03 | −1.1181E−03 | 2.4771E−03 | 9.6120E−05 | — |
| A14 = | −3.4098E−05 | 8.2403E−05 | 7.8527E−05 | −2.5471E−04 | −1.2877E−05 | — |
| Surface # | 8 | 9 | 10 | 11 | 12 | 13 |
| k = | −9.0000E+01 | 9.0000E+01 | −9.0000E+01 | 2.8087E+01 | 2.7305E+00 | −1.2349E+01 |
| A4 = | −7.2005E−03 | −1.5313E−02 | −1.1144E−02 | −3.6581E−02 | −1.2640E−02 | −4.6138E−02 |
| A6 = | 2.0708E−03 | −2.6600E−03 | −6.0561E−03 | 1.0973E−02 | 2.5183E−02 | 2.8088E−02 |
| A8 = | — | −1.5811E−04 | −1.2628E−03 | −4.9662E−03 | −1.9182E−02 | −1.3570E−02 |
| A10 = | — | −1.2490E−04 | 3.1810E−04 | −2.2111E−03 | 7.3637E−03 | 3.9669E−03 |
| A12 = | — | 1.5688E−05 | 3.7125E−05 | 2.3378E−03 | −1.2939E−03 | −6.0252E−04 |
| A14 = | — | — | — | −6.3497E−04 | 7.4233E−05 | 3.7516E−05 |
| A16 = | — | — | — | 5.7425E−05 | — | — |
| Surface # | 14 | 15 | | 16 | | 17 |
| k = | −8.6451E+00 | −3.3055E+01 | | −4.2717E−01 | | −1.7325E+00 |
| A4 = | −1.8503E−02 | −7.1996E−03 | | −9.6192E−02 | | −7.1224E−02 |
| A6 = | 5.1280E−03 | 2.1049E−02 | | 2.0466E−02 | | 1.7893E−02 |
| A8 = | −3.8425E−03 | −1.1926E−03 | | −2.6027E−03 | | −3.3474E−03 |
| A10 = | 9.0824E−04 | 2.0077E−04 | | 2.4728E−04 | | 4.1579E−04 |
| A12 = | −1.3407E−04 | −1.2997E−05 | | −1.7061E−05 | | −3.1360E−05 |
| A14 = | 9.4084E−06 | 2.6626E−07 | | 7.1256E−07 | | 1.2815E−06 |
| A16 = | — | — | | −1.3116E−08 | | −2.1579E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 6.14 | (ΣAT + BL)/ΣCT | 0.63 |
| Fno | 1.85 | TL/ImgH | 1.74 |
| HFOV [deg.] | 35.0 | TL [mm] | 7.82 |
| Nmax | 1.639 | Yc7/f(object-side surface 271) | 0.20 |
| (V2 + V6)/V1 | 1.42 | | |
| (R11 − R12)/(R11 + R12) | 0.27 | Yc7/f(image-side surface 272) | 0.27 |
| (R15 − R16)/(R15 + R16) | 0.38 | | |
| f/R16 | 2.56 | Yc82/f | 0.28 |
| f/f1 | 1.23 | f/fG1 | 0.77 |

| 10th Embodiment | | | |
|---|---|---|---|
| f1/f2 | −0.50 | f/fG2 | 0.23 |
| Y11/Y82 | 0.51 | f/fG3 | −0.37 |
| SD/TD | 0.85 | f/f7 | −0.29 |
| ATmax/ImgH | 0.12 | f/f8 | −0.69 |
| f/EPD | 1.85 | CT3/CT4 | 0.31 |
| BL/EPD | 0.35 | CT7/CT8 | 1.03 |
| TL/EPD | 2.36 | T23/T56 | 1.51 |
| | | T23/T78 | 0.73 |

11th Embodiment

Figure 21:
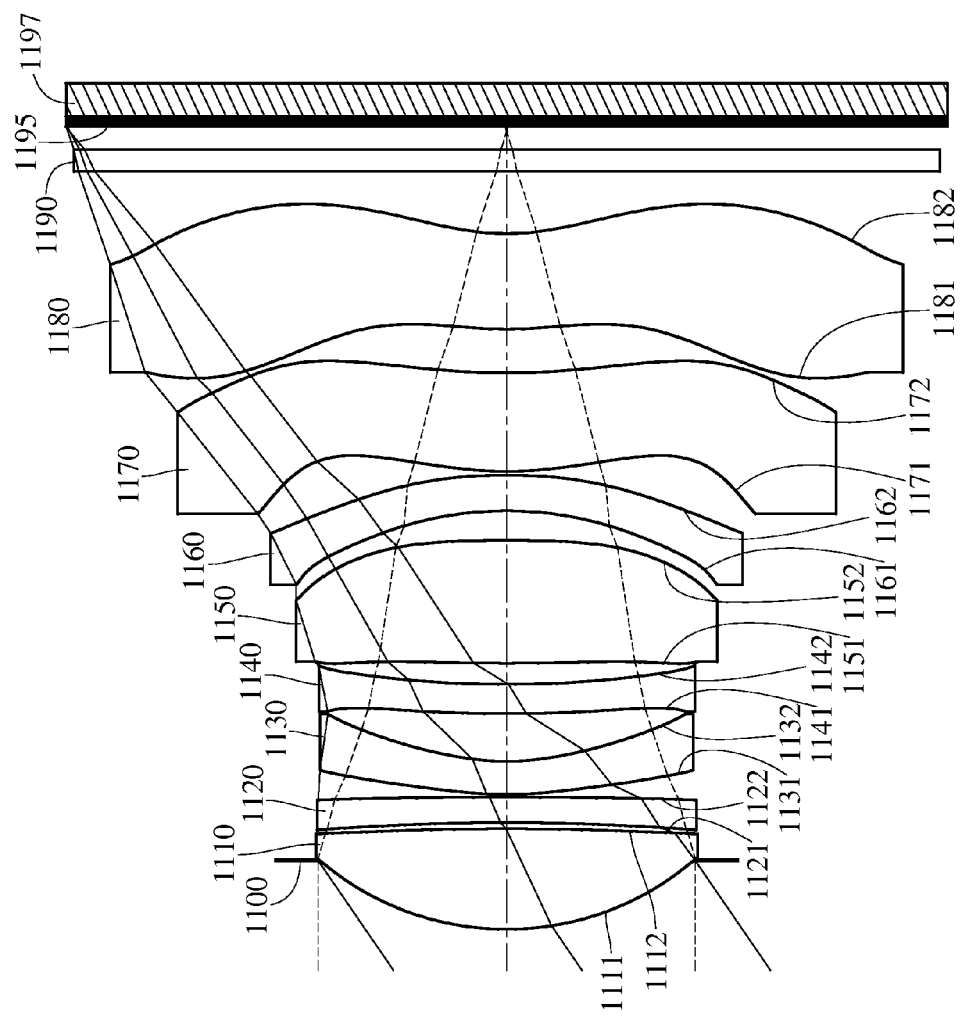
FIG. 21 is a schematic view of an image capturing unit according to the 11th embodiment of the present disclosure.
Figure 22:
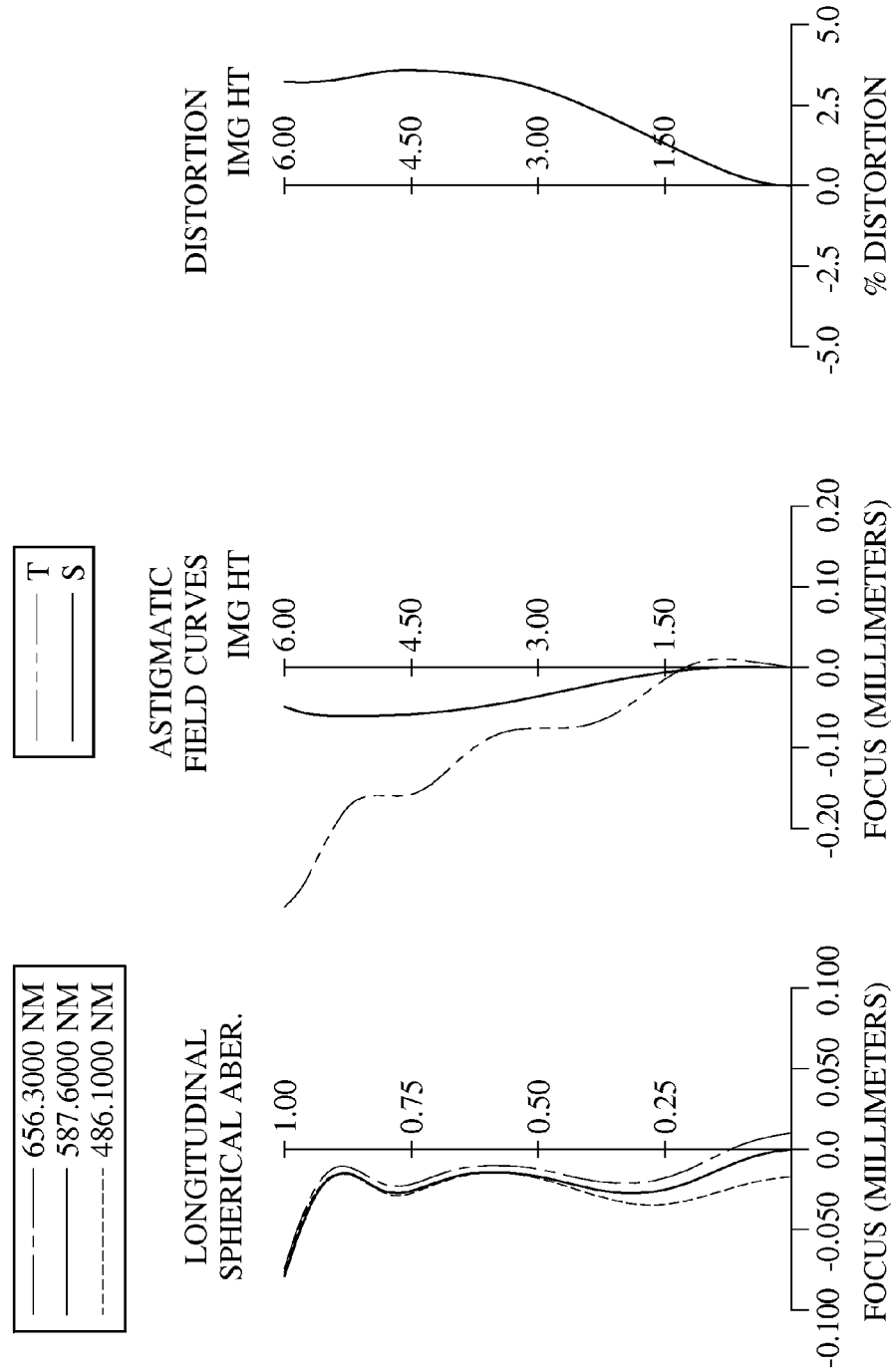
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the photographing optical lens assembly (its reference numeral is omitted) of the present disclosure and an image sensor 1197. The photographing optical lens assembly includes, in order from an object side to an image side, an aperture stop 1100, a first lens element 1110, a second lens element 1120, a third lens element 1130, a fourth lens element 1140, a fifth lens element 1150, a sixth lens element 1160, a seventh lens element 1170, an eighth lens element 1180, an IR-cut filter 1190 and an image surface 1195. A first lens group (reference numeral is omitted) of the photographing optical lens assembly includes the first lens element 1110 and the second lens element 1120. A second is lens group (reference numeral is omitted) of the photographing optical lens assembly includes the third lens element 1130, fourth lens element 1140 and the fifth lens element 1150. A third lens group (reference numeral is omitted) of the photographing optical lens assembly includes the sixth lens element 1160, the seventh lens element 1170 and the eighth lens element 1180. The image sensor 1197 is disposed on or near the image surface 1195 of the photographing optical lens assembly, and the photographing optical lens assembly has a total of eight lens elements (1110-1180). There is an air gap in a paraxial region between every two lens elements of the third lens group that are adjacent to each other. In this embodiment, the first lens group has positive refractive power, the second lens group has negative refractive power, and the third lens group has negative refractive power.

The first lens element 1110 with positive refractive power has an object-side surface 1111 being convex in a paraxial region thereof and an image-side surface 1112 being convex in a paraxial region thereof. The first lens element 1110 is made of plastic material and has the object-side surface 1111 and the image-side surface 1112 being both aspheric.

The second lens element 1120 with negative refractive power has an object-side surface 1121 being concave in a paraxial region thereof and an image-side surface 1122 being convex in a paraxial region thereof. The second lens element 1120 is made of plastic material and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric.

The fifth lens element 1150 with positive refractive power has an object-side surface 1151 being convex in a paraxial region thereof and an image-side surface 1152 being convex in a paraxial region thereof. The fifth lens element 1150 is made of plastic material and has the object-side surface 1151 and the image-side surface 1152 being both aspheric.

The sixth lens element 1160 with negative refractive power has an object-side surface 1161 being concave in a paraxial region thereof and an image-side surface 1162 being convex in a paraxial region thereof. The sixth lens element 1160 is made of plastic material and has the object-side surface 1161 and the image-side surface 1162 being both aspheric.

The seventh lens element 1170 with positive refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric.

The eighth lens element 1180 with negative refractive power has an object-side surface 1181 being convex in a paraxial region thereof and an image-side surface 1182 being concave in a paraxial region thereof. The eighth lens element 1180 is made of plastic material and has the object-side surface 1181 and the image-side surface 1182 being both aspheric. The image-side surface 1182 of the eighth lens element 1180 has at least one inflection point.

The IR-cut filter 1190 is made of glass and located between the eighth lens element 1180 and the image surface 1195, and will not affect the focal length of the photographing optical lens assembly.

The detailed optical data of the 11th embodiment are shown in Table 21 and the aspheric surface data are shown in Table 22 below.

TABLE 21

11th Embodiment
f = 8.50 mm, Fno = 1.65, HFOV = 34.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.941 | | | | |
| 2 | Lens 1 | 3.940 | (ASP) | 1.372 | Plastic | 1.544 | 55.9 | 7.09 |
| 3 | | −159.104 | (ASP) | 0.085 | | | | |
| 4 | Lens 2 | −30.053 | (ASP) | 0.350 | Plastic | 1.639 | 23.5 | −72.38 |
| 5 | | −86.207 | (ASP) | 0.035 | | | | |
| 6 | Lens 3 | 4.758 | (ASP) | 0.454 | Plastic | 1.632 | 23.4 | −18.99 |
| 7 | | 3.282 | (ASP) | 0.650 | | | | |
| 8 | Lens 4 | 19.021 | (ASP) | 0.403 | Plastic | 1.640 | 23.3 | −178.90 |
| 9 | | 16.176 | (ASP) | 0.286 | | | | |
| 10 | Lens 5 | 25.289 | (ASP) | 1.679 | Plastic | 1.544 | 55.9 | 25.12 |
| 11 | | −29.045 | (ASP) | 0.407 | | | | |
| 12 | Lens 6 | −4.945 | (ASP) | 0.488 | Plastic | 1.639 | 23.5 | −21.78 |
| 13 | | −7.966 | (ASP) | 0.051 | | | | |
| 14 | Lens 7 | 4.920 | (ASP) | 1.346 | Plastic | 1.544 | 55.9 | 18.40 |
| 15 | | 8.744 | (ASP) | 0.600 | | | | |
| 16 | Lens 8 | 5.758 | (ASP) | 1.305 | Plastic | 1.544 | 55.9 | −16.14 |
| 17 | | 3.200 | (ASP) | 0.850 | | | | |

TABLE 21-continued

11th Embodiment
f = 8.50 mm, Fno = 1.65, HFOV = 34.4 deg.

| Surface # | | Curvature Radius | Thickness | Material | Index | Abbe # | Focal Length |
|---|---|---|---|---|---|---|---|
| 18 | IR-cut filter | Plano | 0.300 | Glass | 1.517 | 64.2 | — |
| 19 | | Plano | 0.306 | | | | |
| 20 | Image | Plano | — | | | | |

Note:
Reference wavelength is 587.6 nm (d-line).

TABLE 22

Aspheric Coefficients

| Surface # | 2 | 3 | 4 | 5 | 6 | 7 |
|---|---|---|---|---|---|---|
| k = | 1.2865E−01 | 5.0000E+01 | −9.0000E+01 | 9.0000E+01 | −2.2504E+01 | −1.4212E+01 |
| A4 = | −3.4761E−04 | −1.2266E−02 | — | — | −1.4840E−02 | 1.0221E−02 |
| A6 = | −2.5199E−04 | 6.5425E−03 | — | — | 7.3482E−03 | −4.2282E−03 |
| A8 = | 1.7461E−04 | −1.7990E−03 | — | — | −1.8865E−03 | 1.7683E−03 |
| A10 = | −4.9841E−05 | 2.8240E−04 | — | — | 2.8085E−04 | −4.1315E−04 |
| A12 = | 6.7992E−06 | −2.3274E−05 | — | — | −2.2536E−05 | 4.7678E−05 |
| A14 = | −3.6949E−07 | 7.5019E−07 | — | — | 7.7267E−07 | −2.0558E−06 |

| Surface # | 8 | 9 | 10 | 11 | 12 | 13 |
|---|---|---|---|---|---|---|
| k = | 2.6616E+01 | 2.9627E+01 | −2.8713E+01 | 6.7529E+01 | 7.4491E−01 | −5.4044E+00 |
| A4 = | −9.8752E−04 | 7.2552E−04 | −3.2784E−03 | −1.3704E−02 | −4.2131E−03 | −1.4501E−02 |
| A6 = | −1.7469E−04 | −3.1698E−04 | −2.9428E−04 | 2.3327E−03 | 4.2125E−03 | 4.8408E−03 |
| A8 = | 8.2742E−05 | −1.1546E−05 | −1.5126E−05 | −3.9459E−04 | −1.5529E−03 | −1.1139E−03 |
| A10 = | −3.9896E−05 | −1.0942E−06 | 7.0476E−06 | −8.9049E−05 | 2.9528E−04 | 1.5855E−04 |
| A12 = | 3.1285E−06 | 9.1424E−07 | 7.1799E−07 | 4.5113E−05 | −2.5309E−05 | −1.1892E−05 |
| A14 = | −6.7955E−08 | — | — | −6.0673E−06 | 6.9653E−07 | 3.5594E−07 |
| A16 = | — | — | — | 2.6922E−07 | — | — |

| Surface # | 14 | 15 | 16 | 17 |
|---|---|---|---|---|
| k = | −1.4434E+01 | −3.6876E+01 | −6.6676E−01 | −9.6814E−01 |
| A4 = | −4.8537E−03 | −1.5739E−03 | −3.3474E−02 | −2.6279E−02 |
| A6 = | 8.0475E−04 | 3.0754E−04 | 3.4348E−03 | 3.0112E−03 |
| A8 = | −3.0810E−04 | −1.0049E−04 | −2.1322E−04 | −2.7412E−04 |
| A10 = | 3.6146E−05 | 8.1661E−06 | 9.9226E−06 | 1.6683E−05 |
| A12 = | −2.6803E−06 | −2.5306E−07 | −3.3485E−07 | −6.1600E−07 |
| A14 = | 9.5162E−08 | 2.5346E−09 | 6.8565E−09 | 1.2309E−08 |
| A16 = | — | — | −6.1344E−11 | −1.0117E−10 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 8.50 | (ΣAT + BL)/ΣCT | 0.48 |
| Fno | 1.65 | TL/ImgH | 1.83 |
| HFOV [deg.] | 34.4 | TL [mm] | 10.97 |
| Nmax | 1.640 | Yc7/f(object-side surface 271) | 0.25 |
| (V2 + V6)/V1 | 0.84 | | |
| (R11 − R12)/(R11 + R12) | −0.23 | Yc7/f(image-side surface 272) | 0.28 |
| (R15 − R16)/(R15 + R16) | 0.29 | | |
| f/R16 | 2.66 | Yc82/f | 0.32 |
| f/f1 | 1.20 | f/fG1 | 1.10 |
| f1/f2 | −0.10 | f/fG2 | −0.14 |
| Y11/Y82 | 0.48 | f/fG3 | −0.43 |
| SD/TD | 0.90 | f/f7 | 0.46 |
| ATmax/ImgH | 0.11 | f/f8 | −0.53 |
| f/EPD | 1.65 | CT3/CT4 | 1.13 |
| BL/EPD | 0.28 | CT7/CT8 | 1.03 |
| TL/EPD | 2.13 | T23/T56 | 0.09 |
| | | T23/T78 | 0.06 |

12th Embodiment

Figure 23:
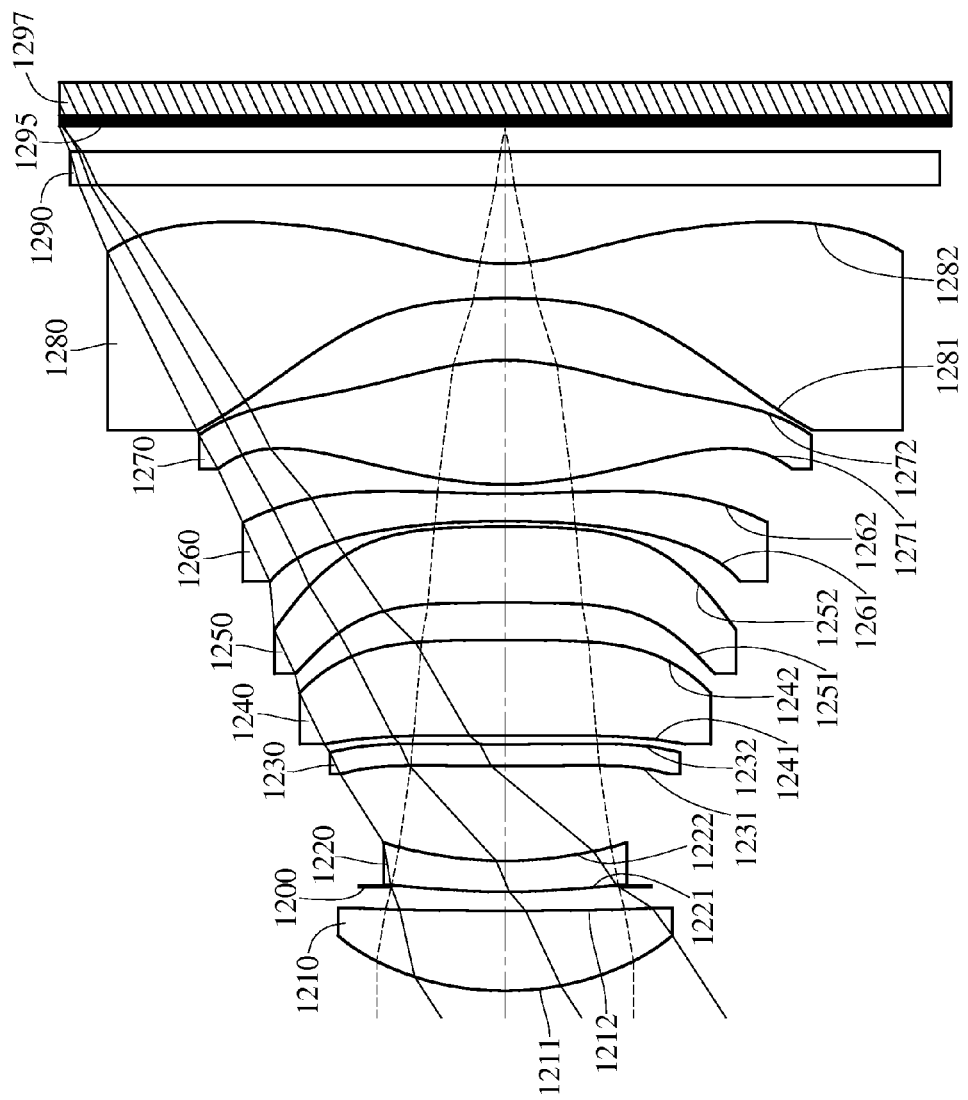
FIG. 23 is a schematic view of an image capturing unit according to the 12th embodiment of the present disclosure.
Figure 24:
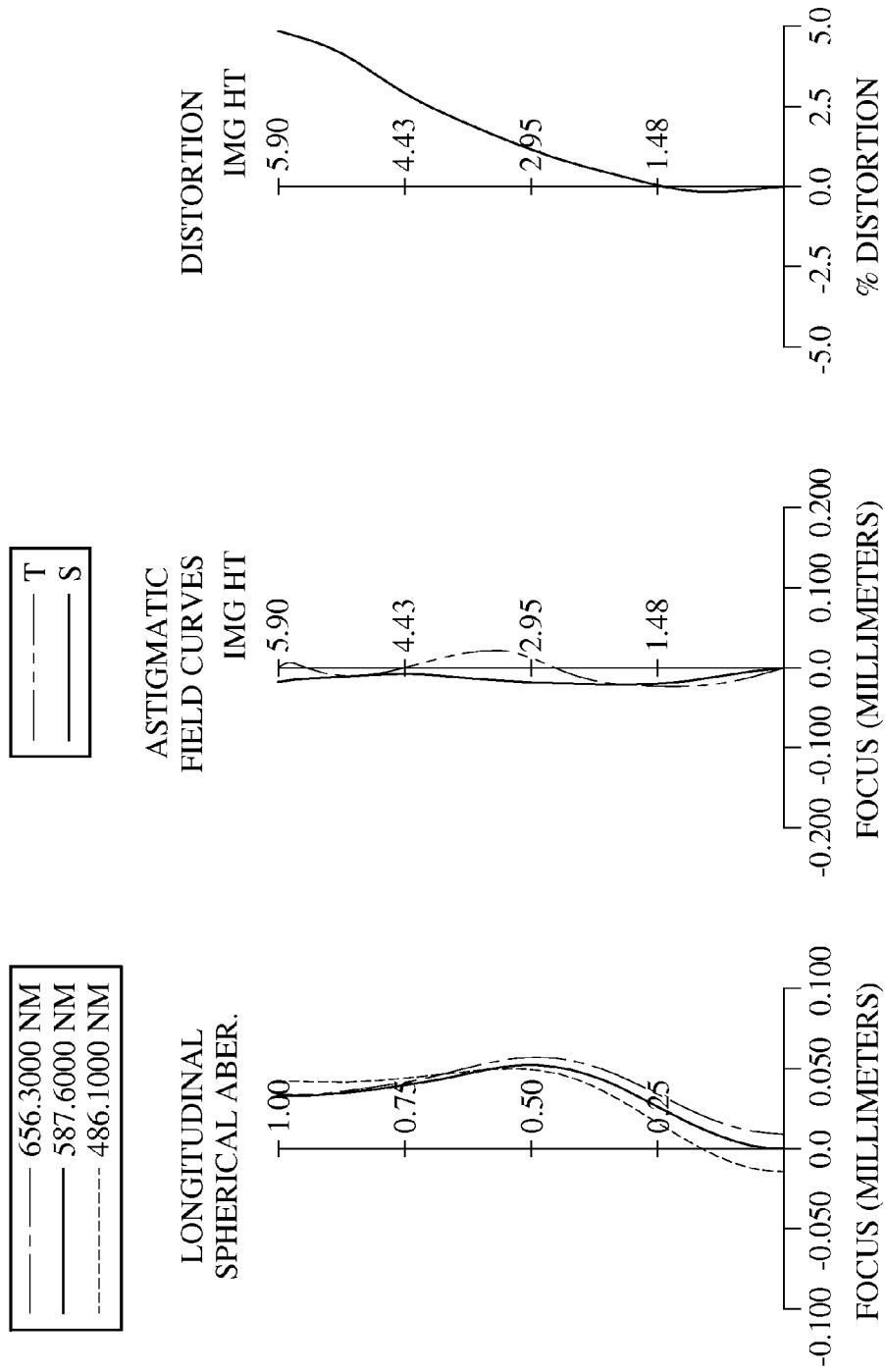
FIG. 24 shows spherical aberration curves, astigmatic field curves and a distortion curve of the image capturing unit according to the 12th embodiment.

FIG. 23 is a schematic view of an image capturing unit according to the 3rd embodiment of the present disclosure. FIG. 24 shows, in order from left to right, spherical aberration curves, astigmatic field curves and a distortion curve of the image capturing unit according to the 3rd embodiment. In FIG. 23, the image capturing unit includes the photographing optical lens assembly (its reference numeral is omitted) of the present disclosure and an image sensor 1297. The photographing optical lens assembly includes, in order from an object side to an image side, a first lens element 1210, an aperture stop 1200, a second lens element 1220, a third lens element 1230, a fourth lens element 1240, a fifth lens element 1250, a sixth lens element 1260, a seventh lens element 1270, an eighth lens element 1280, an IR-cut filter 1290 and an image surface 1295. A first lens group (reference numeral is omitted) of the photographing optical lens assembly includes the first lens element 1210 and the second lens element 1220. A second lens group (reference numeral is omitted) of the photographing optical lens assembly includes the third lens element 1230, fourth lens element 1240 and the fifth lens element 1250. A third lens group (reference numeral is omitted) of the photographing optical lens assembly includes the sixth lens element 1260, the seventh lens element 1270 and the eighth lens element 1280. The image sensor 1297 is disposed on or near the image surface 1295 of the photographing optical is lens assembly and the photographing optical lens assembly has a total of eight lens elements (1210-1280). There is an air gap in a paraxial region between every two lens elements of the third lens group that are adjacent to each other. In this embodiment, the first lens group has positive refractive power, the second lens group has positive refractive power, and the third lens group has negative refractive power.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric.

The second lens element 1220 with negative refractive power has an object-side surface 1221 being convex in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric.

The fourth lens element 1240 with positive refractive power has an object-side surface 1241 being convex in a paraxial region thereof and an image-side surface 1242 being convex in a paraxial region thereof. The fourth lens element 1240 is made of plastic material and has the object-side surface 1241 and the image-side surface 1242 being both aspheric.

The fifth lens element 1250 with positive refractive power has an object-side surface 1251 being concave in a paraxial region thereof and an image-side surface 1252 being convex in a paraxial region thereof. The fifth lens element 1250 is made of plastic material and has the object-side surface 1251 and the image-side surface 1252 being both aspheric.

The sixth lens element 1260 with negative refractive power has an object-side surface 1261 being concave in a paraxial region thereof and an image-side surface 1262 being concave in a paraxial region thereof. The sixth lens element 1260 is made of plastic material and has the object-side surface 1261 and the image-side surface 1262 being both aspheric.

The seventh lens element 1270 with positive refractive power has an object-side surface 1271 being convex in a paraxial region thereof and an image-side surface 1272 being convex in a paraxial region thereof. The seventh lens element 1270 is made of plastic material and has the object-side surface 1271 and the image-side surface 1272 being both aspheric.

The eighth lens element 1280 with negative refractive power has an object-side surface 1281 being concave in a paraxial region thereof and an image-side surface 1282 being concave in a paraxial region thereof. The eighth lens element 1280 is made of plastic material and has the object-side surface 1281 and the image-side surface 1282 being both aspheric. The image-side surface 1282 of the eighth lens element 1280 has at least one inflection point.

The IR-cut filter 1290 is made of glass and located between the eighth lens element 1280 and the image surface 1295, and will not affect the focal length of the photographing optical lens assembly.

The detailed optical data of the 12th embodiment are shown in Table 23 and the aspheric surface data are shown in Table 24 below.

TABLE 23

12th Embodiment
f = 8.58 mm, Fno = 2.50, HFOV = 33.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.025 | (ASP) | 1.071 | Plastic | 1.535 | 55.7 | 8.15 |
| 2 | | 47.762 | (ASP) | 0.323 | | | | |
| 3 | Ape. Stop | Plano | | −0.070 | | | | |
| 4 | Lens 2 | 8.074 | (ASP) | 0.415 | Plastic | 1.660 | 20.4 | −18.33 |
| 5 | | 4.743 | (ASP) | 1.269 | | | | |
| 6 | Lens 3 | 45.587 | (ASP) | 0.291 | Plastic | 1.660 | 20.4 | 390.73 |
| 7 | | 55.237 | (ASP) | 0.112 | | | | |
| 8 | Lens 4 | 74.994 | (ASP) | 1.284 | Plastic | 1.530 | 55.8 | 75.71 |
| 9 | | −85.777 | (ASP) | 0.502 | | | | |
| 10 | Lens 5 | −62.668 | (ASP) | 1.014 | Plastic | 1.535 | 55.7 | 90.95 |
| 11 | | −27.546 | (ASP) | 0.077 | | | | |
| 12 | Lens 6 | −13.025 | (ASP) | 0.364 | Plastic | 1.583 | 30.2 | −11.17 |
| 13 | | 13.170 | (ASP) | 0.128 | | | | |
| 14 | Lens 7 | 4.412 | (ASP) | 1.661 | Plastic | 1.530 | 55.8 | 3.83 |
| 15 | | −3.275 | (ASP) | 0.828 | | | | |
| 16 | Lens 8 | −9.566 | (ASP) | 0.466 | Plastic | 1.535 | 55.7 | −3.63 |
| 17 | | 2.475 | (ASP) | 1.050 | | | | |
| 18 | IR-cut filter | Plano | | 0.450 | Glass | 1.517 | 64.2 | — |

TABLE 23-continued

12th Embodiment
f = 8.58 mm, Fno = 2.50, HFOV = 33.1 deg.

| Surface # | | Curvature Radius | Thickness | Material | Index | Abbe # | Focal Length |
|---|---|---|---|---|---|---|---|
| 19 | | Plano | 0.336 | | | | |
| 20 | Image | Plano | — | | | | |

Note:
Reference wavelength is 587.6 nm (d-line).

TABLE 24

Aspheric Coefficients

| Surface # | 1 | 2 | 4 | 5 | 6 | 7 |
|---|---|---|---|---|---|---|
| k = | 2.8146E−01 | −4.9781E+01 | −3.3149E+01 | −1.6470E+01 | −1.6022E+00 | −9.0000E+01 |
| A4 = | 7.8489E−04 | −5.1830E−03 | −1.2582E−02 | 4.4560E−03 | −3.5358E−03 | −1.5971E−03 |
| A6 = | −1.3362E−04 | 2.5389E−03 | 6.0690E−03 | −4.8323E−04 | −3.8943E−04 | −6.3146E−04 |
| A8 = | 1.3044E−04 | −5.8842E−04 | −2.1962E−03 | −2.3034E−04 | −6.1707E−05 | −4.4227E−05 |
| A10 = | −3.4878E−05 | 7.1879E−05 | 6.7645E−04 | 7.6887E−04 | −1.0760E−05 | −7.4737E−06 |
| A12 = | 3.9427E−06 | 4.0742E−06 | −1.1183E−04 | −3.4174E−04 | −1.1789E−06 | 2.6590E−06 |
| A14 = | 9.1659E−08 | −1.2069E−06 | 6.2396E−06 | 5.0002E−05 | 7.2359E−07 | |

| Surface # | 8 | 9 | 10 | 11 | 12 | 13 |
|---|---|---|---|---|---|---|
| k = | 9.0000E+01 | 4.5783E+01 | 7.5528E+01 | 6.0649E+01 | 9.8813E+00 | −6.7498E+01 |
| A4 = | −4.2452E−03 | −9.6445E−03 | −1.1147E−02 | −1.4840E−02 | −4.5780E−03 | −1.0623E−02 |
| A6 = | −1.5013E−04 | −4.8947E−04 | −7.9172E−04 | 8.4013E−04 | 2.2166E−03 | 2.4305E−03 |
| A8 = | −2.3635E−05 | 4.8002E−05 | −5.6164E−05 | −1.6690E−04 | −7.1648E−04 | −4.9933E−04 |
| A10 = | 1.6089E−05 | −1.0433E−06 | 1.1729E−05 | −2.9549E−05 | 1.0484E−04 | 5.7349E−05 |
| A12 = | −1.4472E−06 | −1.7797E−07 | 2.0984E−07 | 1.3009E−05 | −7.0625E−06 | −3.3647E−06 |
| A14 = | — | — | — | −1.3914E−06 | 1.6277E−07 | 7.9013E−08 |
| A16 = | — | — | — | 4.9385E−08 | — | — |

| Surface # | 14 | 15 | 16 | 17 |
|---|---|---|---|---|
| k = | −1.0764E+01 | −6.0035E+00 | −1.4276E+01 | −6.3665E+00 |
| A4 = | −1.3272E−03 | 5.5529E−03 | −1.9481E−02 | −1.1993E−02 |
| A6 = | 6.1595E−04 | −4.0632E−05 | 1.9029E−03 | 1.5301E−03 |
| A8 = | −1.5395E−04 | −4.4555E−05 | −9.7463E−05 | −1.2139E−04 |
| A10 = | 1.4466E−05 | 2.9303E−06 | 3.5196E−06 | 5.9687E−06 |
| A12 = | −7.1232E−07 | −7.3162E−08 | −9.5955E−08 | −1.7585E−07 |
| A14 = | 1.4375E−08 | 4.8414E−10 | 1.6256E−09 | 2.7743E−09 |
| A16 = | — | — | −1.1112E−11 | −1.7713E−11 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 8.58 | (ΣAT + BL)/ΣCT | 0.76 |
| Fno | 2.50 | TL/ImgH | 1.96 |
| HFOV [deg.] | 33.1 | TL [mm] | 11.57 |
| Nmax | 1.660 | Yc7/f(object-side surface 271) | 0.35 |
| (V2 + V6)/V1 | 0.91 | | |
| (R11 − R12)/(R11 + R12) | −180.78 | Yc7/f(image-side surface 272) | — |
| (R15 − R16)/(R15 + R16) | 1.70 | | |
| f/R16 | 3.47 | Yc82/f | 0.42 |
| f/f1 | 1.05 | f/fG1 | 0.68 |
| f1/f2 | −0.44 | f/fG2 | 0.23 |
| Y11/Y82 | 0.42 | f/fG3 | −0.19 |

| 12th Embodiment | | | |
|---|---|---|---|
| SD/TD | 0.86 | f/f7 | 2.24 |
| ATmax/ImgH | 0.22 | f/f8 | −2.37 |
| f/EPD | 2.50 | CT3/CT4 | 0.23 |
| BL/EPD | 0.53 | CT7/CT8 | 3.56 |
| TL/EPD | 3.37 | T23/T56 | 16.48 |
| | | T23/T78 | 1.53 |

The foregoing image capturing unit is able to be installed in, but not limited to, an electronic device, including smart phones, tablet personal computers and wearable devices.

According to the present disclosure, the photographing optical lens assembly includes, in order from the object side to the image side, the first lens group, the second lens group and the third lens group. The first lens group includes two lens elements, the second lens group includes three lens elements, and the third lens group includes three lens elements. Therefore, the refractive power distribution of the first lens group, the second lens group and the third lens group is favorable for adjusting the optical parameters in a design of the photographing optical lens assembly so as to effectively improve the image quality. When specific condition is satisfied, it is favorable for reducing the back focal length of the photographing optical lens assembly, and thereby maintaining a compact size thereof. The optical parameters of the photographing optical lens assembly with some features of the lens elements, such as curvature radii of the lens elements, are favorable for applying the photographing optical lens assembly to both the conventional electronic device and the high-end electronic device. According to the present disclosure, the photographing optical lens assembly simultaneously satisfies the requirements of good image quality and compact size even though it is applied to the electronic device with high-end specifications.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising lens elements comprising, in order from an object side to an image side, a first lens group, a second lens group and a third lens group; wherein the first lens group comprises: a first lens element having positive refractive power; and a second lens element; wherein the second lens group comprises: a third lens element; a fourth lens element; and a fifth lens element; wherein the third lens group comprises: a sixth lens element; a seventh lens element having an object-side surface and an image-side surface being both aspheric; and an eighth lens element having an image-side surface being concave in a paraxial region thereof, wherein both an object-side surface and the image-side surface of the eighth lens element are aspheric, and the image-side of the eighth lens element has at least one inflection point; wherein there is an air gap in a paraxial region between every two lens elements of the third lens group that are adjacent to each other; a focal length of the photographing optical lens assembly is f, a curvature radius of the image-side surface of the eighth lens element, taken from the paraxial region, is R16, and the following condition is satisfied: $0 < f/R16 < 6.5$.

2. The photographing optical lens assembly of claim 1, wherein at least one of object-side surfaces and image-side surfaces of the lens elements of the first lens group is aspheric, and at least one of object-side surfaces and image-side surfaces of the lens elements of the second lens group is aspheric.

3. The photographing optical lens assembly of claim 1, further comprising a stop, wherein an axial distance between the stop and an image-side surface of the lens element closest to an image surface is SD, an axial distance between an object-side surface of the lens element closest to an imaged object and the image-side surface of the lens element closest to the image surface is TD, and the following condition is satisfied:

$0.70 < SD/TD < 1.10$.

4. The photographing optical lens assembly of claim 1, wherein the object-side surface of the eighth lens element is convex in a paraxial region thereof.

5. The photographing optical lens assembly of claim 1, wherein the eighth lens element has negative refractive power.

6. The photographing optical lens assembly of claim 1, wherein a maximum refractive index among the lens elements of the photographing optical lens assembly is Nmax, and the following condition is satisfied:

$1.55 < Nmax < 1.70$.

7. The photographing optical lens assembly of claim 1, wherein an Abbe number of the first lens element is V1, an Abbe number of the second lens element is V2, an Abbe number of the sixth lens element is V6, and the following condition is satisfied:

$(V2+V6)/V1 < 1.0$.

8. The photographing optical lens assembly of claim 1, wherein an axial distance between an object-side surface of the lens element closest to an imaged object and an image surface is TL, a maximum image height of the photographing optical lens assembly is ImgH, and the following condition is satisfied:

$TL/ImgH < 2.1$.

9. The photographing optical lens assembly of claim 1, wherein an axial distance between an object-side surface of the lens element closest to an imaged object and an image surface is TL, an entrance pupil diameter of the photographing optical lens assembly is EPD, and the following condition is satisfied:

$1.5 < TL/EPD < 4.0$.

10. The photographing optical lens assembly of claim 1, wherein half of a maximal field of view of the photographing optical lens assembly is HFOV, the focal length of the photographing optical lens assembly is f, a focal length of the first lens element is f1, and the following conditions are satisfied:

$30.0$ degrees $< HFOV < 50.0$ degrees; and $0 < f/f1 < 2.5$.

11. The photographing optical lens assembly of claim 1, wherein the first lens element, the second lens element, the third lens element, the fourth lens element, the fifth lens element, the sixth lens element, the seventh lens element and the eighth lens element are all made of plastic material, an axial distance between an object-side surface of the lens element closest to an imaged object and an image surface is TL, and the following condition is satisfied:

$TL < 12.0$ millimeters.

12. The photographing optical lens assembly of claim 1, wherein the object-side surface of the seventh lens element is convex in a paraxial region thereof and the image-side surface of the seventh lens element is concave in a paraxial region thereof.

13. The photographing optical lens assembly of claim 1, wherein a curvature radius of the object-side surface of the eighth lens element is R15, the curvature radius of the image-side surface of the eighth lens element is R16, and the following condition is satisfied:

$-0.9 < (R15-R16)/(R15+R16) < 10$.

14. The photographing optical lens assembly of claim 1, wherein a maximum effective radius of an object-side surface of the first lens element is Y11, a maximum effective radius of the image-side surface of the eighth lens element is Y82, and the following condition is satisfied:

$0.20 < Y11/Y82 < 0.70.$

15. The photographing optical lens assembly of claim 1, wherein a maximum axial distance among all axial distances between every two lens elements of the photographing optical lens assembly that are adjacent to each other is ATmax, a maximum image height of the photographing optical lens assembly is ImgH, and the following condition is satisfied:

$AT\text{max}/\text{ImgH} < 0.30.$

16. The photographing optical lens assembly of claim 1, wherein the second lens element has negative refractive power, the second lens element has an object-side surface being convex in a paraxial region thereof and an image-side surface being concave in a paraxial region thereof; the focal length of the photographing optical lens assembly is f, an entrance pupil diameter of the photographing optical lens assembly is EPD, and the following condition is satisfied:

$f/\text{EPD} < 2.60.$

17. The photographing optical lens assembly of claim 1, wherein the focal length of the photographing optical lens assembly is f, the curvature radius of the image-side surface of the eighth lens element is R16, and the following condition is satisfied:

$0.3 < f/R16 < 5.0.$

18. The photographing optical lens assembly of claim 1, wherein a focal length of the first lens element is f1, a focal length of the second lens element is f2, and the following condition is satisfied:

$-1.0 < f1/f2 < 0.7.$

19. The photographing optical lens assembly of claim 1, wherein an axial distance between an image-side surface of the lens element closest to an image surface and the image surface is BL, an entrance pupil diameter of the photographing optical lens assembly is EPD, and the following condition is satisfied:

$0.10 < BL/\text{EPD} < 0.70.$

20. The photographing optical lens assembly of claim 1, wherein a sum of every axial distance between every two lens elements of the photographing optical lens assembly that are adjacent to each other is ΣAT, an axial distance between an image-side surface of the lens element closest to an image surface and the image surface is BL, a sum of central thicknesses of the lens elements of the photographing optical lens assembly is ΣCT, and the following condition is satisfied:

$(\Sigma AT + BL)/\Sigma CT < 0.80.$

21. The photographing optical lens assembly of claim 1, wherein a curvature radius of an object-side surface of the sixth lens element is R11, a curvature radius of an image-side surface of the sixth lens element is R12, and the following condition is satisfied:

$-2.5 < (R11-R12)/(R11+R12) < 0.80.$

22. The photographing optical lens assembly of claim 1, wherein a curvature radius of the object-side surface of the eighth lens element is R15, the curvature radius of the image-side surface of the eighth lens element is R16, and the following condition is satisfied:

$-0.5 < (R15-R16)/(R15+R16) < 2.5.$

23. The photographing optical lens assembly of claim 1, further comprising a stop disposed between an imaged object and the lens element closest to the imaged object, wherein there is an air gap in a paraxial region between every two lens elements of the photographing optical lens assembly that are adjacent to each other.

24. The photographing optical lens assembly of claim 1, wherein a vertical distance between a non-axial critical point on the object-side surface or the image-side surface of the seventh lens element and an optical axis is Yc7, the focal length of the photographing optical lens assembly is f, and the following condition is satisfied:

$0.10 < Yc7/f < 0.60.$

25. The photographing optical lens assembly of claim 1, wherein a vertical distance between a non-axial critical point on the image-side surface of the eighth lens element and an optical axis is Yc82, the focal length of the photographing optical lens assembly is f, and the following condition is satisfied:

$0.10 < Yc82/f < 0.80.$

26. The photographing optical lens assembly of claim 1, wherein the first lens element has the strongest refractive power among the lens elements of the photographing optical lens assembly.

27. The photographing optical lens assembly of claim 1, wherein the first lens group has positive refractive power, the second lens group has positive refractive power, and the third lens group has negative refractive power.

28. An image capturing unit, comprising:
the photographing optical lens assembly of claim 1; and
an image sensor, wherein the image sensor is disposed on the image side of the photographing optical lens assembly.

29. An electronic device, comprising:
the image capturing unit of claim 28.

* * * * *

UNITED STATES PATENT AND TRADEMARK OFFICE
CERTIFICATE OF CORRECTION

PATENT NO. : 9,835,822 B2
APPLICATION NO. : 14/919102
DATED : December 5, 2017
INVENTOR(S) : Hsin-Hsuan Huang Page 1 of 2

It is certified that error appears in the above-identified patent and that said Letters Patent is hereby corrected as shown below:

In the Specification

Replace TABLE 1 in Columns 13 and 14 with the following amended TABLE 1.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*

| TABLE 1 | | | | | | | |
|---|---|---|---|---|---|---|---|
| 1st Embodiment | | | | | | | |
| f = 3.75 mm, Fno = 1.90, HFOV = 36.8 deg. | | | | | | | |
| Surface # | | Curvature Radius | | Thickness | Material | Index | Abbe # | Focal Length |
| 0 | Object | Plano | | Infinity | | | | |
| 1 | Ape. Stop | Plano | | -0.325 | | | | |
| 2 | Lens 1 | 1.685 | (ASP) | 0.546 | Plastic | 1.544 | 55.9 | 3.37 |
| 3 | | 18.567 | (ASP) | 0.070 | | | | |
| 4 | Lens 2 | 2.923 | (ASP) | 0.253 0.264 | Plastic | 1.639 | 23.5 | -6.03 |
| 5 | | 1.604 | (ASP) | 0.426 0.253 | | | | |
| 6 | Lens 3 | 6.358 | (ASP) | 0.050 0.426 | Plastic | 1.544 | 55.9 | 7.75 |
| 7 | | -12.215 | (ASP) | 0.266 0.050 | | | | |
| 8 | Lens 4 | -10.576 | (ASP) | 0.104 0.266 | Plastic | 1.544 | 55.9 | -430.85 |
| 9 | | -11.174 | (ASP) | 0.251 0.104 | | | | |
| 10 | Lens 5 | -10.367 | (ASP) | 0.173 0.251 | Plastic | 1.544 | 55.9 | -274.67 |
| 11 | | -11.235 | (ASP) | 0.220 0.173 | | | | |
| 12 | Lens 6 | -2.060 | (ASP) | 0.035 0.220 | Plastic | 1.639 | 23.5 | -16.13 |
| 13 | | -2.681 | (ASP) | 0.732 0.035 | | | | |
| 14 | Lens 7 | 3.461 | (ASP) | 0.317 0.732 | Plastic | 1.544 | 55.9 | 4.37 |
| 15 | | -7.055 | (ASP) | 0.306 0.317 | | | | |
| 16 | Lens 8 | 11.111 | (ASP) | 0.350 0.306 | Plastic | 1.535 | 55.7 | -3.12 |
| 17 | | 1.438 | (ASP) | 0.546 0.350 | | | | |
| 18 | IR-cut filter | Plano | | 0.210 | Glass | 1.517 | 64.2 | - |
| 19 | | Plano | | 0.206 | | | | |
| 20 | Image | Plano | | - | | | | |
| Note: Reference wavelength is 587.6 nm (d-line). | | | | | | | | |